United States Patent
Crampton

(10) Patent No.: US 7,184,047 B1
(45) Date of Patent: Feb. 27, 2007

(54) METHOD AND APPARATUS FOR THE GENERATION OF COMPUTER GRAPHIC REPRESENTATIONS OF INDIVIDUALS

(76) Inventor: Stephen James Crampton, 9 Broadfields, Goffs Oak, Waltham Cross, Herts, EN7 5JU (GB)

( * ) Notice: Subject to any disclaimer, the term of this patent is extended or adjusted under 35 U.S.C. 154(b) by 1056 days.

(21) Appl. No.: 09/604,307

(22) Filed: Jun. 27, 2000

Related U.S. Application Data

(63) Continuation-in-part of application No. 09/338,941, filed on Jun. 24, 1999, which is a continuation-in-part of application No. PCT/GB97/03515, filed on Dec. 22, 1997.

(30) Foreign Application Priority Data

Dec. 24, 1996 (GB) .......................................... 9626825.5

(51) Int. Cl.
*G06T 15/70* (2006.01)

(52) U.S. Cl. ........................ 345/473; 345/629; 345/639; 345/640; 345/641; 382/111; 348/592

(58) Field of Classification Search ................. 382/111; 345/418, 419, 639, 629, 473, 474, 640, 641, 345/420; 348/592
See application file for complete search history.

(56) References Cited

U.S. PATENT DOCUMENTS

| | | | | |
|---|---|---|---|---|
| 5,524,195 | A | * 6/1996 | Clanton et al. ................ | 725/61 |
| 5,530,652 | A | 6/1996 | Croyle et al. | |
| 5,577,179 | A | * 11/1996 | Blank .......................... | 345/639 |
| 5,696,995 | A | * 12/1997 | Huang et al. .................. | 396/2 |
| 5,850,222 | A | * 12/1998 | Cone ........................... | 345/418 |
| 5,937,081 | A | * 8/1999 | O'Brill et al. ............... | 382/111 |
| 5,986,718 | A | * 11/1999 | Barwacz et al. ............. | 348/592 |

FOREIGN PATENT DOCUMENTS

WO    WO 98/35320    8/1998

OTHER PUBLICATIONS

Akimoto et al. "Automatic Creation of 3D Facial Models", IEEE, 1993, pp. 16–22.*
Lee et al. "Realistic Modeling for Facial Animation", Canada, 1995.*
Tang et al. "Automatic Construction of 3D Human Face Models BAsed on 2D images", IEEE, 1996, pp. 467–470.*
Stenstrom et al., "Constructing Object Models from Multiple Images", Intl. Journal of Computer Vision, vol. 9, No. 3, 1992, pp. 185–212.
"Aiming a Camera to Take a Self Portrait", IBM Technical Disclosure Bulletin, vol. 35, No. 3, pp. 75–77, Aug. 1992.
Yuencheng Lee et al., "Constructing Physics–Based Facial Models of Individuals", Proceedings Graphics Interface '93, May 19–21, 1993, pp. 1–8.

(Continued)

*Primary Examiner*—Kimbinh T. Nguyen
(74) *Attorney, Agent, or Firm*—Cohen, Pontani, Lieberman & Pavane

(57) ABSTRACT

Apparatus for generating computer models of individuals is provided comprising a booth (1) that is connected to a server (2) via the Internet (3). Image data of an individual is captured using the booth (1) and a computer model corresponding to the individual is then generated by comparing the captured image data relative to a stored generic model. Data representative of a generated model is then transmitted to the server (2) where it is stored. Stored data can then be retrieved via the Internet using a personal computer (4) having application software stored therein. The application software on the personal computer (4) can then utilise the data to create graphic representations of an individual in any one of a number of poses.

118 Claims, 53 Drawing Sheets

OTHER PUBLICATIONS

Thomas Gentils, "Reconstruction of 3D Human Models from Silhouettes", Thomas Gentils, Centre for Vision, Speech and Signal Processing, University of Surrey, Jun.–Nov. 1997, pp. 1–63.

Stenstrom et al., "Constructing Object Models from Multiple Images", Intl. Journal of Computer Vision, vol. 9, No. 3, 1992, pp. 185–212.

"Aiming a Camera to Take a Self Portrait", IBM Technical Disclosure Bulletin, vol. 35, No. 3, pp. 75–77, Aug. 1992.

Yuencheng Lee, et al., "Constructing Physics–Based Facial Models of Individuals" Proceedings Graphics Interface '93, May 19–21, 1993, pp. 1–8.

Thomas Gentils, Reconstruction of 3D Human Models from Silhouettes, Thomas Gentils, Centre for Vision, Speech and Signal Processing, University of Surrey, Jun.–Nov. 1997, pp. 1–63.

* cited by examiner

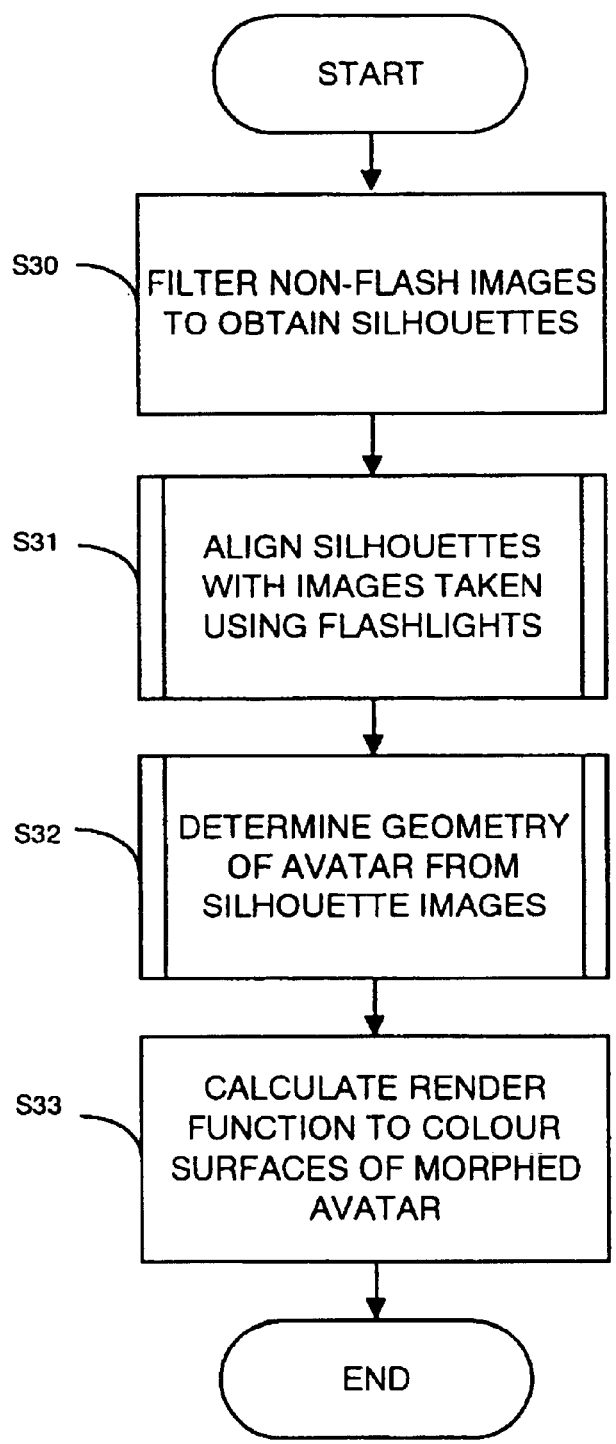

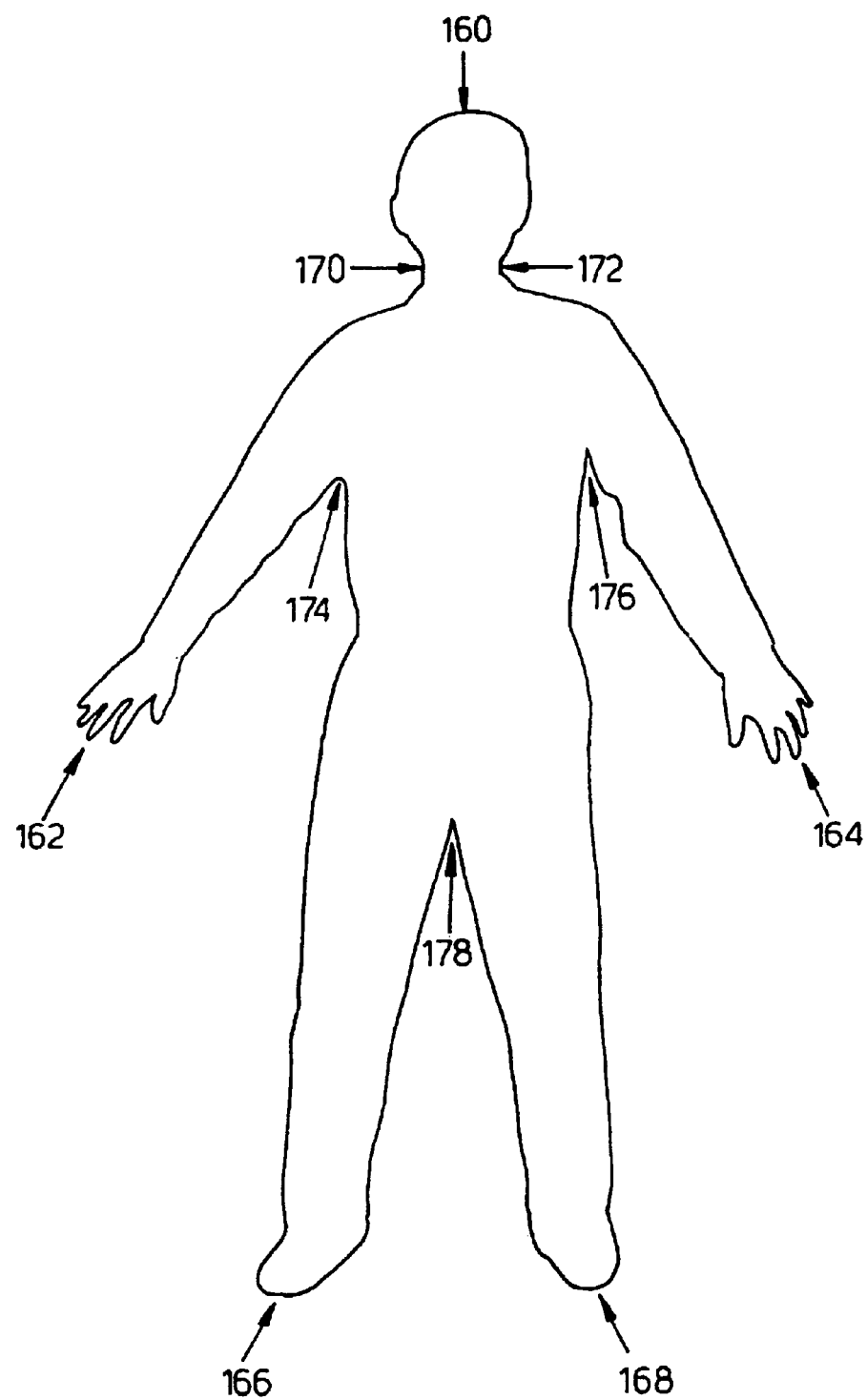

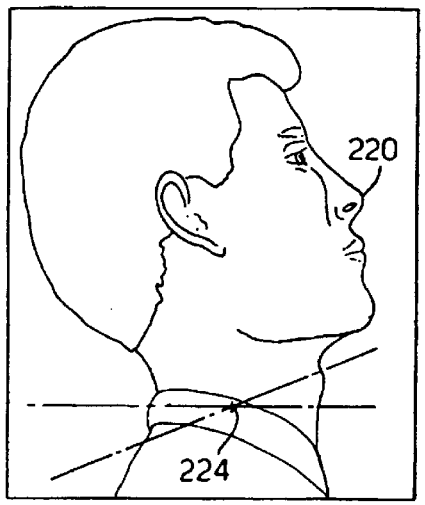
Fig.33.
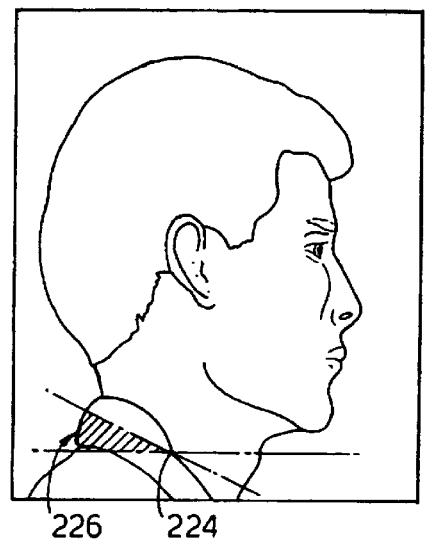
Fig.34.
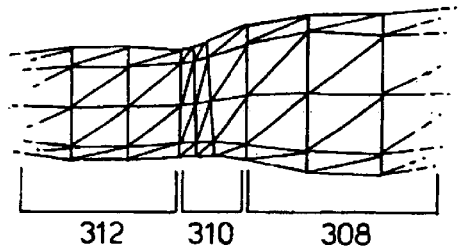
Fig.38.
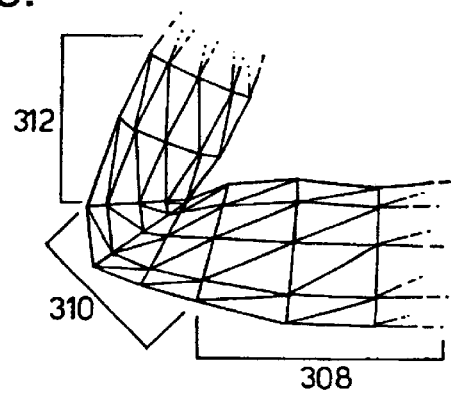

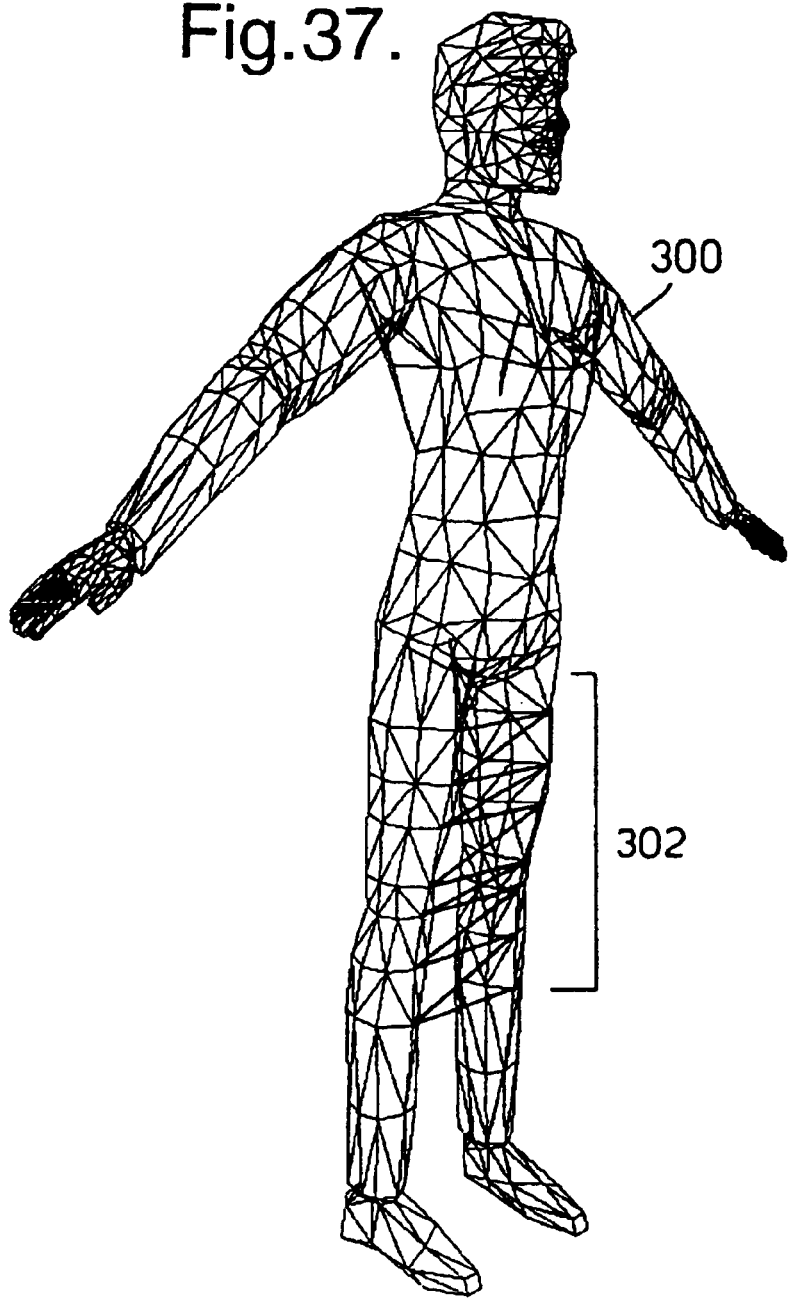

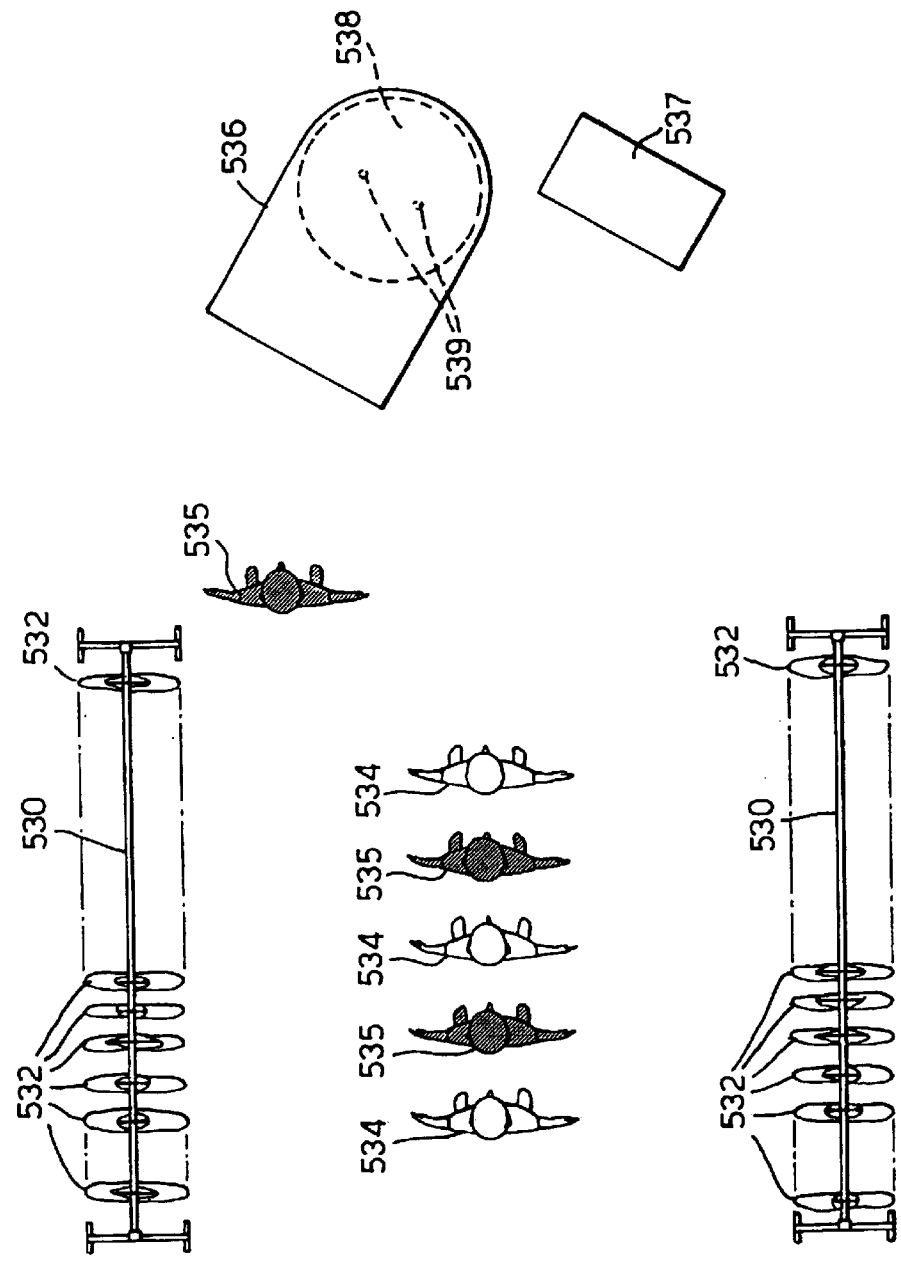

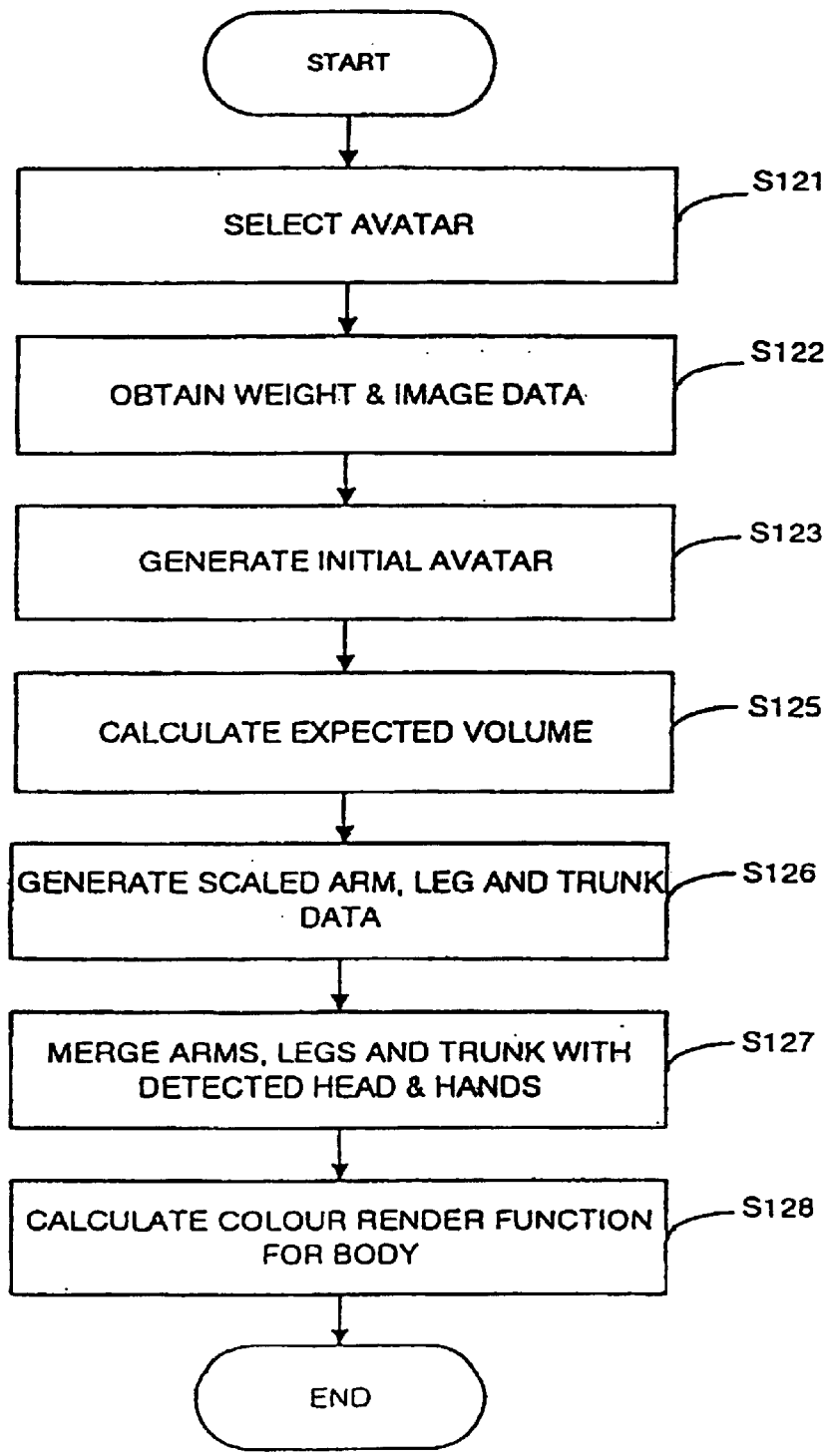

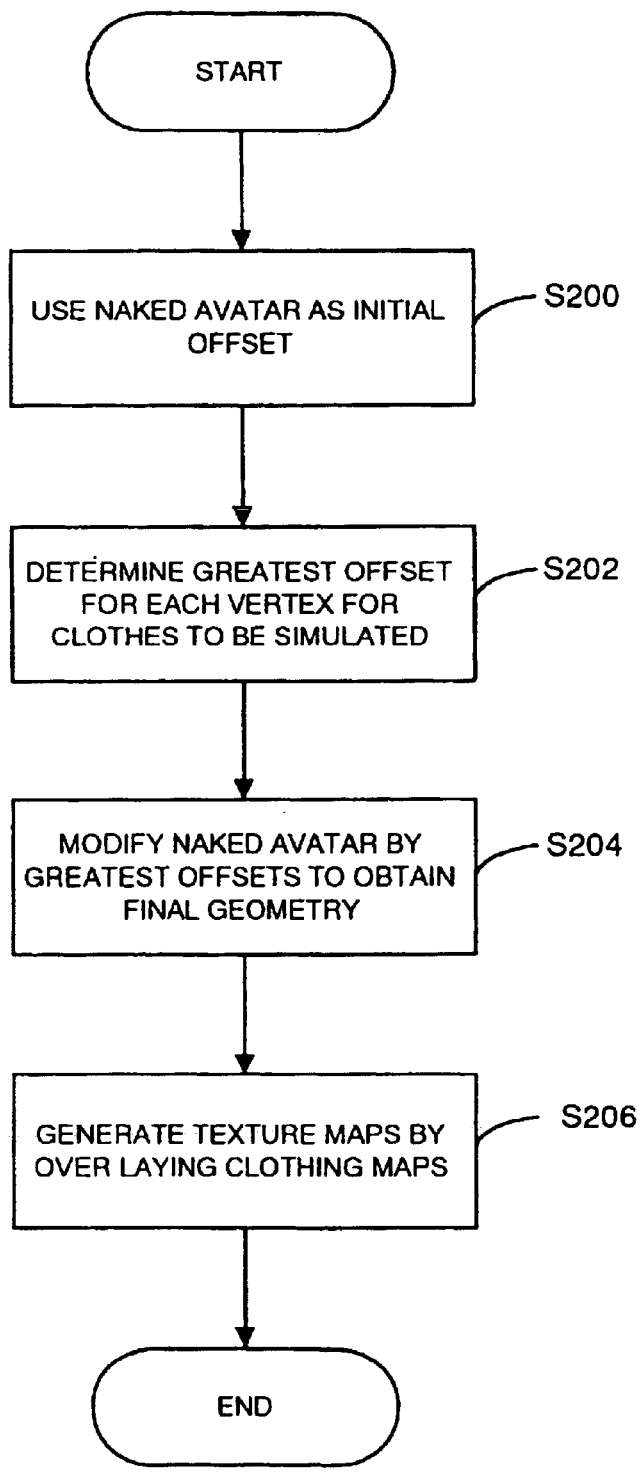

US 7,184,047 B1

METHOD AND APPARATUS FOR THE GENERATION OF COMPUTER GRAPHIC REPRESENTATIONS OF INDIVIDUALS

RELATED APPLICATION

This is a continuation-in-part of U.S. Ser. No. 09/338941 filed Jun. 24, 1999 which has been abandoned and which is a continuation-in-part of PCT/GB97/03515 filed Dec. 22, 1997.

FIELD OF THE INVENTION

The present invention concerns methods and apparatus for generating computer graphical representations of individuals. In particular, the present invention concerns the generation of texture rendered wire mesh computer models of individuals which can be used to generate representations of an individual in any of a number of different poses.

BACKGROUND TO THE INVENTION

Computer software applications frequently require users to have representations of themselves shown on a screen. The animation of a computer graphic representation is then used to illustrate the actions of that individual. At present such graphical representations are fixed by the application in use and all individuals either use the same representation or one selected from a very limited range of possible representations. However, the representations available often have little resemblance to the individuals that they are intended to represent.

It is possible to generate accurate three-dimensional models of individuals in a single pose using scanning apparatus such as the PERSONA scanner manufactured by 3D Scanners Limited and the whole body scanner developed by Cyberware Lab Inc.

However the three-dimensional computer models generated by such scanning apparatus are not particularly suitable for creating representations of an individual in any other pose, since the scanning apparatus are only arranged to obtain data indicative of the surface of an individual in a single pose, no data is obtained about the internal structure of an individual. It therefore is not possible to generate representations of an individual in another pose directly from such data.

The present invention aims to provide means by which computer models of individuals can be generated which may be used to generate computer graphical representations of individuals in different poses.

Embodiments of the present invention provide means by which animated sequences of computer graphical images can be generated which are indicative of the movement of an individual between a number of different poses.

Embodiments of the present invention also enable computer graphical representations of individuals within application software to more closely resemble the individual users than is possible at present.

SUMMARY OF THE INVENTION

In accordance with one aspect of the present invention there is provided an apparatus for generating computer models of individuals for generating representations of those individuals in any of a number of different poses comprising:

means for generating a plurality of images of a model of a person in a plurality of poses in accordance with animation instructions;

scanning means for obtaining scan data of an individual, representative of the external appearance of said individual in a pose;

determination means for determining the pose adopted by an individual scanned by said scanning means; and model generation means for generating a model on the basis of said comparison.

In a further aspect, the present invention aims to provide means by which computer models of individuals can be generated representative of those individuals in any of a number of different items of clothing.

In accordance with this aspect of the present invention there is provided a method of generating computer model representations of an individual in any of a plurality of items of clothing comprising the steps of:

determining the manner in which a plurality of items of clothing alter the shape and appearance of a model individual;

storing data representative of the determined alteration in shape and appearance for each of said plurality of items of clothing;

obtaining image data and weight data for an individual;

generating a computer model of said individual, representative of said individual being unclothed utilising said image data, weight data and a stored model of the manner in which the shape and appearance of an unclothed generic model individual varies with weight; and generating computer model representations of said individual wearing any of said plurality of items of clothing utilising said stored data and said generated computer model of said individual being unclothed.

Embodiments in accordance with this aspect of the present invention provide means by which individuals may view computer representations of themselves to aid their decisions to purchase items of clothing.

In a further aspect, the present invention provides an apparatus for obtaining orders for items of clothing comprising:

input means for obtaining image data and weight data for an individual;

selection means arranged to enable a user to select an item of clothing;

display means for displaying a generated computer model of an individual utilising image data and weight data input by said input means, said display means being arranged to generate and display computer models of individuals wearing items of clothing selected by said selection means; and purchase confirmation means for inputting an order for an item of clothing corresponding to a computer model displayed by said display means.

BRIEF DESCRIPTION OF THE DRAWINGS

Embodiments of the present invention will now be described with reference to the accompanying drawings, in which:

FIG. 22 is a flow diagram illustrating an overview of the steps involved in generating an avatar using image data captured by the cameras of the booth;

FIG. 26 is a representation of an outline generated from a silhouette corresponding to the example of FIG. 20 on which a number of landmark points are indicated;

FIGS. 33 and 34 are an illustrative example of head tilt correction;

FIG. 37 is an illustrative representation of a polygonal wire mesh of a generic model avatar;

FIG. 38 is a pair of illustrations showing the deformation of a part of a wire mesh to account for the stretching of skin about a joint;

FIG. 62 is a plan view of a garment processing system of FIG. 61;

FIG. 68 is a flow diagram illustrating the processing of data in the booth of FIG. 59;

FIG. 70 is a flow diagram of the generation of a clothed representation of an individual from a model of the individual without clothes and a clothes record.

DETAILED DESCRIPTION OF THE PREFERRED EMBODIMENTS

First Embodiment

Figure 1:
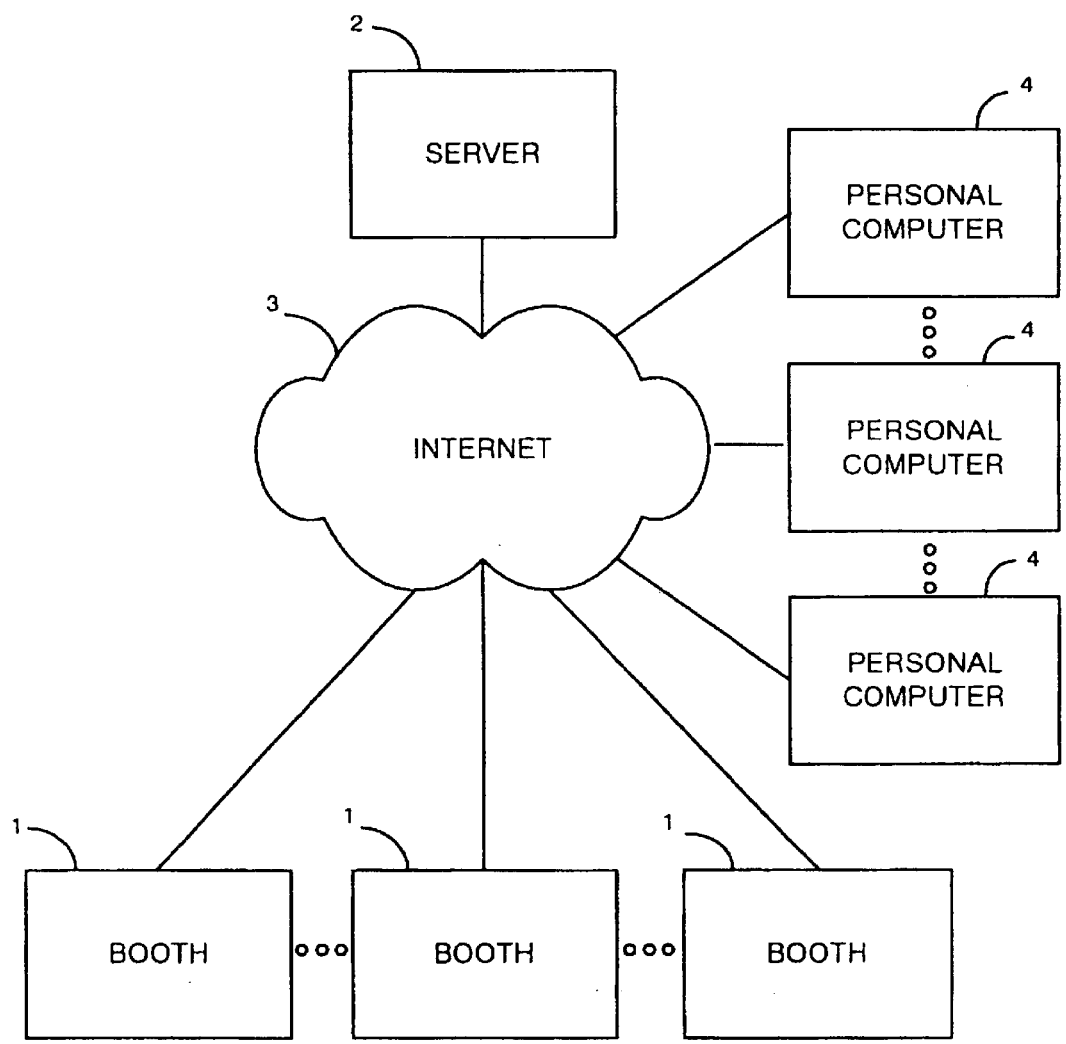
FIG. 1 is a block diagram of apparatus for creating and animating three-dimensional models representing individuals in accordance with a first embodiment of the present invention.

FIG. 1 is a block diagram of apparatus for creating and animating three-dimensional models of individuals to generate sequences of images representing individuals in motion in accordance with a first embodiment of the present invention.

In this embodiment, the apparatus comprises a plurality of booths 1 which are connected to a server 2 via the Internet 3. The server is also connected to a plurality of personal computers 4 via the Internet 3.

As will be described in detail below in accordance with the present invention image data of the external appearance of individuals are captured using the booths 1. Captured image data is then processed to generate three-dimensional model representations of those individuals which can be used to generate images representative of the individuals in various different poses or stances. This three-dimensional model which can be used to generate images of a person in a number of different poses, (hereinafter referred to as 'an avatar') is then transmitted from the booth 1 to the server 2 via the Internet 3 and is then stored in the server 2.

When a user then wishes to use an avatar, the data stored in the server representative of an avatar is downloaded from the server 2 via the Internet 3 into a personal computer 4 having application software stored therein (not shown). The application software then causes the generation of a series of animation instructions which are utilised together with the avatar data to cause the generation of representations of an individual in a plurality of poses or stances. By displaying consecutive sequences of images of an individual in a number of different poses the impression of an animated computer model of an individual is then created.

Physical Structure of Booth (a) Construction of Booth

Figure 2:
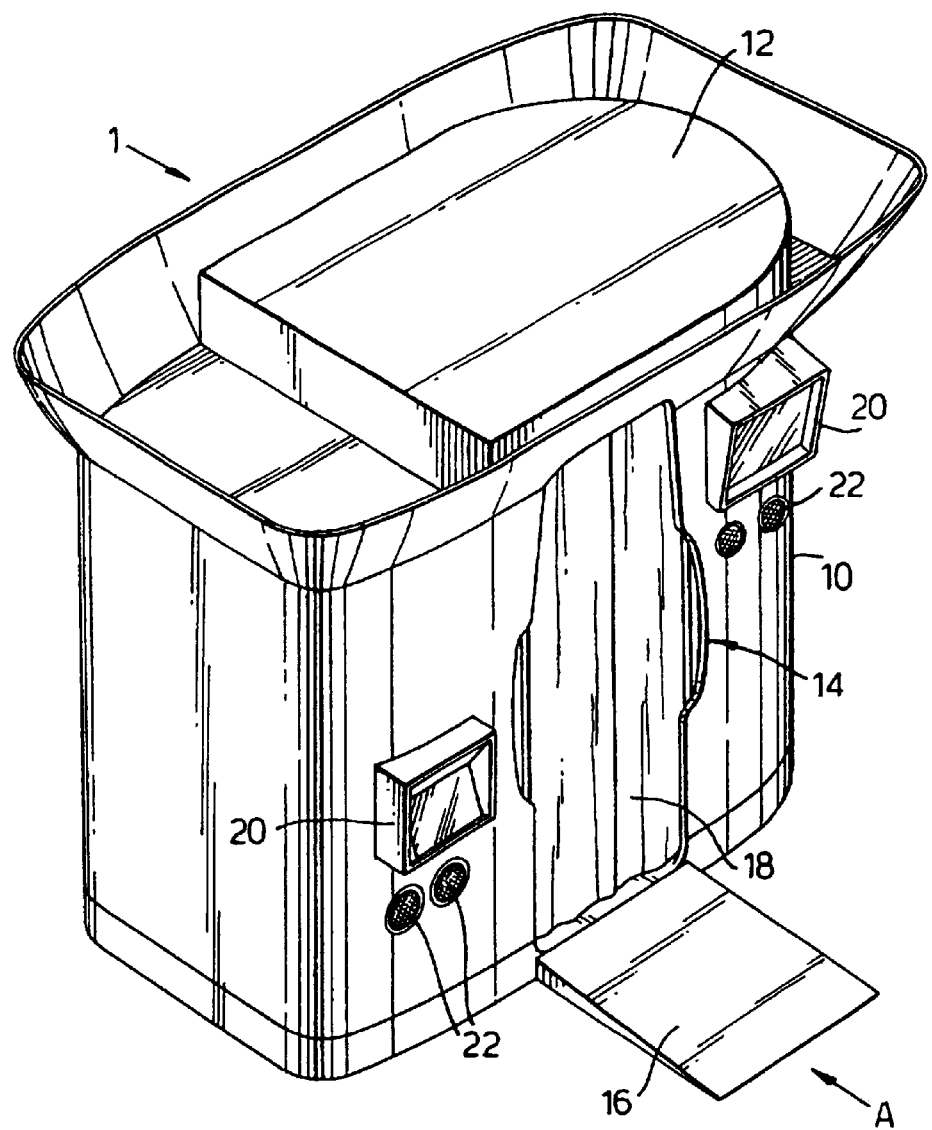
FIG. 2 is a perspective view of the exterior of a booth of FIG. 1.

FIG. 2 is a schematic diagram of the external appearance of a booth 1. The booth 1 comprises an exterior wall 10 that defines the perimeter of the booth 1. On top of the exterior wall 10 is a roof 12 enclosing the top of the booth 1. The exterior wall 10 and the roof 12 are made from a light rigid fire resistant material such as pressed aluminium, fibreglass or MDF. In this embodiment of the present invention the exterior wall 10 and roof 12 are arranged to enclose an area of approximately 2.9 m long by 1.7 m wide by 2.5 m high.

In part of the exterior wall 10 in a central section of one of the longer sides of the booth there is provided a doorway 14 which allows access by a user into the interior of the booth 1. The doorway 14 is slightly raised from the ground and a ramp 16 is provided which allows access to the doorway 14. The doorway 14 is covered by a curtain 18 that is arranged to minimise the amount of light entering the interior of the booth 1 via the doorway 14.

Mounted on the exterior wall 10 are a pair of external display screens 20 and pairs of external speakers 22. The external display screen 20 and the speakers 22 are used to attract users into the booth 1, provide instructions on how to use the booth, and also to display avatars generated using the booth 1, as will be explained in detail later.

Figure 3:
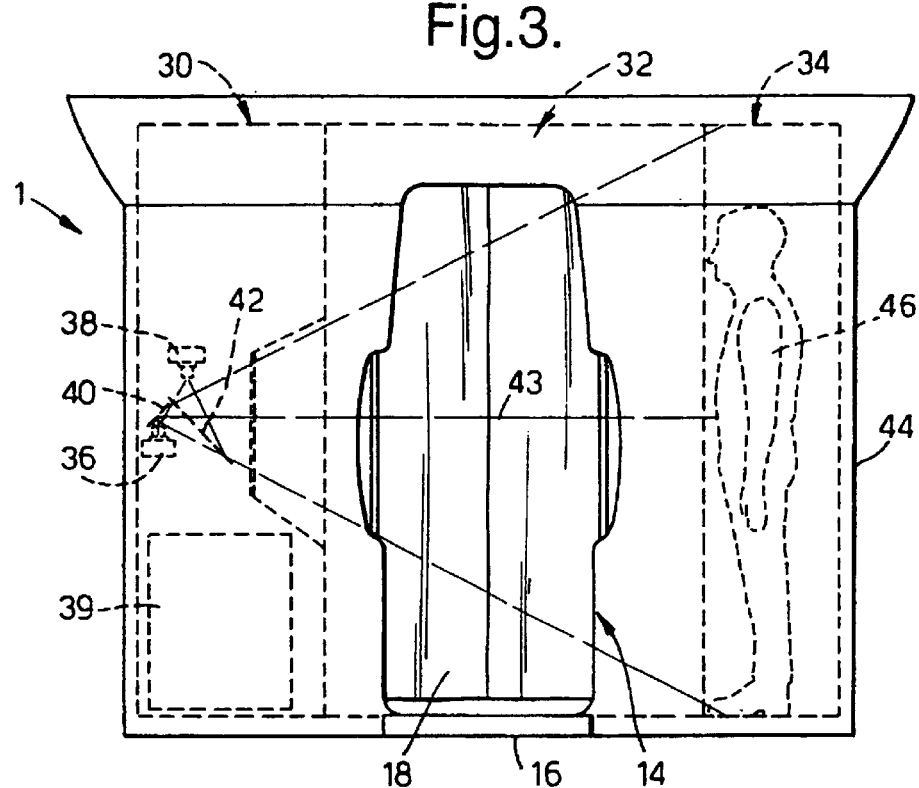
FIG. 3 is a view of the booth of FIG. 2 as seen from direction indicated by arrow A in FIG. 2.

The physical structure of the booth will now be described in detail with reference to FIG. 3 which is a diagrammatic view of the booth 1 seen from the direction indicated by arrow A in FIG. 2, and FIG. 4 which is a plan view of the interior of the booth 1.

The booth 1 comprises three sections 30, 32, 34. The first section 30, at the one end of the booth houses a pair of digital cameras 36, 38 such as a Fuji DS330 or a Kodak DCS560 and a control system 39 and an arrangement of mirrors 40,42. The digital cameras 36, 38 are arranged with their optical axis 43 directed towards the arrangement of mirrors 40, 42 so that the digital cameras 36, 38 are arranged to obtain substantially identical images of the interior of the booth 1 remote from the digital cameras 36,38 with the optical axis 43 aligned with the centre of the booth 1 as will be described in detail below. In the far section of the booth 1 remote from the digital cameras 36,38 there is provided a light box 44 for lighting from above, below and behind an individual 46 of whom image data is to be obtained using the digital cameras 36,38. The central section 32 of the booth 1 between the first section 30 and the far section 34 provides a floor space which enables a user to access the light box 44 after entering the booth via the ramp 16 and doorway 18. The central section 32 of the booth 1 also acts to separate the digital cameras 36,38 from the light box 44 so that the digital cameras 36,38 can obtain image data of the entirety of an individual 46 standing in the light box 44 using a square lens to avoid optical distortion of an image resulting from the use of a wide angle lens.

The control system 39 of the booth 1 is arranged to direct an individual 46 who enters the booth by means of oral and visual instructions to adopt four predefined poses standing in an identified position within the light box 44 at the far end of the booth 34. When an individual has adopted a required pose within the light box 44 the control system 39 then causes the digital cameras 36, 38 to obtain images of the individual 46 in that pose. The control system 39 then uses the obtained image data for the different poses as the basis for generating an avatar for that individual as will be described in detail later.

FIGS. 5, 6, 7 and 8 illustrate an individual posing within the light box 44 in the four required poses in accordance with this embodiment of the present invention.

Figure 5:
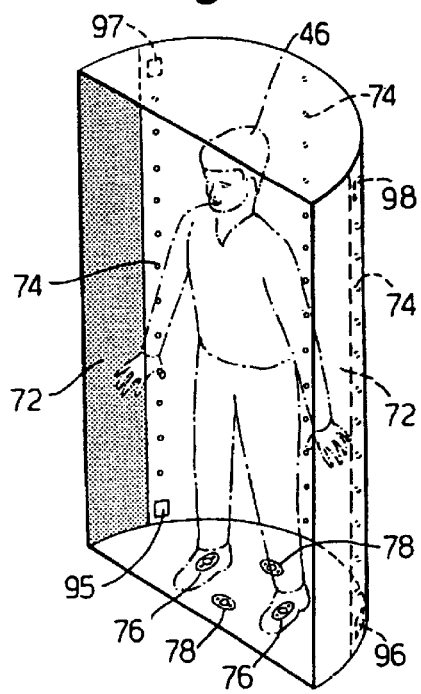
FIGS. 5, 6, 7 and 8 are schematic diagrams illustrating a user adopting four poses within the light box of a booth.

In the first pose as is shown in FIG. 5 an individual 46 is required to pose with his feet apart facing the digital cameras 36,38 arms outstretched with the backs of his hands facing the camera and the fingers spread out.

Figure 6:
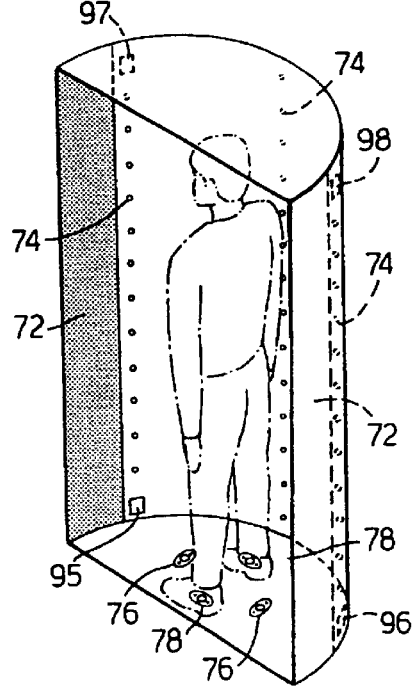

In the second pose as is shown in FIG. 6 the individual 46 is required to pose facing the side of the light box with his feet apart and his arms against his sides with the palms of the hands turned inwards.

Figure 7:
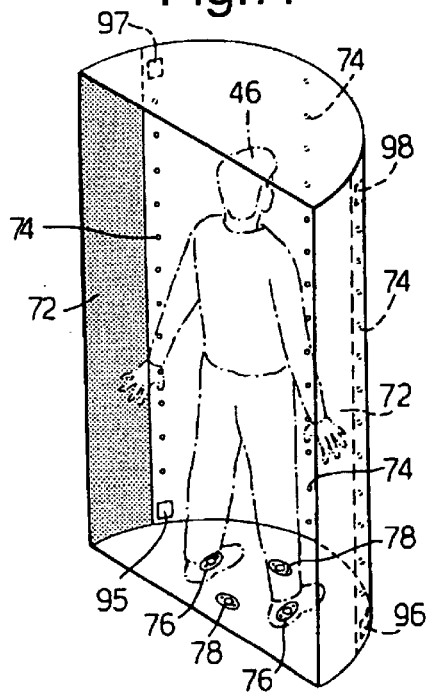

In the third pose as is shown in FIG. 7 the user is required to pose facing away from the camera with his feet apart, arms outstretched with the palms of his hands facing the camera and the fingers spread out.

Figure 8:
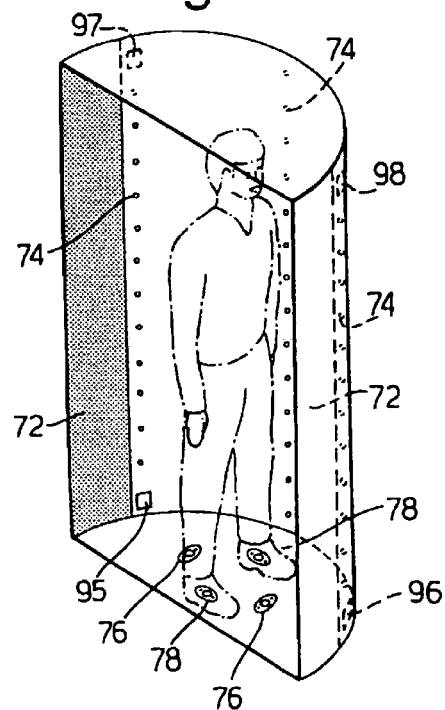

In the fourth and final pose as is shown in FIG. 7 the user 46 is required to pose with his feet apart facing the opposite wall to the wall faced in FIG. 8 with his arms against his sides with the palms of the hands against his legs.

As will be described in detail later the user 46 is instructed to adopt these specific poses at identified positions within the light box 44 by means of oral and visual instructions and the use of indicator lights in order that image data captured by the digital cameras 36, 38 can be processed by the control system to generate an avatar.

Returning to FIGS. 3 and 4, the digital cameras 36, 38 and the control system 39 are provided behind a door 50 that is attached by a hinge 52 which enables the door 50 to be opened to allow access to the digital cameras 36, 38 and the control system 39. Also provided behind the door 50 located above and connected to the control system 38 are a number of input and output apparatus 53 for inputting instructions into the control system 39 and outputting instructions to a user within the booth 1 which will be described later. A window 54 is provided in the portion of the door 50 that is in front of the mirror arrangement 40,42 so that the cameras view of the far end 34 of the booth 1 remote from the mirrors 40,42 is not obscured. The digital cameras 36,38 and mirror arrangement 40,42 being such as to aim the cameras to view the light box 44 along the optical axis 43 passing through the middle of the booth 1.

Four flash lights 56 are provided inside the booth 1 in the first section 30 of the booth 1, one pair of flash lights being provided inside the booth adjacent to the exterior wall 10 next to the doorway 14, with another pair being provided adjacent to the exterior wall 10 opposite to the doorway 14. Both pairs of flashlights 56 are positioned behind frosted panels 57 to diffuse the light generated by the flash lights. The flashlights 56 are arranged in these positions either side of the camera 36,38 so that when they are operated the flash lights 56 uniformly illuminate the interior of the booth 1 and in particular the front of the light box 44. In order to ensure that the light from the flash lights 56 is as uniform as possible the interior of the booth 1 and the curtain 18 are darkly coloured so as to reduce the amount of light which is reflected from the interior of the booth 1 and the curtain 18.

(b) Construction of the Light Box

Figure 4:
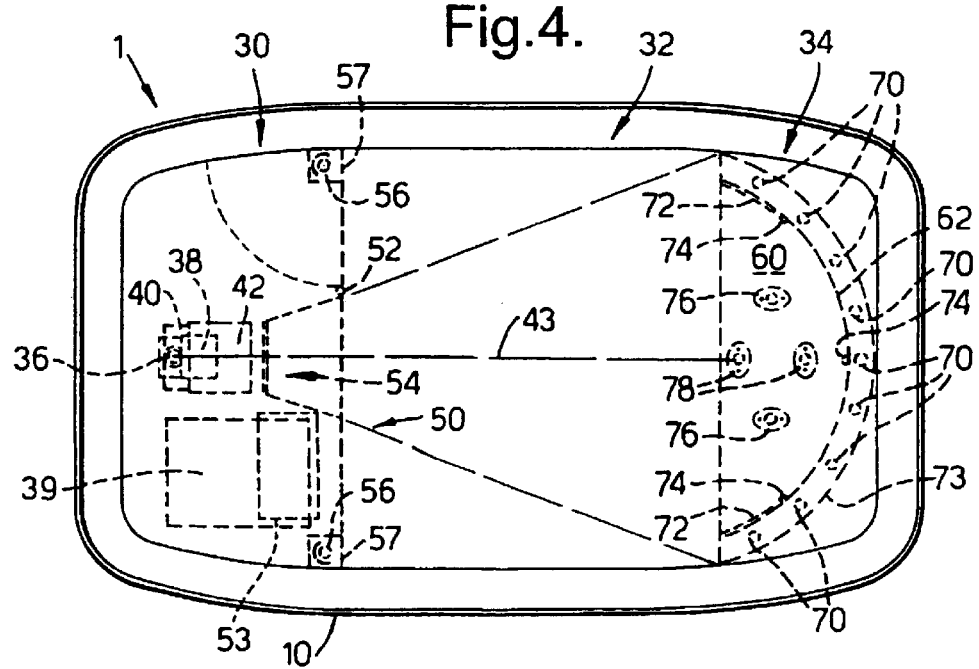
FIG. 4 is a plan view of the booth of FIG. 2.

The light box 44 at the far end 34 of the booth remote from the cameras 36,38 is defined by a floor 60, a curved wall 62 and roof (not shown in FIG. 4). Provided behind the wall 62 beneath the floor 60 and within the roof are a number of fluorescent lights 70 arranged to illuminate the wall 62, floor 60 and roof of the light box. The wall 62 of the light box 44 comprises a frosted translucent flexible material such as a 6 mm panel of opaline. The plurality of fluorescent lights 70 are placed 75 mm behind the wall 62 and arranged behind the wall 62 so as to illuminate the wall 62 with a uniform light. The translucent wall 62 and the fluorescent lights 70 are such as to ensure that the uniform light within the light box 44 is of between about 200 and 400 lux. A forward portion 72 of the wall 62, closest to the cameras are covered by a black material to prevent the forward portion of the light box from being illuminated by the fluorescent lights 70 behind the wall 62.

By providing a light box 44 having a curved back wall 62 the problems of uniformly illuminating the corners of a square box are thereby avoided and the surface area which is required to be lit is minimised thus reducing the required number of fluorescent lights 70. The number and power of the lights 70 is also minimised by covering the interior of the exterior wall 10, behind the wall 62 with a reflective material 73 to direct light from the fluorescent lights 70 into the light box 44.

Provided within the wall 62 adjacent to the blacked out portions and in the middle of the wall 62 directly opposite to the cameras 36,38 are three strips 74 of LEDs for directing an individual to adopt a correct pose as will be described in detail later.

Provided on the surface of the floor 60 are a first 76 and a second 78 pair of foot position indicators. The foot position indicators 76,78 comprise markers and foot lights to highlight the position an individual's feet should be placed when adopting a requested pose in the light box 44.

The first pair of foot position indicators 76, are provided towards the front of the light box 44 either side of a line passing through the middle of the booth 1 of a distance of about 460 mm apart. The first pair of foot position indicators 76 are provided at this position so that when an individual places his feet on the indicators the forward portion of the individual closest to the camera protrudes in front of the blacked out portion 72 of the wall 62 and so is not illuminated by the lights 70. The first pair of foot position indicators are provided either side of the centre of the booth 1 so that an image of the individual obtained by the cameras 36,38 is centred on the individual. By providing foot indicators 76, about 460 mm apart a means is provided to instruct a user to adopt a pose as is illustrated in FIGS. 5 and 7 in which the users legs are sufficiently separated so that a defined crotch is apparent in an image of the user taken by the cameras 36,38.

The second pair of foot indicators 78 are provided towards the front of the light box 44, along the line passing through the centre of the booth 1 with one foot indicator closer to the cameras 36,38 and the other about 400 mm further away from the cameras 36,38. In this way, when an individual places his feet on the indicators 78 the forward portion of the individual closer to the cameras 36,38 protrudes in front of the blacked out portion 72 of the wall 62 and is not illuminated by the lights 70 and an image taken of the individual by the cameras 36,38 is centred on the individual. By ensuring that the pair of foot indicators 78 are about 400 mm apart a means is provided to ensure that in the images of an individual standing on the foot indicators 78 taken by the camera 36,38 the individual's foot further from the cameras 36,38 appears separated from the individual's foot closer to the camera.

Figure 9:
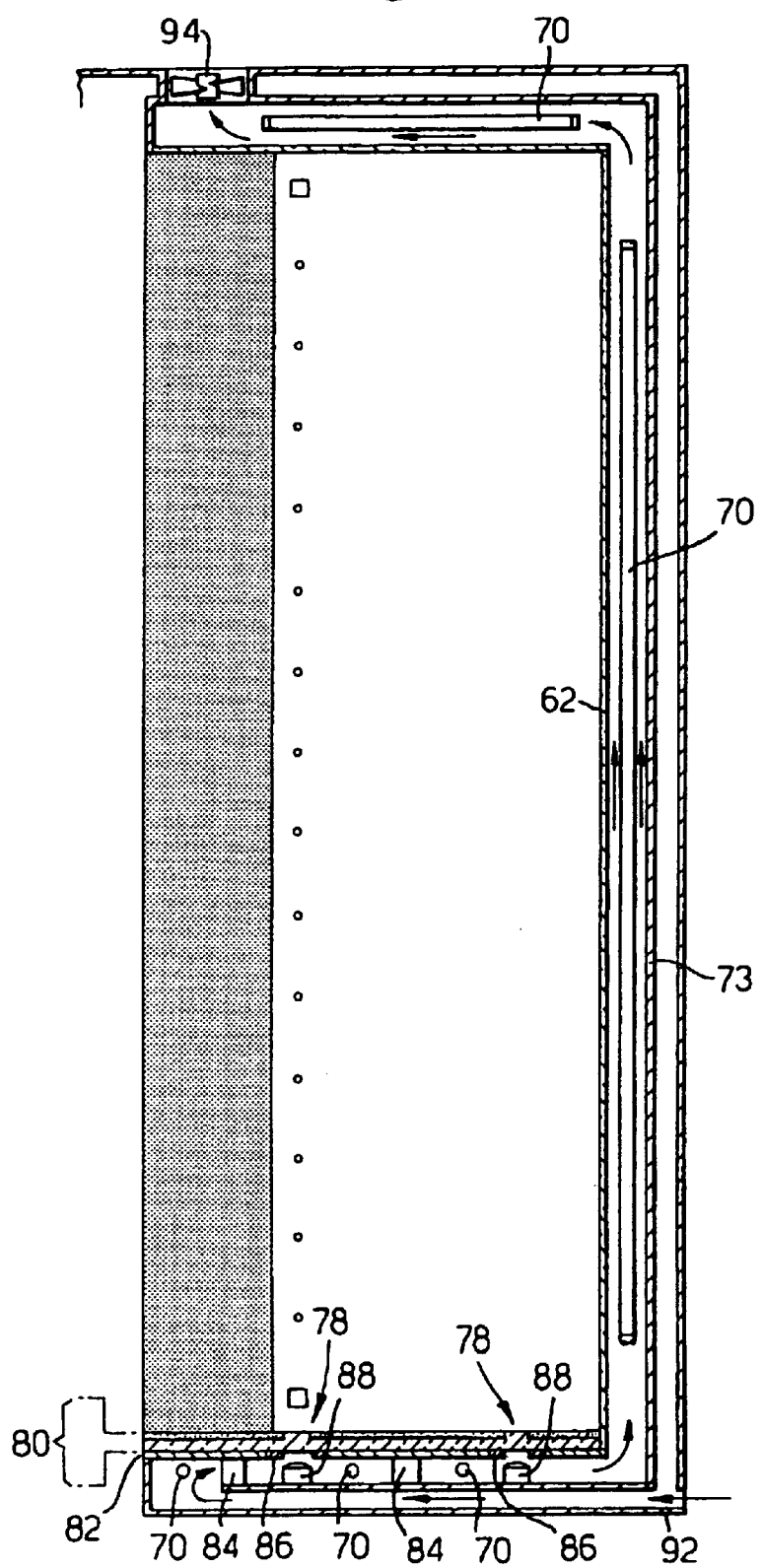
FIG. 9 is a cross-section of the light box of the booth along the centre of the booth.

FIG. 9 is a schematic diagram of a cross section of the light box 44 as taken along the line 43 in FIG. 4. As is shown in FIG. 9 the floor 60 of the light box 44 comprises a first layer 80 and a second layer 82. Beneath the floor 60 there are provided a number of fluorescent lights 70 for illuminating the surface of the floor 60. The first and second layers 80, 82 are supported above the fluorescent lights 70 by a number of spacers 84, made from a transparent material.

It is necessary that the floor 60 is sufficiently strong so as not to deform when an individual stands on the floor 60 and is also required to be uniformly illuminated by the fluorescent lights 70. In this embodiment this is achieved by having a first layer 80 that is made from a strong clear material that will not deform under the weight of an individual and a second layer 82 comprising a diffusion layer for diffusing the light from the fluorescent lights 70. A suitable material for the first layer 80 would be an 8 mm thick sheet of polycarbonate plastic. A suitable material for the second layer 82 would be a 4mm thick layer of opaline. By providing a clear first layer the maximum amount of diffused light from the fluorescent light 70 beneath the second layer 80 is able to reach the surface of the floor 60 of the light box 44. By providing a strong first layer 80 above the diffusing second layer the choice of material for the second layer is increased as it is no longer necessary to provide a strong material for diffusing the light from the fluorescent lights 70. By providing spacers 84 made from a transparent material, substantially uniform illumination of the floor 60 by the fluorescent lights 70 can be achieved.

In order to minimise the reflections of the feet of a user standing within the booth on the surface of the floor 60, it is necessary to render the upper surface of the floor non-reflective. In this embodiment this is achieved by treating the upper surface of the first layer 80 with a frosting process across its entire surface except where the foot indicators 76 and 78 are provided.

Provided on the surface of the second layer 82 of the floor 60 are transfers 86 marking the outline of feet to indicate where a user's feet are to be placed. As these transfers 86 are provided on the second layer 82 they are protected from wear by the first layer 80. Inside the outline made by the transfers 86 holes are provided in the second layer 82 through which indicator lights 88 protrude. In this way by providing transfers indicating where a user should place their feet and by providing indicator lights which can be lit to indicate which of the pair of foot indicators 76,78 should be used a user can be instructed exactly where to place their feet when an image is to be obtained by the digital cameras 36,38 as will be described later. By leaving the surface of the first layer 80 clear at the positions of the foot indicators 76,78 the transfers 86 and lights 88 remain clearly visible to users, whilst being protected against damage by the first layer 80.

The roof of the light box 88 comprises a further light diffusing layer 90 such as a 4 mm thick opaline sheet behind which are provided further fluorescent lights 70 for illuminating the light box 44. The space beneath the floor 60, behind the back wall 62 and within the roof 88 are arranged so as to communicate with each other to form a single chamber. An air duct 92 is provided at the rear of the booth to introduce air into the space beneath the floor 60 of the light box 44 and a number of fans 94 are provided in the upper surface of the roof to extract air from behind the light diffusing layer 90. The effect of heating by the lights 70 within the light box 44 is then minimised by drawing air from outside the booth via the duct 92 through beneath the floor 60 up behind the back wall 62 into the roof cavity and out of the booth by the fans 94.

(c) Camera Mountings

Figure 10:
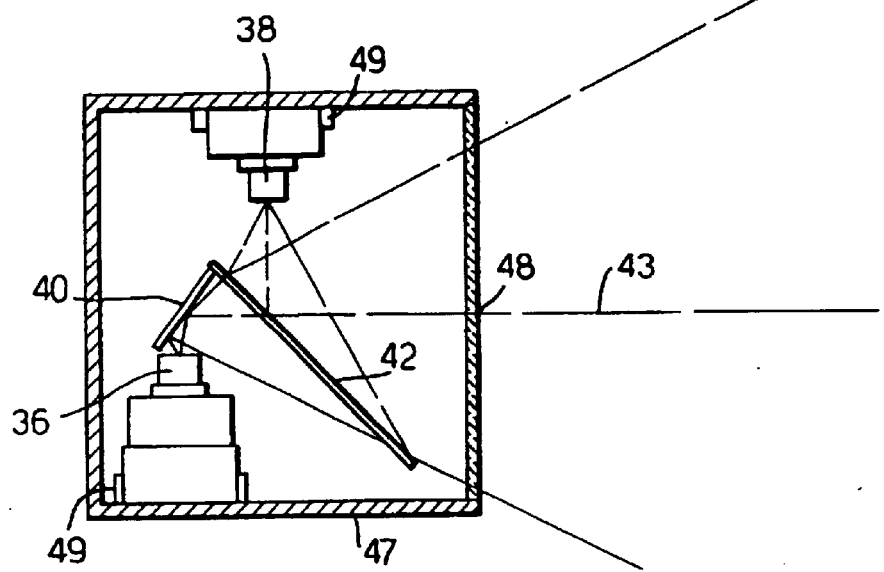
FIG. 10 is a cross-sectional view of the mounting of digital cameras.

FIG. 10 is a cross-sectional view of the mounting of the digital cameras 36,38 and the arrangement of mirrors 40,42. The digital cameras 36,38 and the arrangement of mirrors 40,42 are mounted within a light proof box 47 open at the end closest to the light box 44. The open end of the light proof box 47 is covered by a glass plate 48 treated with an anti-reflection coating so as to render the glass non-reflective on the inside of the box 47.

The light proof box 47 acts to prevent the digital cameras 36,38 from obtaining image data from anything other than the view through the glass plate 48. By being within an enclosed box 47,48 the digital cameras 36,38 and mirror arrangement 40,42 are prevented from being contaminated by dust from outside the box 47,48.

The digital cameras 36,38 are mounted on opposite walls of the light box 47 adjacent to the glass plate 48 held in place by adjustable fixings 49 which hold the digital cameras 36,38 in place and enable the orientation of the digital cameras to be adjusted until they are both orientated with their optical axes directed towards the middle of the box 47,48. The mirror arrangement 40,42 comprising a front silvered mirror 40 and a partially front silvered mirror 42, such as a half front silvered mirror is mounted within box 47,48 in the middle of the box 47,48 with the front silvered mirror 40 arranged at an angle of 45° to the optical axis of the first digital camera 36 and the partially front silvered mirror 42 arranged between the front silvered mirror 40 and the glass plate 48 at an angle of 45° to the optical axis of the second digital camera 38. By providing front silvered 40 and partially front silvered mirrors 42 the images which the digital cameras 36,38 obtain are obtained by reflection only without any double reflections as would be obtained using a rear silvered mirror so that the distortion of the image is minimised. The arrangement of mirrors is such that light passing from the glass plate 48 is reflected from the partially silvered mirror 42 onto the second digital camera 38, and light which is not reflected by the partially silvered mirror 42 passes through the partially silvered mirror 42 and on to the front silvered mirror 40 by which it is reflected on to the first digital camera 36.

In this way by providing a mirror arrangement 40,42 the digital cameras 36,38 are presented with a substantially identical view of light coming in through the glass front 48. The mirror arrangement 40,42 within the box 47 also acts to maximise the effective optical distance of the cameras 36,38 from the light box 44 in the far section 34 of the booth. Thus reducing the required size of the central section 32 of the booth.

Additionally when the booth 1 is initially set up in images of the interior of the booth are obtained using the digital cameras 36,38. In order to ensure that the images obtained by the digital cameras 36,38 are as far as possible aligned with each other the images of the booth 1 are then used to determine how the adjustable fixings 49 on which the cameras 36,38 are mounted are altered to change the orientation of the cameras until the images obtained by the two cameras 36,38 are as far as possible aligned.

(d) Booth Interior

Figure 11:
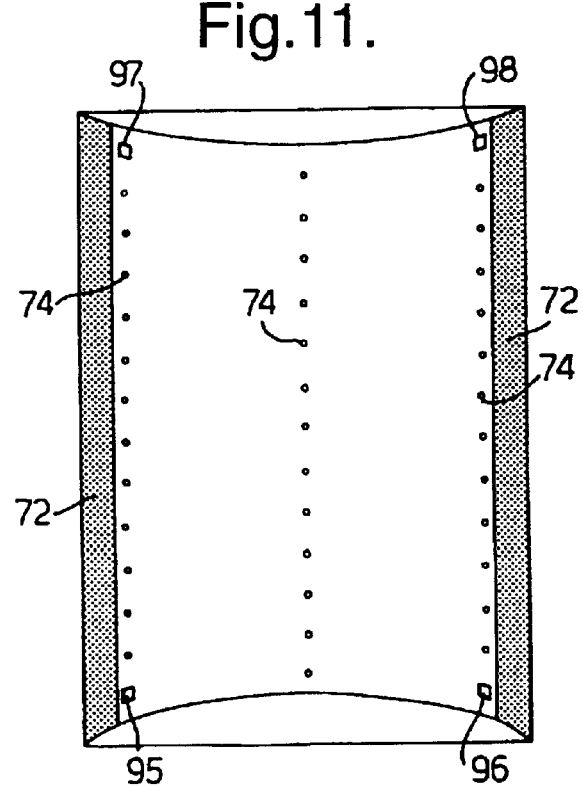
FIG. 11 is a diagrammatic representation of the view of the light box of the booth as seen from the perspective of the digital cameras.

FIG. 11 is a schematic diagram of the view of the light box 44 as seen by the digital cameras 36,38 in the absence of an individual standing within the light box 44. From the view point of the digital cameras 36, 38 the rear wall 62 provides a uniformly bright back drop for obtaining image data of an individual standing on the foot position indicators 76,78. The front portion 72 of the back wall 62 at the front of the light box closest to the cameras appears dark as no light from the fluorescent lights 70 passes through the blacked out portions 72 of the wall 62. Adjacent to the blacked out 72 portions of the back wall 62 are strips 74 of LEDs for informing a user where to look when posing. A further strip 74 of LEDs is provided in the centre of the back wall 62.

Also provided on the surface of the back wall 62 are four alignment markers 95–98 placed on the wall 62 in known positions relative to the foot positioning markers 76,78 in a plane level to where an individual will stand. By providing alignment markers 95–98 at known positions in the same plane level to where an individual will stand scaling information for an image of an individual standing on the foot markers 76,78 is provided, since the apparent height of an individual in an image to the individual's actual height will be proportional to the apparent distances between the representations of the alignment markers 95–98 relative to the known actual distances. This scaling information is then used to generate an avatar for that individual as is described later.

Figure 12:
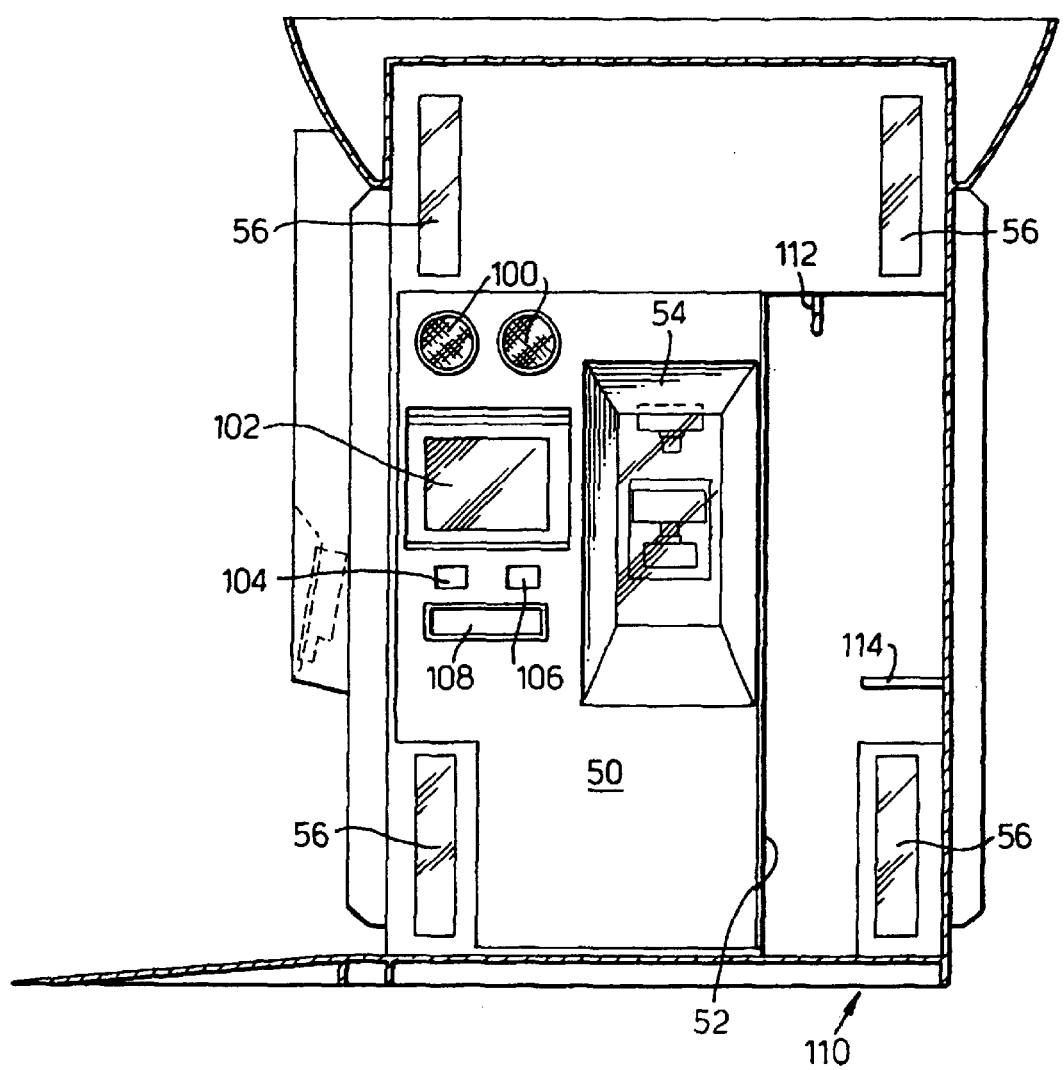
FIG. 12 is a view of the interior of the booth as seen from the perspective of an individual standing in the light box of the booth.

FIG. 12 is a view of the interior of the booth as seen from an individual standing within the light box 44 looking towards the digital cameras 36,38. As seen from this view the interior of the booth is flanked at either side by two parts of flash lights 56 for illuminating the interior of the booth 1. In the centre of the booth between the flash lights 56 there is the window 54 through which the digital cameras 36,38 obtain their image. To the left of the window 54 there is mounted apparatus 53 for inputting instructions into the control system 39 and outputting instructions to a user, comprising in this embodiment a pair of speakers 100, a touch screen display 102, a credit card reader 104, a bank note reader 106 and a card printer 108. The speakers 100 and touch screen display are arranged to instruct a user orally and visually on how to use the booth. The bank note reader 104 and the credit card reader 106 are arranged to receive payment for use of the booth. The card printer 108 is arranged to print out cards displaying a password for retrieval of a generated avatar as will be described in detail later.

To the right of the window 54 as seen from the light box 44 there is an alcove 110 having a hook 112 for hanging up a coat and a shelf 114 for placing objects which have been brought into the booth. By providing an alcove 110 which is provided in a portion of the booth which is not visible to the digital cameras 36, 38 through the window 54 a means is provided for storing excess clothing, bags and the like which may be brought into the booth 1 by an individual prior to posing so that they can pose in the light box 44 unencumbered without these items they have brought into the booth effecting the images obtained by the digital cameras 36,38 and without these items blocking the camera's field of view.

Control System

Figure 13:
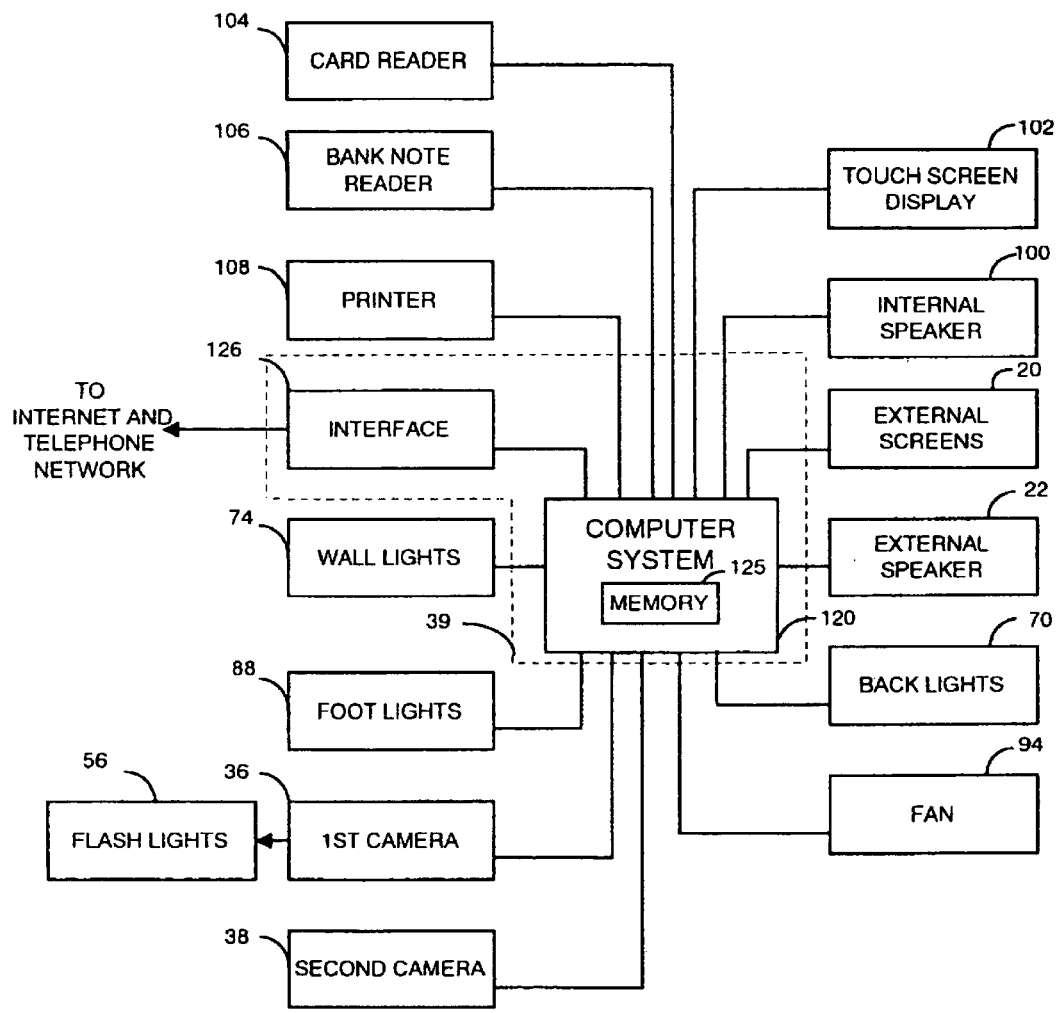
FIG. 13 is a block diagram of the control system of the booth of FIG. 2.

FIG. 13 is a block diagram of the control system 39 of the booth 1. The control system 39 comprises a computer 120 having a memory 125. The computer is connected to the Internet and the telephone network (not shown in FIG. 13) via an interface 126. The computer 120 is also connected to the card reader 104, the bank note reader 106, the touch screen display 102, the internal speakers 100, the external screen 20, the external speakers 22, the fluorescent lights 70, the fans 94, the first and second digital cameras 36,38, the foot light indicators 88, the strips of LEDs 74 and the card printer 108. The computer 120 is also indirectly connected to the flash lights 56 via the first digital camera 36.

The computer 120 is arranged to receive signals from the card reader 104 and the bank note reader 106 indicating whether payment has been made using either the card reader 104 or the bank note reader 106 and to receive input instructions input using the touch screen display 102. The computer 120 processes the received signals in accordance with programs in the memory 125 and then instructs a user on how to use the booth and the poses to be adopted via the internal speaker 100, the touch screen display 102, and by illuminating appropriate foot lights 70 and wall lights 78 as will be explained in detail below.

The computer 120 is also arranged to coordinate the switching on of the fluorescent lights 70 and fan 94 when the booth 1 is initially turned on and also coordinate the obtaining of image data by the camera 36,38 and the subsequent processing of that image data as will also be explained in detail below.

Figure 14:
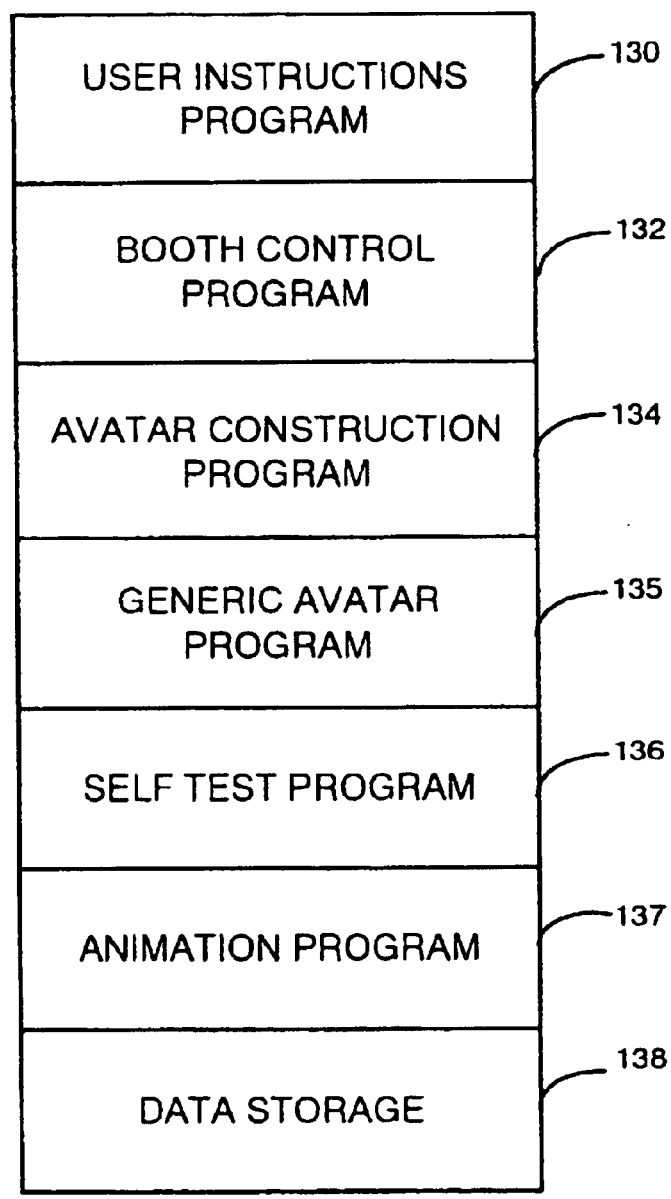
FIG. 14 is a block diagram of the contents of the memory of the control system of FIG. 13.

FIG. 14 is a block diagram of the content of the memory 125 of the computer system 120. Stored within the memory 125 of the computer system are a user instruction program 130 which is a program arranged to cause images to be displayed on the touch screen display 102 and the external screen 20 and sound to be transmitted through the internal and external speakers 100,22; a booth control program 132 which is a program for coordinating the output of the touch screen display 120 the internal speaker 100, the wall lights 74 and foot lights 70 to ensure that a user adopts the correct pose within the light box 44 prior to activating the digital cameras 36, 38 and the flash 56 to obtain image data; an avatar construction program 134 which is a program for generating an avatar of an individual from received image data; a generic avatar program 135 which is a program for generating a three-dimensional polygonal wire mesh model of a computer representation of a generic person which can be used to generate representations of that generic person in different stances in accordance with animation instructions; a self-test program 136 which is a program for switching on the fluorescent lights 70 and fan 90 when the booth is initially activated and for testing whether the booth is operating properly; and an animation program 137 for adapting and displaying an animation sequence using a newly created avatar. A portion 138 of the memory 125 is also left available for the storage of data.

The processing of the computer system 120 and the steps involved in the generation of an avatar using the booth 1 will now be described with reference to FIGS. 15 to 40.

Self Test Program

Figure 15:
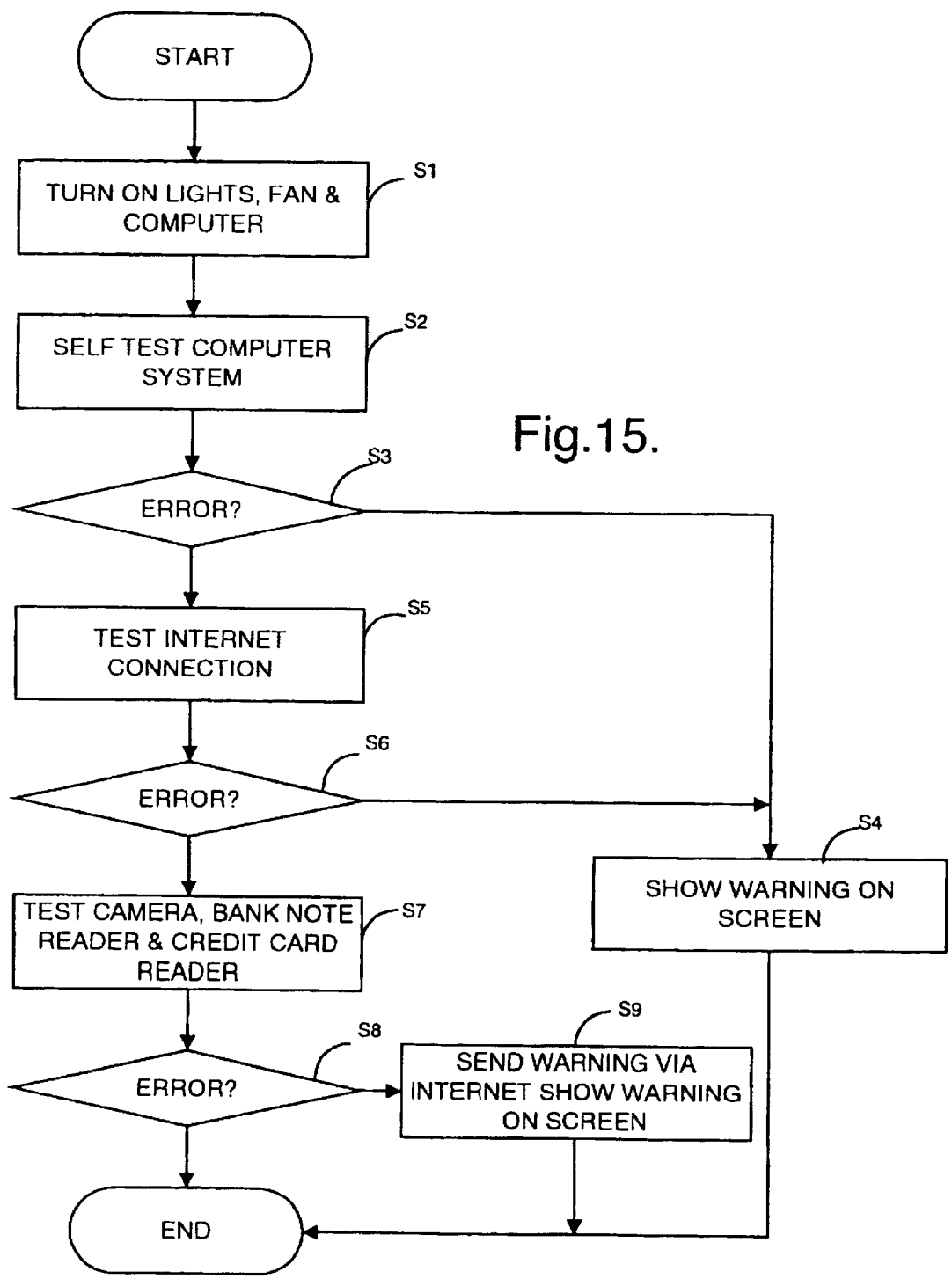
FIG. 15 is a flow diagram of the processing of the self-test program.

FIG. 15 is a flow diagram of the processing of the computer 120 in accordance with the self-test program 136 stored in memory 125. When the booth is initially switched on this causes (s1) the computer 120 to turn on the lights 70 and the fan 94. The computer 120 then performs a self-test routine (s2) to determine whether the computer 120 is working properly. If (s3) an error is detected an error message (s4) is displayed on the screens 20, 102 and the system halts.

If no error is detected the computer 120 then tests (s5) the Internet connection via the interface 126. If (s6) an error is detected a warning (s4) is displayed on the screens 20,102, and the system halts.

If the testing of the Internet connection via the interface 126 is successful the computer 120 then tests whether the digital cameras 36,38, the credit card reader 104 and the bank note reader 106 are all performing correctly. If (s8) any errors are detected a warning message is displayed (s9) on the screens 20,102 and also sent to the central server 2 via the interface 126 and the Internet 3 so that a distributor of booths can be informed of the failure of the apparatus. The self-test program 136 then halts.

When the self-test program 136 has completed its processing the booth control program 132 is then invoked.

Booth Control Program

Figure 16:
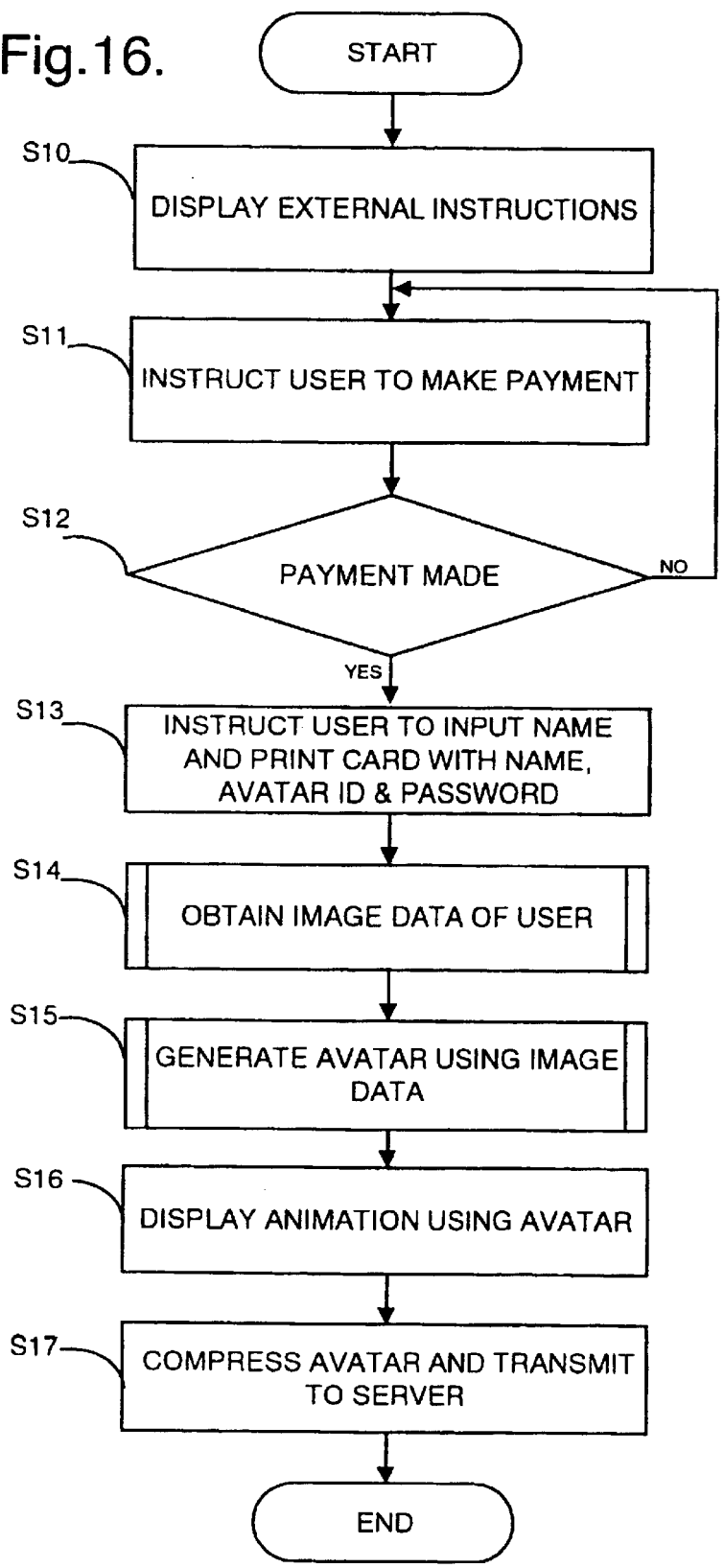
FIG. 16 is a flow diagram illustrating the steps involved in the generation of a computer graphical representation of an individual in accordance with the first embodiment of the present invention.

The processing of the booth control program 132 will now be described with reference to FIG. 16 which is flow diagram of the processing the booth control program 132. When the booth control program 132 is initially invoked this causes (s10) the booth control program 132 to invoke the user instructions program 130 to activate the external screens 20 and external speakers 22 to broadcast an external presentation to attract the user to use the booth. The display on the external screen 20 could for example show different uses of generated avatars or could demonstrate particular avatars which have been generated using that booth. The external screens 20 could also show user's instructions on how to use the booth. The display on the external screens 20 and sound broadcast through the external speakers 22 then continues through the time the booth 1 remains switched on.

After the external display has been initiated the booth control program 132 then invokes the user instructions program 130 to cause (s11) instructions to a user to be displayed on the internal screen 102 and to be transmitted via the internal speaker 100 instructing a user to remove loose outer clothing and make a payment using either the card reader 104 or the bank note reader 106.

The computer system 120 then determines (s12) whether any payment has been made using the bank note reader 106 or that the computer system 125 has received authorization for a credit card transaction from the telephone network. Until sufficient payment has been made or authorization has been received, the booth control program 132 invokes the user instructions program 130 to again display (s11) and transmit instructions for a user to make a payment.

If the computer 120 determines that sufficient payment has been made or a credit card transaction has been authorised, the computer 120 then causes on the screen 102 to display an image of a keyboard and instructs the user via the speaker 100 to input their name. When a user has entered their name using the touch screen 102 and the displayed keyboard, the computer 120 then generates an avatar identification number and a password which is then passed to the printer which outputs (s13) a card having the user's name, the generated user ID and the password printed thereon. At the same time the booth control program 132 causes the user instruction program to display on the screen 102 and transmit through the speakers 100 instructions to a user to wait for the card to be printed and to store the card so that the user can retrieve a generated avatar from the server 2 at a later stage.

Figure 17:
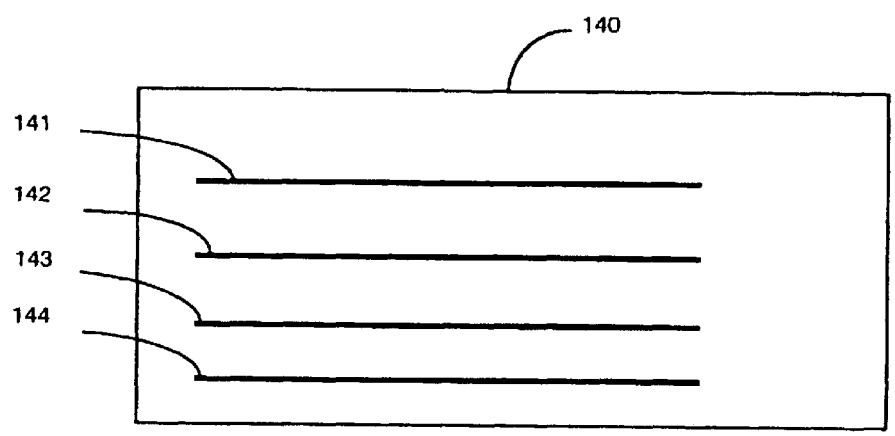
FIG. 17 is a schematic diagram of a card generated by the booth of FIG. 2.

FIG. 17 is a schematic diagram of an exemplary card 140 printed by the printer 108. The card 140 comprises a paper substrate on which are printed the user's name 141, the generated avatar identification number 142 and the generated password 143 and the website address 144 of the server 2. The card provides a physical reminder for the user that has an avatar to download from the server 2. The card 140 also provides a means by which a user is provided with the information required to download a generated avatar from the server 1 after it has been created by the booth 1 as will be described later.

After a card has been printed the booth control program 132 causes (s14) image data of a user to be obtained in four poses as will be described in detail later with reference to FIGS. 18 to 21.

After image data has been obtained the booth control program 132 then invokes the avatar construction program 134 to generate (s15) an avatar using the obtained image data as will be described in detail later with reference to FIGS. 22 to 40.

When an avatar has been generated from the image data the booth control program 132 invokes the animation program 137 which causes an animation sequences of images utilising the newly created avatar to be displayed (s16) on the screens 20,102. The booth control program 132 then causes the data representative of the avatar to be compressed (s17) and transmitted to the server 2 via the Internet 3 and the interface 130 for later retrieval as will also be described later. The booth control program 132 then finishes.

Figure 18:
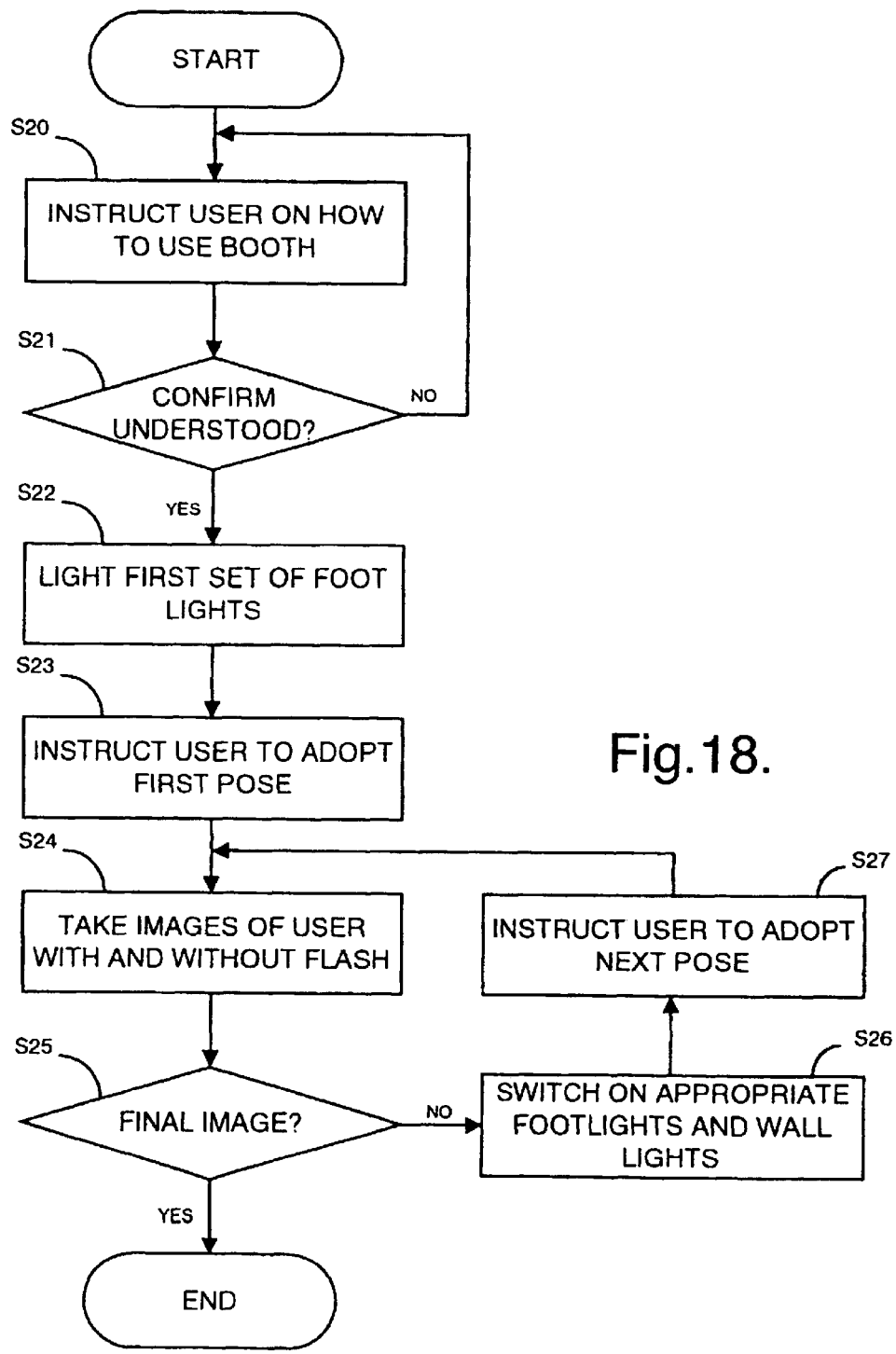
FIG. 18 is a flow diagram of the steps involved in obtaining image data for generating a computer graphical representation using the booth of FIG. 2.

FIG. 18 is a flow diagram illustrating in detail the processing of the booth control program 132 in order to obtain image data of a user.

When a card (s13) has been printed the booth control program 132 then invokes the user instructions program 130 to display on the internal screen 102 and transmit via the internal speakers 100 instructions on how to use the booth (s20).

In this embodiment of the present invention a three-dimensional computer model of an individual is obtained by processing image data of an individual from four different perspectives as are illustrated in FIGS. 5 to 8. The instructions for using the booth for this embodiment would therefore comprise instructions on the four poses to adopt whilst image data is captured using the digital cameras 36 and 38. Thus for example in this embodiment the display on the internal screen 102 would show an individual standing in the position illustrated in FIG. 5 whilst instructions are presented to the user via the internal speaker 100 that in that in the first position he is to face the camera with his feet on the lit foot lights 76, legs and back straight, arms straight out, backs of the hands to the camera and fingers stretched out as shown.

The display on the screen 102 would then change to show the individual 46 on the screen in the position of FIG. 6 and the audio track transmitted through the internal speaker 100 will inform a user that he would then have to turn right, face the light 74 on the side wall looking at the lit light with feet on the lit footlights 78, standing straight with arms straight on legs as shown.

The display shown on the internal screen 102 would then change to show an individual 46 in the position shown in FIG. 7 with instructions being transmitted via the internal speaker 100 to inform the user that he will need to turn right, face the rear wall looking at the lit LED 74, feet on the lit footlights 76, legs and back straight, arms straight out with palms to the camera and fingers stretched out as shown.

The user instruction program 130 then causes an image of an individual 46 having the position shown in FIG. 8 to be displayed on the internal screen 102 with instructions being transmitted via the internal speaker for the individual to turn right face the lit LED looking 74 at the lit LED, feet on the lit footlights 78, standing straight with arms straight and hands and legs as shown.

The booth control program 132 then causes the touch screen display 102 to display the options of reviewing the instructions or begin the avatar generation program, and causes the internal speaker 100 to instruct a user to either choose to review the instructions or to start the avatar construction process.

If (s21) it is detected that a user indicates by touching the touch screen 102 that they wish to view the instructions once again the instructions on how to use the booth repeated by being are displayed on the screen 102 and transmitted through the internal speaker 100 (s20).

If it is determined that the user indicates by touching the touch screen 102 that he is now ready to start the construction process the booth control program 132 then causes (s22) the lights 88 associated with the first pair 76 of foot light indicators to be illuminated. The booth control program 132 then invokes the user instruction program 130 to cause an image of an individual adopting the pose of FIG. 5 to be displayed on the internal screen 102 whilst instructions are transmitted via the internal speaker 100 to the user to adopt a pose facing the camera with their feet on the lit foot lights, legs and back straight, arms straight out, backs of the hands to the camera and fingers stretched out as shown (s23). The booth control program 132 then causes (s24) images of the user standing in the required position to be taken using the digital cameras 36,38.

Figure 19:
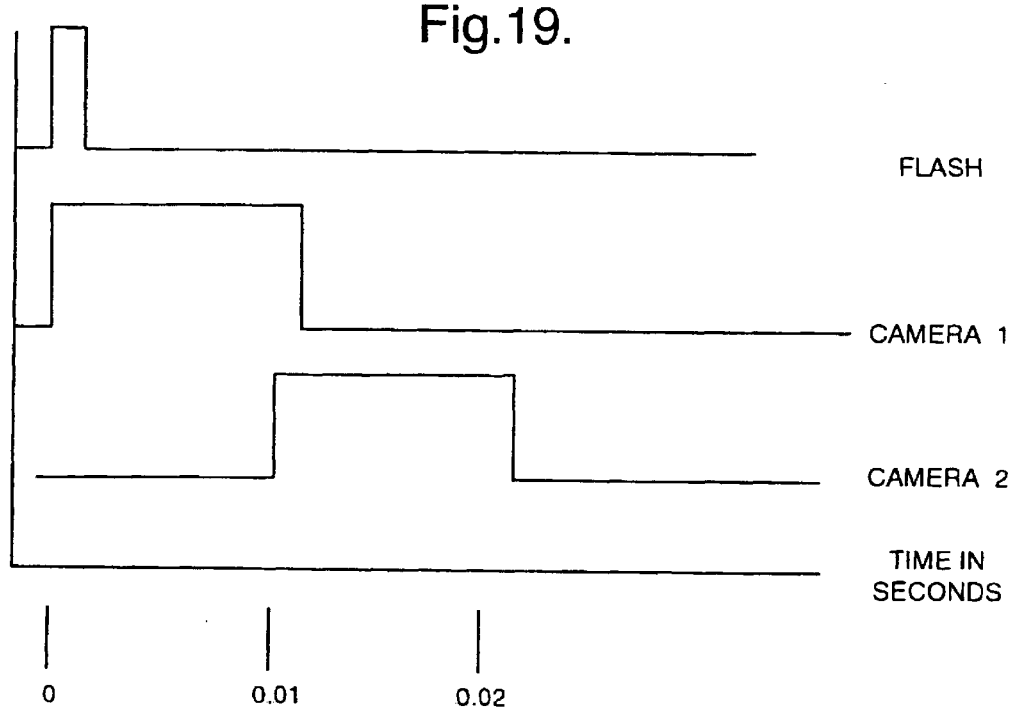
FIG. 19 is a graph illustrating the timing of the flash and the opening and closing of shutters of the digital cameras of the booth of FIG. 2.

FIG. 19 is a graph illustrating the relative timings of the activation of the flash 56, the first digital camera 36 and the second digital camera 38. Initially the booth control program 132 instructs the first digital camera 36 to take a picture with the flash lights 56 being activated. This causes the flash 56 to be activated and the shutter of the first digital camera 36 to be opened for a 1/90th of a second. Very shortly after being activated the flash ceases to illuminate the interior of the booth 1. After approximately one hundredth of a second the booth control 132 instructs the second digital camera 38 to take a picture. This causes the shutter of the second digital camera 38 to be opened. Shortly thereafter the shutter of the first digital camera 36 is closed. After a further 1/90th of a second the shutter of the second digital camera 38 is then closed.

In this way within less than 2/90ths of a second two images of an individual standing in the light box of the booth are obtained. The image obtained by the first digital camera 36 being of the booth illuminated with the flash 56, and the image of the second digital camera 38 being obtained after a short delay and being an image of the interior of the booth after the booth ceases to be illuminated by the flash 56. Since the computer 120 does not control the opening and closing of the shutters of the digital cameras 36,38 and the activation of the flash 56 directly the exact timing of the operations of opening and closing shutters and activating the flash is not determined by the computer 120 alone but rather is a combination of the timing of the instructions sent by the computer 120, the time taken to send signals to the digital cameras 36,38, the time taken to process those signals within the digital cameras 36,38 and the time taken for the digital camera 36 to activate the flash 56. Since the processing of the computer 120 and the digital cameras 36,38 may not be completely synchronised the fact that the activation of the shutters and the flash 56 is only indirectly controlled by the computer causes the timings of the cameras 36,38 and flash to vary. In this embodiment of the present invention, by ensuring that the signal sent to the second digital camera 38 is delayed by at least one hundredth of a second after the signal activating the first digital camera 38 has been sent it is possible to ensure that by the time the shutter of the second digital camera 38 is opening the interior of the booth is no longer effectively illuminated by the flash lights 56.

Figure 20:
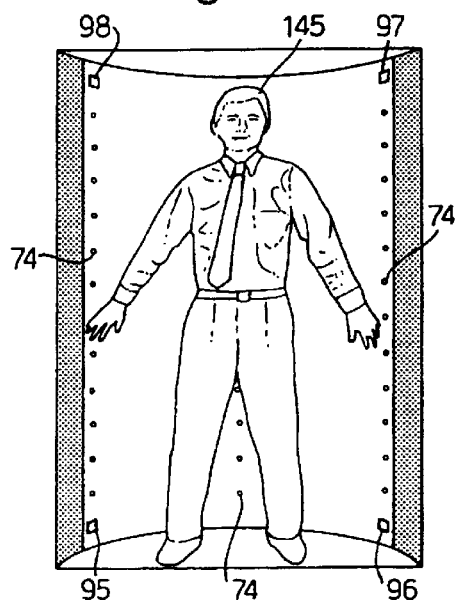
FIG. 20 is an illustration of an example of image data captured by a camera of the booth using the flash.

FIG. 20 is a schematic diagram illustrating an example of an image of an individual 145 standing in the booth in the position of FIG. 5 taken by the first digital camera 36 with the flash 56 being activated. This image comprises an image in which the forward surface of the individual 145 closest to the camera 36 is illuminated by the flash 56 and which provides data about the appearance of the forward surface of the individual 145. The background of the image is a representation of the uniformly lit back wall 62 against which representations of the four alignment markers 95–98 are apparent.

Figure 21:
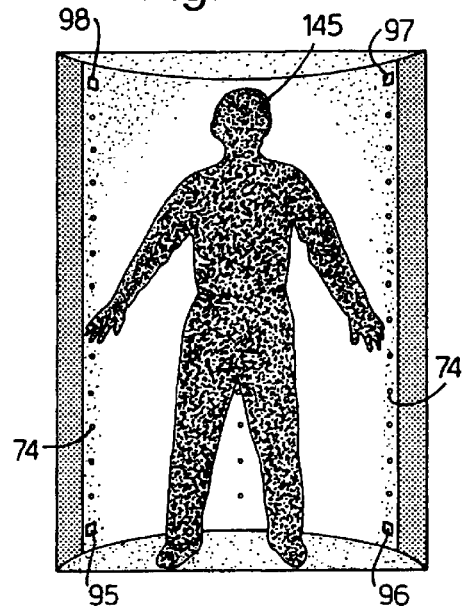
FIG. 21 is an illustration of an example of image data captured by a camera of the booth without using a flash.

FIG. 21 is a schematic diagram illustrating an example of an image of a user 145 of FIG. 20 taken shortly thereafter by the second digital camera 38. The image of FIG. 21 therefore corresponds to the interior of the booth one hundredth of a second after the image of FIG. 20. In FIG. 21 since the flash 56 is no longer illuminating the interior of the booth the surface of the individual closest to the camera 38 is not illuminated and an image is obtained of the user 140 silhouetted against the uniformly lit back wall 62 against which representations of the four alignment markers 95–98 are apparent. As has been previously stated, the illumination of the forward surface of an individual 140 standing in the light box 44 is avoided by the presence of the blacked out portions 72 of the wall 62 and by arranging the foot indicators 76 in a position so that the lit area of the back wall 62 only extends to about half way along the user's feet.

After images have been taken of the user in the first position the booth control program 132 then determines (s25) whether the images which have just been captured correspond to the final pose for generating an avatar. If it is determined that the image which has just been taken is the final image the booth control program 132 then invokes the avatar construction program 134 as will be described later.

If the images which have just been captured do not correspond to the final pose of the set of four poses the booth control program 132 then (s26) switches off the light 88 associated with the current set of foot indicators 76 and then illuminates lights 88 associated with the other set of foot indicators 78 and illuminates an LED slightly above eye level of the user to the right of where the user is currently standing. The booth control program 132 then instructs (s27) the user via the speaker 100 to turn right, look at the lit LED and stand in the pose that is also illustrated in the screen 102. The booth control 132 then causes another pair of images (s24) to be captured with and without the flash using the digital cameras 36,38, before once again checking (s25) if the obtained images correspond to the final pose.

In this way a user is instructed to adopt four specific poses within the light box by means of oral and visual instructions transmitted using the internal screen 102 and the internal speakers 100. The use of indicator lights to indicate the position where a user is to place his feet and also to indicate where the user should face further constrains the poses which are adopted by a user. Thus the booth control program 132 enables a set of eight images to be obtained, with images of an individual being taken with and without the flash in each of four orthogonal poses. These images are then passed to the avatar construction program 134 for the construction of an avatar as will now be described.

Avatar Construction Program—Image Processing

FIG. 22 is a flow diagram of the processing of image data by the avatar construction program 134 after it has been obtained by the digital cameras 36, 38. Initially each of the images of a user in the light box 44 obtained by the second camera 38 are subjected to a filtering process (s30) to obtain a black and white image in which black pixels correspond to pixels in the original image having less than a certain amount of threshold luminance. In this way an image comprising a black silhouette of an individual against the uniform white background is obtained, the white background having imposed thereon black representations of the alignment markers 95–98.

(a) Image Alignment

The silhouette images are then aligned (s31) with the corresponding flash image of an individual in the same pose obtained using the first digital camera 36. The image data obtained by the first 36 and second 38 digital cameras are required to be aligned as although the arrangement of mirrors 40,42, is intended to present the digital cameras 36,38 with identical views of the interior of the booth due to manufacturing tolerances this usually will not quite be the case. This alignment process will now be described in detail with reference to FIG. 23.

As a first step in aligning the images obtained from the two cameras 36,38 the computer 120 initially identifies (s40) in the two images the coordinates of the representations of the alignment markers 95–98 appearing in both of the images. The computer 120 then calculates (s41) the translation required to displace the silhouette image obtained by filtering the non-flash image taken by the second camera 38 to align the representation of the bottom left alignment marker 95 appearing in the silhouette with the representation of the bottom left alignment marker 95 in the corresponding image taken by the first digital camera 36. The calculated displacement is then applied to the silhouette image so that the representations of the bottom left marker 95 are aligned. The computer 120 then calculates (s42) the required rotation and scaling distortion to locate the representation of the top right alignment marker 98 in the translated silhouette image with the representation of the top right marker 98 in the corresponding image taken by the first digital camera. The calculated rotation and scaling operation is then applied to the filtered non-flash image that has been aligned with the bottom left marker 95 of the flash image obtained by the first camera 36.

The computer 120 then calculates (s43) how the rotated scaled silhouette image is required to be distorted so that the representations of the alignment markers in the top left 97 and bottom right 96 corners of the image are to be aligned with the representations of the corresponding alignment markers appearing in the corresponding flash image obtained by the first digital camera 36. The computer 120 then applies this calculated distortion to the rotated scaled image so that an aligned silhouette image is obtained in which all four representations of the alignment markers 95–98 correspond in position to the positions of the four alignment markers 95–98 in the flash image of the individual in the same pose obtained by the first digital camera when the flash is activated. The aligned silhouette image is then (s44) stored in the data storage portion 138 of the memory 125 of the computer 120.

After the images obtained by the second digital camera 38 have been filtered and aligned (s30,s31) to generate a set of aligned silhouettes each aligned with the corresponding image of the user in the same pose obtained by the first digital camera 36, the aligned silhouettes are then used by the avatar construction program 134 to calculate (s32) a geometry for a wire mesh model approximation of a three dimensional model of the individual of whom images have been obtained.

(b) Outline Extraction and Amendment

Figure 24A:
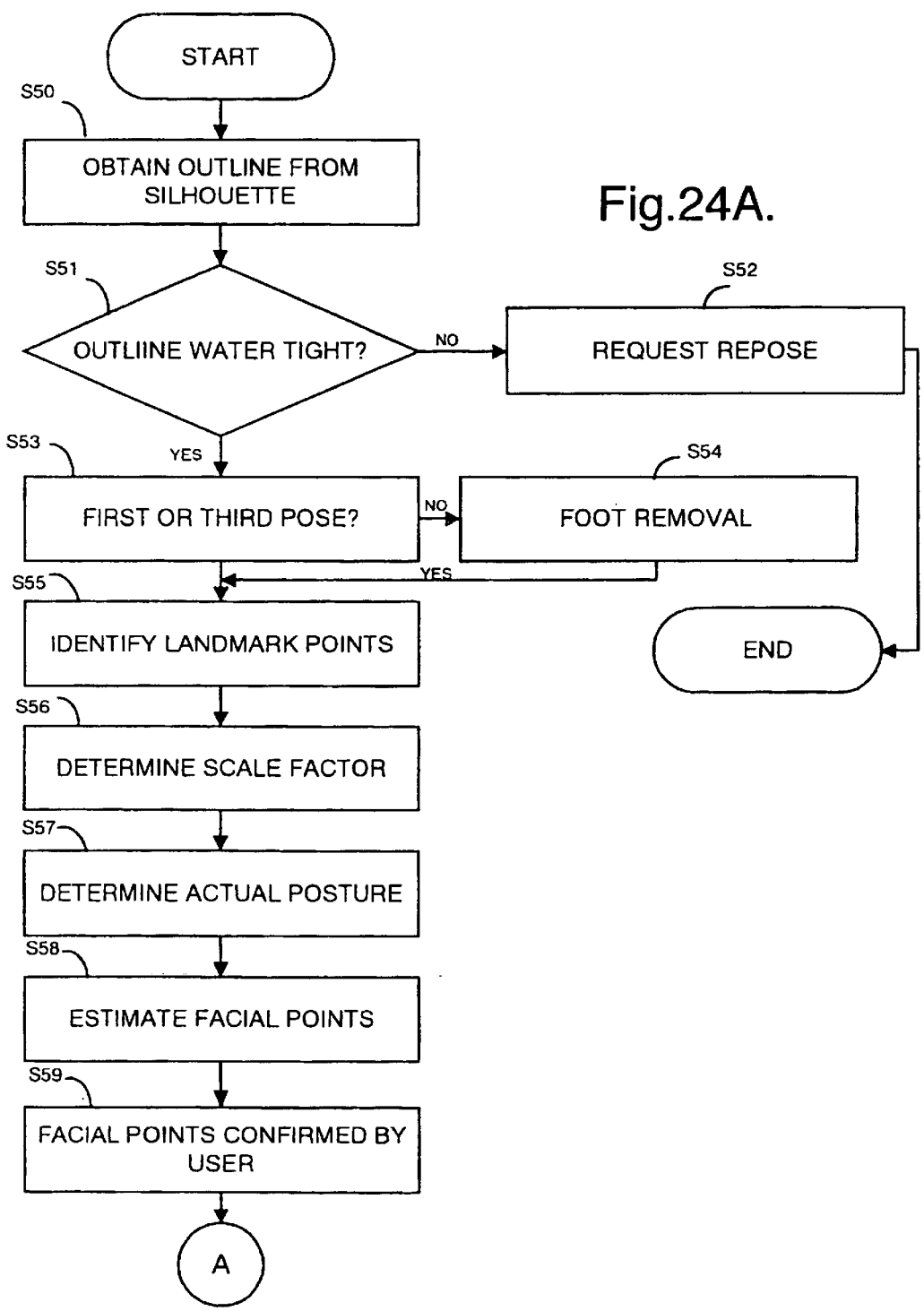
FIGS. 24A and 24B is a flow diagram illustrating the steps of determining a mapping function between a generic avatar geometry and a calculated geometry of an individual.
Figure 24B:
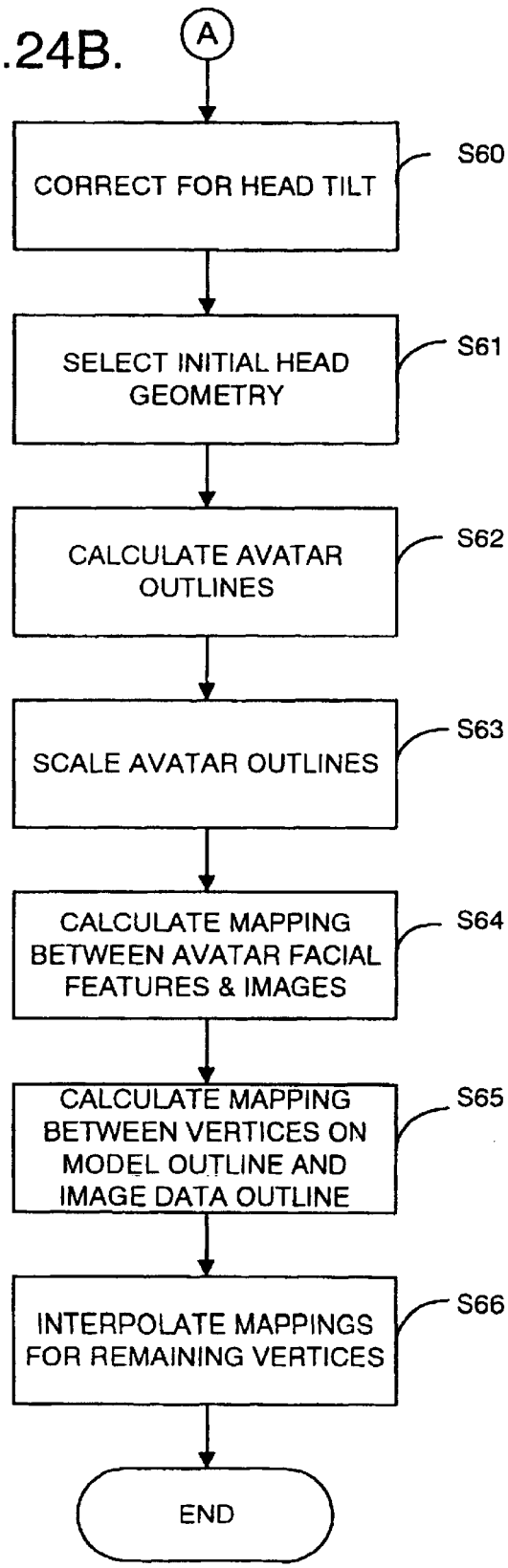

The processing of the avatar construction program 134 to determine the geometry of a wire mesh model of an avatar of an individual will now be explained in detail with reference to FIGS. 24A and 24B which is a flow After a set of aligned silhouette images have been obtained the computer 120 then determines (s50) for each of the silhouettes, which pixels in the silhouette images correspond to the perimeter of the silhouette of the user against the uniformly back lit back wall 62.

The computer 120 then determines whether the outline which has been obtained from a silhouette image is a single continuous loop which is known as a water tight outline. If (s51) it is determined that the outline identified by the computer 120 is not a water tight outline this indicates that the data capture process has failed or that in the pose adopted by the user a portion of a user's body was obscuring another part of his body. For example this may occur when a user's hands are held insufficiently far away from the user's body when the user adopts the pose of FIG. 5 or 7 or if their legs are insufficiently spread apart. If the outline obtained from the image data is not water tight the avatar construction program 134 is unable to generate an avatar using that image and invokes the booth control program 132 to request that a user re-poses (s52).

After the computer (s51) has determined that the outline generated from the silhouette images are all water tight outlines the computer 120 then determines whether it is processing the images corresponding to the first or third poses (s53) in a set of four poses. If it is determined that the computer is processing images corresponding to the second or fourth poses in a set of four poses, being the poses where a user is side on to the camera the computer 120 then processes (s54) the outline obtained from the silhouette to remove the additional rear foot that appears in the silhouette as will now be explained with reference to FIG. 25A, 25B and 25C.

Figure 25A:
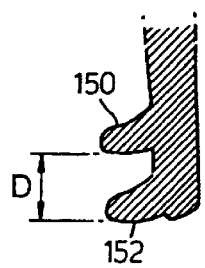
FIG. 25A, 25B and 25C are diagrammatic illustrations used to explain the removal of extraneous rear foot data from the outline of an individual in profile.

FIG. 25A is an illustration of an example of a portion of the silhouette image obtained from a non-flash photo taken by the second digital camera 38 of an individual in the pose of FIG. 6. In this position the user is sideways on to the camera with their feet pointing to the left hand side of the image. As shown in FIG. 25A when a non-flash image is taken of a user in this position the user's feet appear silhouetted against the background of the image with the user's foot further away from the camera 150 appearing to protrude from the leg of the user a small distance D above the user's other foot 152.

Figure 25B:
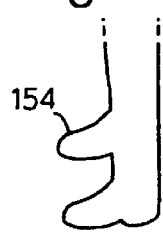

When an outline is obtained from such an image the outline for this portion of the image corresponds to the outline shown in FIG. 25B. This outline is unsatisfactory for the generation of an avatar as the user's leg appears to have a bulge 154 as a result of the silhouette of the foot further away from the camera.

However, since this bulge 154 appears at a known position within the image, it is therefore possible to determine the portion of the outline obtained from an image which corresponds to the foot of a user further away from the camera. An estimated outline in the absence of the bulge 154 can then be calculated from the remainder of the outline for the leg.

In this embodiment, the bulge 154 is identified within the outline by determining the coordinates of the pixel corresponding to the turning point at the top of the user's front foot and the coordinates of the pixel corresponding to the turning point at the top of the user's rear foot. These coordinates can easily be identified from the outline by differentiating the outline image. When these turning points have been identified the computer 120 then deletes the portion of the outline between these two points and replaces it with a straight line between the two identified coordinates.

Figure 25C:
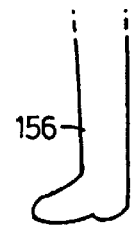

FIG. 25C is an illustration of the outline of FIG. 25B amended so that the bulge 154 corresponding to the user's other foot has been replaced by an estimated outline of the leg of the user close to the camera 156. This amended outline is then used by the computer 120 for the generation of an avatar.

After a water tight outline (s50–s53) has been obtained and if required the outline has been modified to remove the outline of the user's back foot (s54) for each of the four silhouette images, outlines corresponding to the outlines of an individual in four orthogonal poses for which image data is available will be stored in memory. The computer 120 then (s55) processes these outlines to identify a number of land mark points on the outline as will now be described.

(c) Land Mark Point Identification

For the outlines of a user in the poses of FIGS. 5 and 7 the land mark points comprise points on the outline which are easily identifiable and from which an estimation of the orientation of a user's limbs in the corresponding images can be made.

From the outlines of a user in the poses of FIGS. 6 and 8 the landmark points correspond to points on the outline which can be identified and which can be used to make an initial estimation of the position of facial features of an individual.

FIG. 26 is an illustration of the outline corresponding to FIG. 21 with a number of land mark points indicated. In this example the land mark points identified by the computer are the highest point on the outline 160, the extreme left most point 162, the extreme right most point 164, the left most point having the lowest coordinates 166 and the right most point having the lowest coordinates 168. These points correspond to the top of the user's head 160, the tip of a user's hands 162,164 and the tip of the user's feet 166,168. The computer 120 also calculates the coordinates of the points on the outline between these landmark points having greatest curvature. These correspond to the left 170 and right 172 hand sides of the user's neck, the left 174 and right 176 armpits of a user and the centre 178 of a user's crotch. Similar land mark points are also calculated for the outline of the image of the user with his back to the camera.

When the computer 120 has calculated the coordinates of the landmark points for the silhouettes of the user standing in the positions of FIG. 5 and FIG. 7 the computer 120 then compares the coordinates of the top of the user's head 160 and the centre 178 of a user's crotch. If the height of a user's crotch is significantly less than 51.9% of the user's total height this is taken to indicate that the silhouette of a user has been taken of a user wearing a skirt since on average the height of an individual's hip bone is 51.9% of the height of an individual. In this case the apparent position of a user's crotch 178 on the user's outline is indicative of the hem of the skirt rather than a position on the user's body. It is therefore unsuitable for estimating the actual posture adopted by a user in the image. The crotch position 160 is also unsuitable for determining the mapping of the outline of a generic avatar.

The computer therefore records that the outline is indicative of a user wearing a skirt and estimates the true position of a user's crotch to be 51.9% of a user's height and this estimated crotch position is then used to determine the actual posture adopted by a user as will be described in detail below.

From outlines obtained of the silhouettes of a user facing of the side walls landmark points, comprising turning points on those outlines identifying the tip of the user's nose and the user's chin are determined. These landmark points corresponding to the extreme leftmost points in the top sixth of the outline of the user facing the side wall in the position of FIG. 6 and the extreme rightmost points in the top sixth of the outline of a user making the side wall in the position of FIG. 8.

After the landmark points on the outline images have been determined the computer 120 then calculates (s56) a scale factor indicative of the height of the individual. This involves determining from the outline of the individual in the pose of FIG. 5 the height of the user. This is achieved by comparing the coordinates of the land mark point 160 corresponding to the top of the user's head and the coordinates of the representations in the image of the alignment markers 95–98. Since the alignment markers 95–98 are placed on the back wall 62 in known positions relative to the foot position indicators 76,78 and a known distance apart from the coordinates of the representations of the alignment markers within the image can be used to determine the scale for the image. Once the scale of an image has been determined the coordinates of the highest point 160 of a user's head can be used to calculate the user's actual height. The calculated height of a user is then stored in the data storage portion 138 of the memory 125 for use in the generation of an avatar as will be described later. The calculated height of an individual for the first image also used by the booth control program 132 to determine which of the LEDs in the strips of LEDs 74 is to be illuminated to cause a user to look slightly above eye level in the later poses.

(d) Posture Determination

After the scale factor has been determined and stored in memory 125 the computer 120 then utilises the landmark points 160–178 calculated for the images of the user in the poses of FIGS. 5 and 7 to determine (s57) the actual poses adopted by the user in those images. From the calculated positions of the left hand side of the user's neck 170 the tip of the user's left hand 162 and the user's left armpit 174 the orientation of the user's left arm relative to his body can be estimated. Similarly the orientation of the user's left leg can be estimated from the relative positions of the user's left armpit 174, the tip of the user's left foot 166 and the position of the user's crotch 178. The orientation of the user's right arm can be estimated using the coordinates of the right hand side of the user's neck 172, the tip of the user's right hand 164 and the user's right armpit 176. The orientation of the user's right leg can be estimated using the coordinates of the user's right armpit 176 and the tip of the user's right foot 168 and the user's crotch 178.

Since the user will have been instructed to adopt a specific pose via the speaker 100 and the internal screen 120 these estimates of the exact positioning of the user's limbs provide sufficient data to determine within tolerable boundaries for error the posture adopted by the user in the images provided that the user has correctly followed the instructions given to him. Data indicative of the orientation of the user's limbs in the images corresponding to the poses of FIGS. 5 and 7 is then stored in the data storage portion 138 of the memory 125 of the computer 120.

After the actual posture (s57) of the user in the images has been determined the computer 120 then identifies (s58) a number of facial features.

(e) Facial Feature Identification

Figure 27:
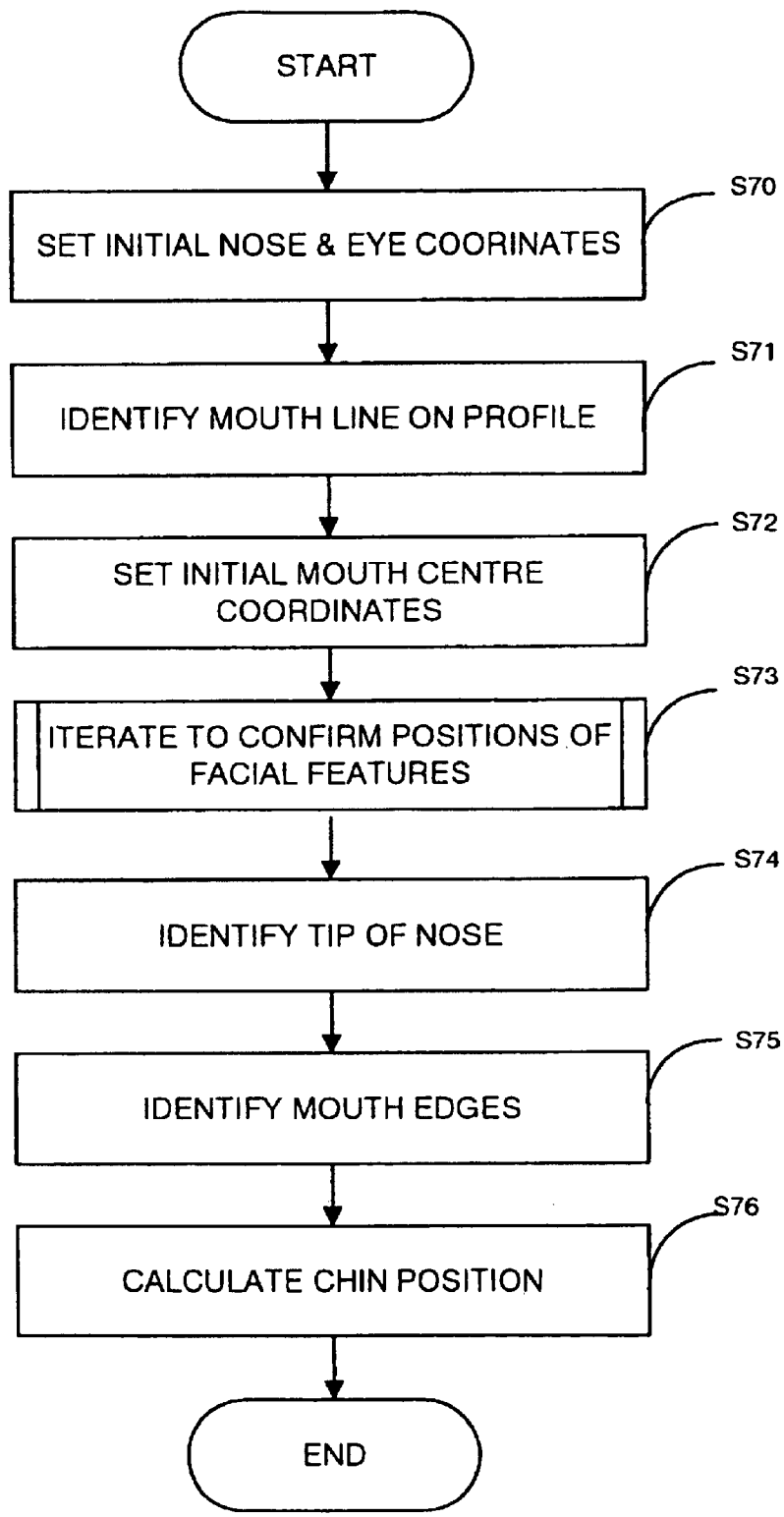
FIG. 27 is a flow diagram illustrating the processing for identifying facial features from image data.

FIG. 27 is a flow diagram of the processing of the computer 120 to identify the facial features in the image of a user facing the camera. Initially (s70) the computer sets initial estimates for the y coordinates (height) of a point corresponding to the user's nose to be equal to the point identified as the user's nose in one of the profile outlines. The X coordinate (left-right) of the initial estimate of a user's nose is set to correspond to the centre of the image and the coordinates of the left and right eye are calculated as being in fixed positions relative to this initial estimate for the position of the user's nose.

The computer 120 then (s71) determines for the portion of one of the images of the user in profile taken by the first camera 36, corresponding to the portion between the topmost part of the outline and the identified points identified as the neck of a user, the rate of change of illuminance for each of the pixels in that portion of the image. The computer 120 then selects as an initial estimate of the position of a user's mouth the point within the outline of the image having the greatest change in luminance. This initial estimate should correspond to the point of contrast between a user's skin and the line of a user's mouth and their lips. An initial estimate for the coordinates for the centre of the mouth are then (s72) set as being in the centre of the first image of the user taken by the first camera 36 facing the camera with a y coordinate corresponding to the estimated point of the edge of the user's mouth from the image in profile.

The computer 120 then (s73) uses these initial estimates of the points corresponding to the eyes, nose and centre of the user's mouth in the image and then iteratively processes them (s73) to obtain more accurate estimates of the actual positions of these facial features.

Figure 28:
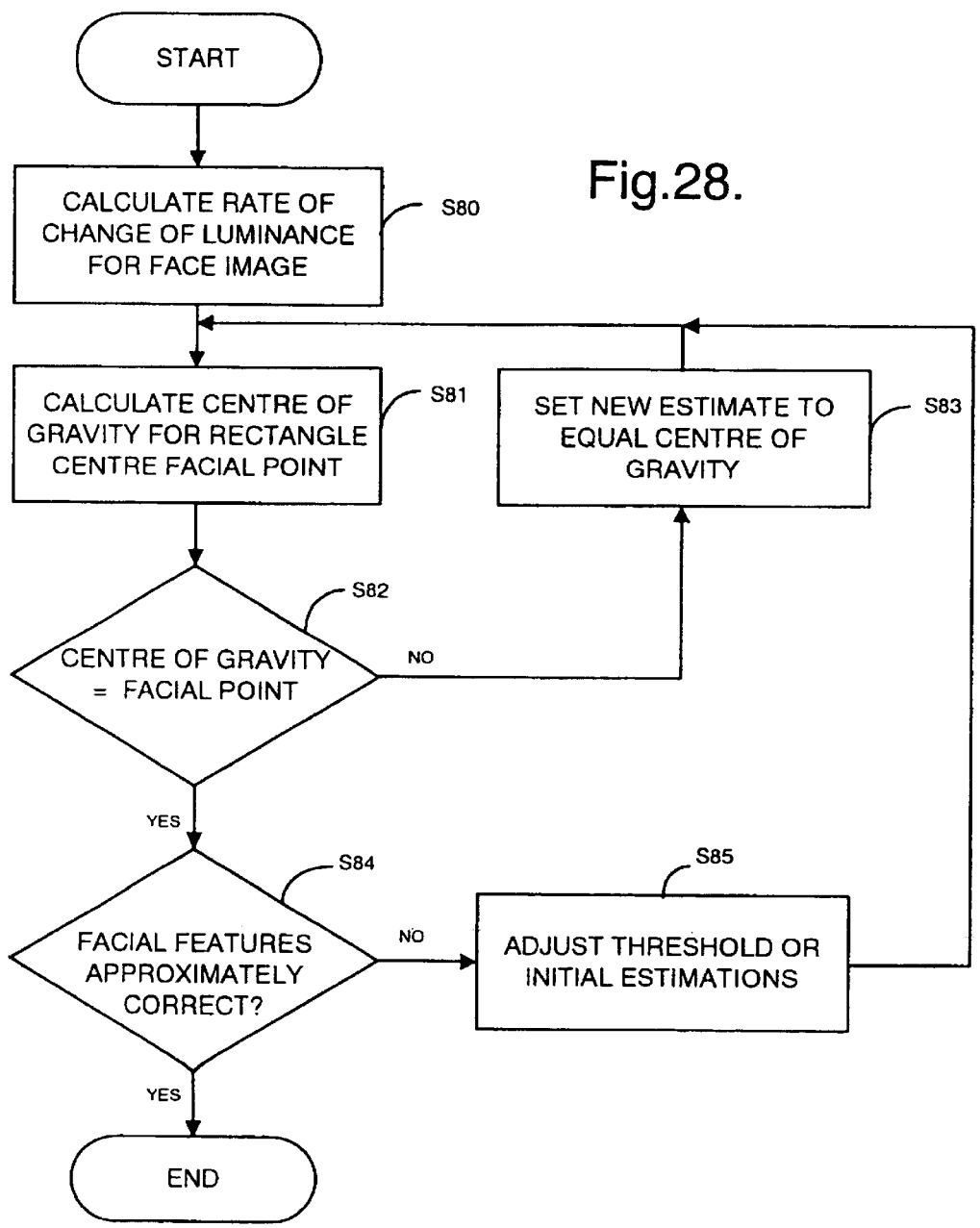
FIG. 28 is a flow diagram illustrating the iterative process for improving the accuracy of initial facial feature estimates.

FIG. 28 is a flow diagram of the iterative processing of the initial estimations of the facial features of a user appearing in the image obtained by the first camera 36, of the user in the position of FIG. 5 to obtain more accurate estimations of these positions.

When initial estimates of the positions of a user's eyes, nose and mouth have been calculated the computer first (s80) calculates the rate of change of luminance for all of the pixels corresponding to the portion of the image obtained by the first camera 36, of a user in the position of FIG. 5 corresponding to the user's face. The computer then determines which of the pixels of the portion of the image corresponding to the user's face has a rate of change of luminance above a set threshold value. The coordinates of these points are then stored in memory 125.

The computer then for each of the facial feature points selects a rectangle of pixels centred on the estimated position for that feature point and calculates the distribution of pixels within that rectangle corresponding to points in the image having a rate of change of luminance above the set threshold.

Figure 29:
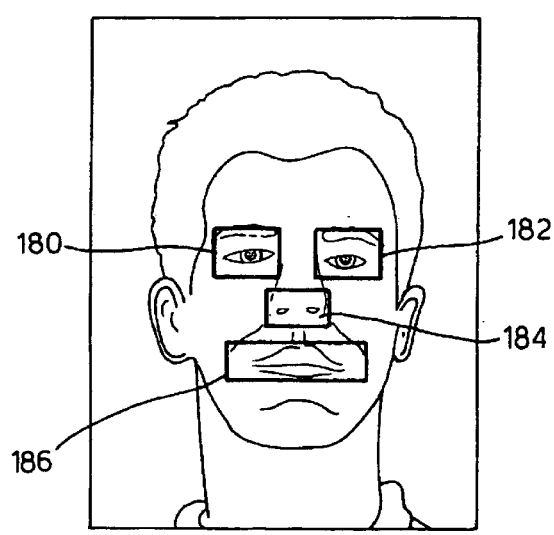
FIG. 29 is an illustration of areas of images used to identify the positions of facial feature points.
Figure 23:
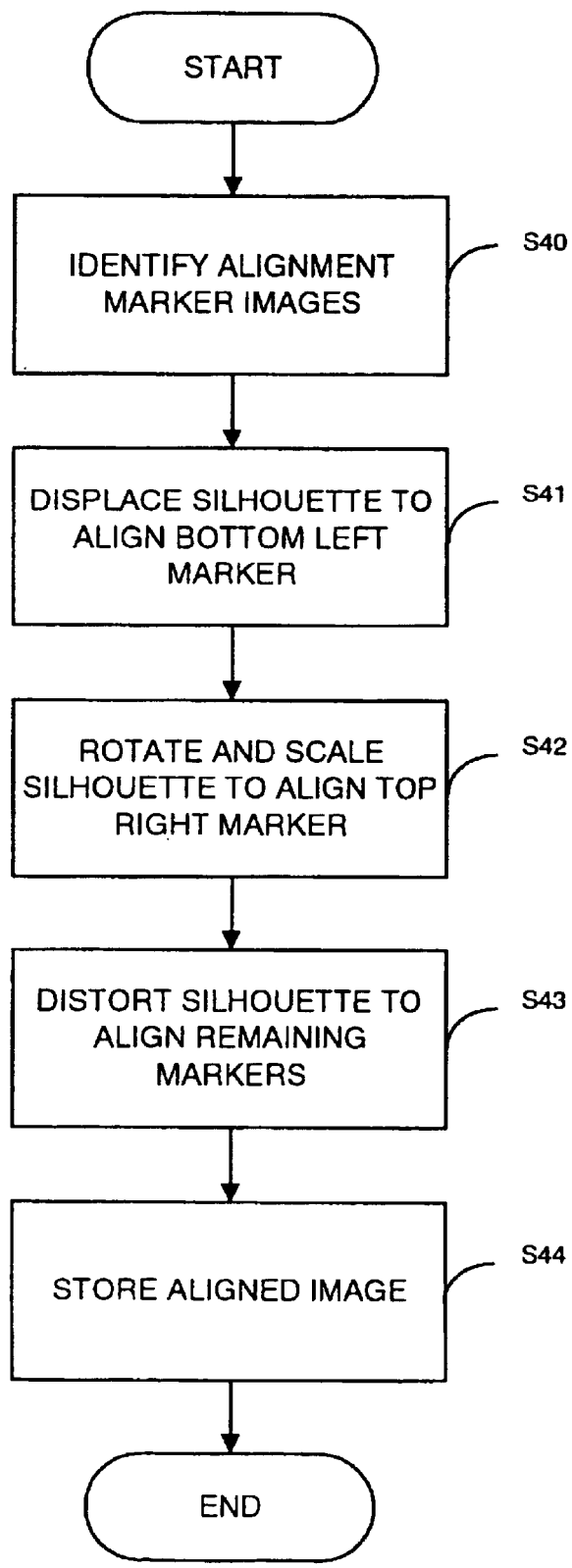
FIG. 23 is a flow diagram illustrating the steps involved in the alignment of images captured by the digital cameras of the booth.

FIG. 29 is a schematic illustration of rectangles for testing for the position of eyes, nose and mouth. As is shown in FIG. 29 the rectangles that are used for testing for the position of the user's eyes 180,182 such as to correspond to approximately one sixth of the width of a user's head as it appears in the image. The rectangle for identifying the position of a user's nose 184 is approximately half the height of the rectangle used for the identification of a user's eyes and corresponds in width to about one third of the width of the image of the user's head and the rectangle 186 for determining the position of the user's mouth is about one quarter of the height of the rectangles used to identify the positions of the user's eyes 180,182 and about half the width of the image of the user's head.

For the facial feature for which a position is to be estimated the computer calculates the centre of gravity of the distribution of points having a rate of change of luminance above the set threshold with the rectangle for that feature and then determines (s82) whether the determined centre of gravity corresponds to the current estimate of the point corresponding to that facial point. If the centre of gravity and the current estimate do not correspond the determined centre of gravity is then set (s83) to be the new estimate for the position of that facial feature and the centre of gravity for a rectangle centred upon this new estimate (s81) then calculated. In this way the estimate of the positions of the facial features are adjusted to improve the estimate of the position of the facial feature.

When the estimates of the position of the facial features have been corrected the computer then (s84) checks whether the currently estimated positions for the eyes, nose and the centre of the mouth are in positions which are likely to correspond to the positions of a pair of eyes, a nose and a mouth in an image of a face. If the estimated facial positions are found to be at the expected positions for the features corresponding to eyes, nose and mouth of a face the estimates are considered satisfactory and the computer 120 then goes to use those current estimates to identify a point corresponding to the tip of the nose and the points corresponding to the edge of the mouth as will be described below. If, however, the estimated positions clearly do not correspond to correct positions because the proportions of the estimated positions clearly do not correspond to those expected for a face the iteration process (s81–s83) is repeated either with alternative initial estimates of the positions of facial features being used a seed to the process or by using a different threshold to establish those points of change of luminance which are to be considered in the iteration process (s85).

Thus for example where the iterations for the positions of a user's eye result in two estimates corresponding to the same position, this would indicate that the initial estimates for a user's eyes converge to a single eye. An estimated for position for the other eye either to the left or the right of the identified eye could then be used as a seed to identify where the actual other eye is located. Similarly if the estimated position for a user's mouth corresponds to the estimated position for a user's nose this indicates that the initial estimates for these facial features converge to a single point. On the basis of the ratio of the position for the user's eyes, nose and mouth a corrected initial seed position for the user's nose and mouth could then be used as a seed.

Returning to FIG. 27, when the facial features have been confirmed and more accurately identified (s73) the computer then identifies the point within a rectangle centred on the estimate of the user's nose (s74) having the greatest luminance. This point is taken to correspond to the image of the tip of the user's nose.

The computer then (s75) uses the estimated position of the centre of the user's mouth to calculate estimates of the edges of the user's mouth. This is determined by processing image data corresponding to a rectangle centred on the initial estimate at the centre of the user's mouth to determine the luminance of the pixels corresponding to that portion of the image. The coordinates of a horizontal line having the least luminance within that rectangle are taken to be the line of the user's mouth and the edges of the mouth are estimated to the point on that line where the luminance changes the most which should correspond to the position of the edge of the user's lips.

The computer then finally (s76) estimates a position corresponding to the user's chin being a point in line with the tip of the user's nose the same distance below the line of the user's mouth as the tip of the nose is above the user's mouth.

Returning to FIG. 24A, the avatar construction program 134 then requests (s59) that a user confirm the estimated positions of facial features of the individual appearing in the images of the individual taken in the poses of FIGS. 5, 6 and 8. This is achieved by the avatar construction program causing the portion of the image of the user in the position of FIG. 5 taken by the first camera 36 corresponding to the head of the user to be displayed on the touch screen 102. Superimposed on this image are six crosses located at estimated positions for the eyes, nose, sides of the mouth and chin of the individual shown in the image.

The avatar construction program 134 then instructs a user via the speaker 100 and the touch screen 102, to select the superimposed crosses by touching on the touch screen 102 and drag them to the correct positions for the eyes, nose, mouth and chin respectively. When a user touches on the touch screen this causes a cross to be selected. By then dragging this finger across the screen, a user causes the cross change its position on the screen.

Figure 30:
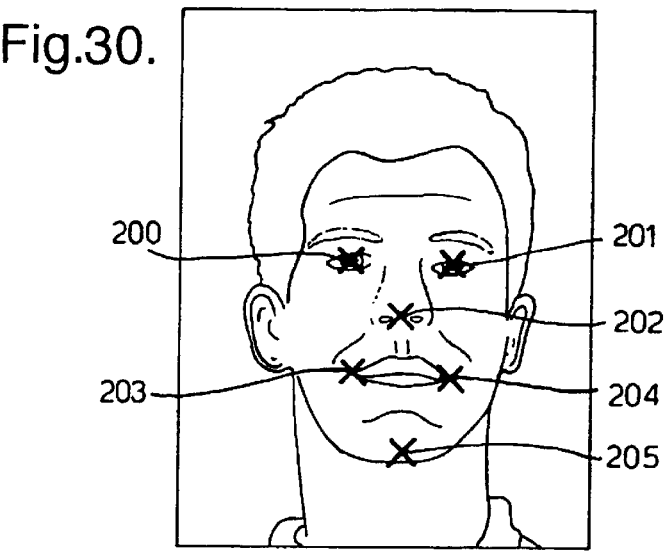
FIGS. 30, 31 and 32 are illustrations of examples of screen displays used for the confirmation and editing of facial features.

FIG. 30 is an illustration of the display on the touch screen 106 of an image of a user after the crosses have been located in their proper positions. The crosses comprise a cross on the left eye 200, a cross on the right eye 201, a cross on the tip of the nose 202, a cross on the left hand side of the mouth 203, a cross on the right hand side of the mouth 204 and a cross on the tip of the chin 205. When the user has correctly located all six of the crosses he then confirms they are in the correct position. The avatar construction program 134 then displays on the screen 102 the portion of the image of the person in the pose of FIG. 6 corresponding to the head of the person with two superimposed crosses superimposed in the calculated positions for the nose and the tip of the chin calculated from the outline of the silhouette corresponding to that pose and instructs the user to correct these estimated positions in a manner similar to that for the first image.

Figure 31:
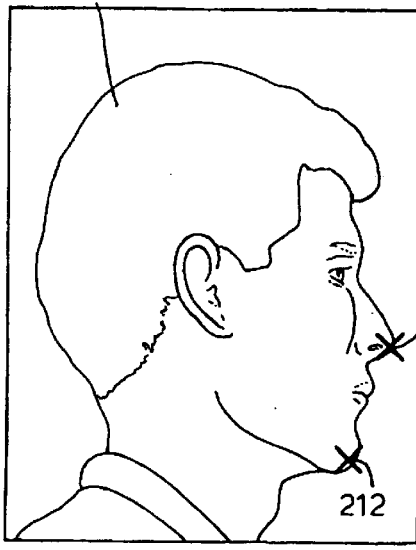

FIG. 31 is a diagrammatic illustration of the image shown on the display 102 for identifying the positions of the nose and the chin in an image of the head in profile of a user in the pose of FIG. 6. In this example the display comprises an image of the head of a user 208 and a pair of crosses, one cross 210 located on the user's nose and another cross 212 located on the user's chin. The user is then instructed to correct the positions of the crosses if required and then confirm when they are in the correct position.

When the user confirms that the crosses in this image are in the correct position avatar construction program 134 then causes to be displayed on the touch screen 102 to the portion of the image taken by the first camera 36 of the individual in the position of FIG. 8 corresponding to the head of the individual with two crosses superimposed on the image located at estimated positions of the nose and chin in the image.

Figure 32:
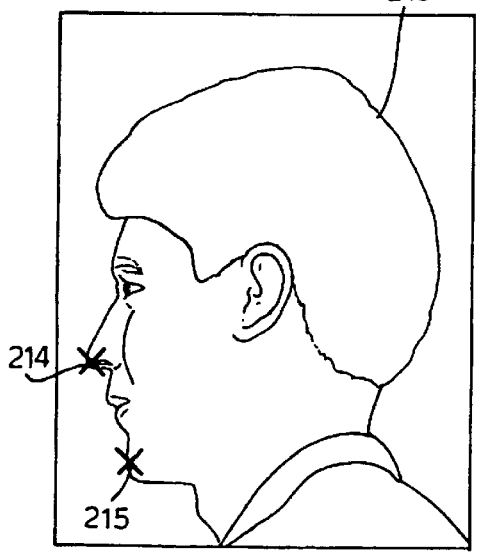

FIG. 32 is an illustration of an example of an image of the head 213 in profile of an individual in the pose of FIG. 8 having superimposed thereon a cross on the nose 214 and a cross superimposed on the tip of the chin 215. The user is then invited to confirm or correct the position of these crosses as has been previously described in relation to the image for the head of the individual in the position of FIG. 8. After the user has confirmed the position of all of the crosses and corrected them if required the coordinates of the features identified by the crosses are stored in the data storage portion 138 of the memory 125.

(f) Head Tilt Correction

After the positions of facial features (s59) have been confirmed by a user the avatar construction program 134 then amends (s60) the outlines and the images corresponding to the user in the positions of FIG. 6 and 8 to account for any discrepancies between the angle at which a user has held his head in the image taken of the user in the position of FIG. 5. From the feature points confirmed by a user corresponding to the tip of the user's nose in the images of a user's head as seen from the front and in profile. The y coordinate (height) of the tip of the user's nose can be determined. As this point is meant to correspond to a single point on the user's body if the y coordinate of this point is not identical between the three images, this indicates that in the different poses of FIGS. 5, 6 and 8 a user has held his head at a slightly different angle. If this is the case the computer then calculates the difference between y coordinate of the user's head in profile and the y coordinate of the user's nose as seen in the image of the user taken whilst the user stands in the position of FIG. 5.

FIG. 33 is an example of an illustration of a user's head. In this example it is assumed that the user's nose 220 is held a certain distance indeed above the position which is the corresponding image of the user in the position of FIG. 5. The image data and the outline corresponding to that image of a user in profile is then corrected by applying a rotation of all of the pixels corresponding to the head of a user about a rotation point 224 estimated at the position in the centre of the user's neck, the point of rotation 204. This rotation approximately corresponds to the change in image resulting from a change in the angle in which the head is held.

FIG. 34 is an illustration of the example of FIG. 33 after the orientation of the head has been amended. In this example the head has been rotated clockwise. This causes the height of the pixel corresponding to the tip of the user's nose 220 to change. In doing so a portion 226 of the image of a user is revealed which is not apparent in the original image data. Colour image data for this portion of the user is then estimated by colouring this portion of the user in the manner in which this area was previously coloured in the earlier image before the image had been transformed to a correct full head tilt.

Returning to FIG. 24B the computer 120 then selects an initial head geometry (s61) for a generic model avatar and then uses the generic model avatar program 135 to calculate (s62) the outlines of an image of the generic computer avatar 135 in four orthogonal poses, comprising the poses of FIGS. 5 to 8 which a user adopts when image data is captured. In order to maximise the correlation between the poses of a user and the poses for the avatar the actual posture data for the user in the images of the user in the poses of FIGS. 5 and 7 are used as the basis for generating outlines of an avatar in those poses. Prior to describing the selection of an initial head geometry (s61) and calculation of outlines of a generic model avatar (s62) a generic model avatar program will now be described in detail.

Generic Model Avatar Program

Figure 35:
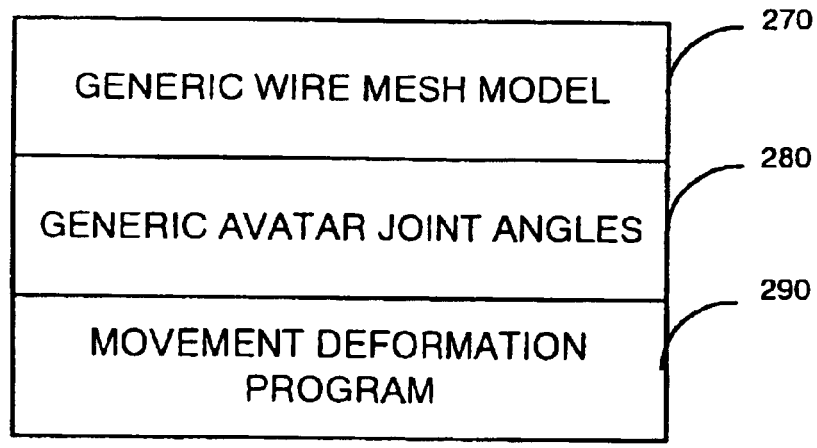
FIG. 35 is a block diagram of the generic model avatar program stored in memory.

FIG. 35 is a block diagram of the generic model avatar program 135 stored in memory 125. The generic model avatar comprises a generic wire mesh model 270, a set of generic avatar joint angles 280 and a movement deformation program 290. The generic wire mesh model 270 comprises data defining a polygonal wire mesh representation of a generic individual in a single pose. The generic avatar joint angles 280 are a set of data defining the orientation of the limbs of a model skeleton corresponding to the generic wire mesh model 270 and the movement deformation program 290 is a program defining how the wire mesh model 270 should be varied to account for changes in the orientation of the joint angles 280 as has been described in greater detail later.

Figure 36:
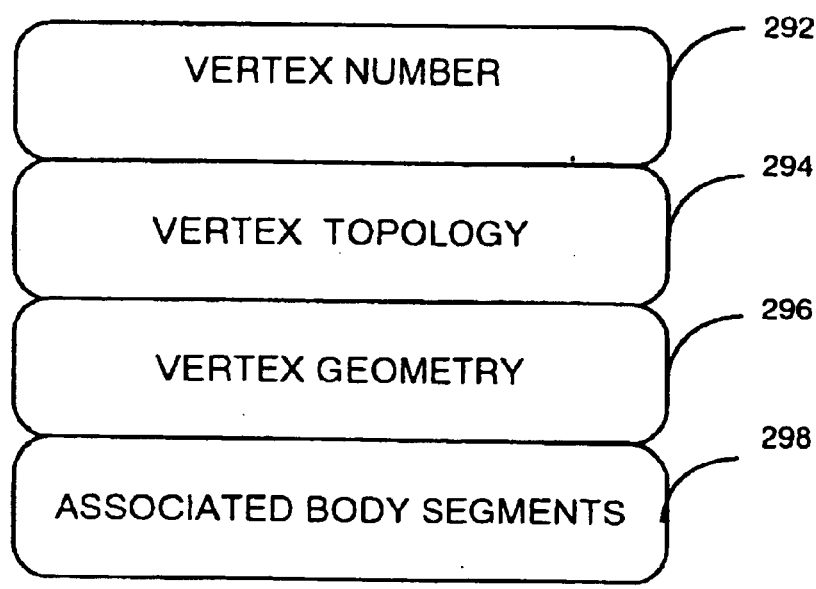
FIG. 36 is a representation of the data structure for a generic polygon wire mesh for a generic model avatar.

FIG. 36 is a diagram illustrating the data structure of data stored defining the generic wire mesh model 270 of an avatar 135. The generic wire mesh model 270 comprises data defining the position, connectivity and associated body segment of a number of points corresponding to vertices on the surface of a polygonal wire mesh model of a generic individual. Stored within the memory 125 for each of the vertices of the polygonal wire mesh model is a vertex number 292, a vertex topology 294 a vertex geometry 296 and a list of associated body segments 298. The vertex number 290 uniquely identifies each vertex. The vertex topology is a list of vertices to which the vertex identified by the vertex number 290 is connected within the wire mesh model 270. The vertex geometry 296 is a set of x, y and z coordinates identifying the initial position of the vertex identified by the vertex number 292 in the wire mesh model in an initial position. Each vertex also has associated with it a list of one or two associated body segments 298. The association of vertices with a body segment enables the generic avatar to be used to generate images of the avatar in different poses as will be described in detail later.

FIG. 37 is an illustration of the wire mesh model 270 of a generic avatar in an initial position. In this position the vertices on the wire mesh model 300 appear as representations of a three-dimensional model where x, y and z coordinates correspond to the x, y and z coordinates of the vertex geometry 296. Each of the vertices of the wire mesh model are connected to other vertices in accordance with the vertex topology 294 for that vertex. A portion of the wire mesh 302 between the legs of the model 300 comprise a number of polygons representative of a skirt. This portion of the wire mesh 302 is provided by including in the vertex topology 294 of the generic model avatar a number of connections between vertices in the front left leg to vertices in the front of the right leg of the model and between vertices in the back of the left leg to vertices in the back of the right leg. When calculating a colour rendering function for generating an avatar of an individual the rendering for this portion 302 of the wire mesh 300 is varied depending on whether it is or is not determined that the user is wearing a skirt as will be described below.

Images corresponding to the generic model avatar in different poses can then be created by inputting data corresponding to a set of generic avatar joint angles 280. This data 280 is then processed by the movement deformation program 290 to determine initially how varying the joint angles in the manner described would position the body segments corresponding to those joint angles and then how this would affect the positioning of the individual vertices associated with each body segment. The movement deformation program 290 also when calculating a modified geometry ensures that the joint angles requested remain within maximum and minimum limits to mimic the body's normal limited flexibility. The movement deformation program 290 may be arranged to also ensure that the deformed geometry is constrained so that the surface of the deformed polygonal mesh does not intersect itself since this would correspond to an individual passing one part of this body through another. By limiting the effect of changing a joint to cause a transformation on the wire mesh model of vertices only associated with some of the body parts the input of joint angles can be used to generate a wire mesh model of the generic avatar in any pose. Thus for example where the angle of a joint corresponding to a shoulder is varied this would be processed to impose a translation on all of the vertices corresponding to points associated with body segments corresponding to the upper arm, the lower arm and the hand. In contrast where a joint angle corresponding to the orientation of the elbow is changed this would only affect the position of vertices associated with the lower arm and hand. By associating each of the vertices with one or more body segments the deformation required to account for a change in the position of the model is simplified since the actual geometry for the modified wire mesh needs only to be calculated in terms of how the body segments associated with a vertex is affected by changes in the joint angles and how a vertex is affected by a change of a joint angle (if at all). The overall affect of a variation in joint angles is then the sum of how an associated body segment is affected by the change in joint angles and how the individual vertices on a body segment are affected by the change in joint angle.

For the majority of vertices, a transformation to account for a change in orientation of a joint angle is solely determined by the translation and rotation of an associated body segment. However for points located around the joints centres the change in orientation of one limb relative to another will affect position relative to the remaining vertices associated with a joint segment to account for the stretching of the skin. The processing of the data for the wire mesh model to account for these changes will now be described with reference to FIG. 38.

FIG. 38 is a representation of a portion of the wire mesh model for a generic avatar corresponding to the upper arm 308, elbow 310 and forearm 312 in two positions. When the joint angle corresponding to the elbow is changed this causes points in the lower forearm 312 to all be translated in the same way. A change in the angle of the elbow has no affect on the positioning of vertices corresponding to the upper portion 308 of the upper arm. Between the upper portion of the upper arm and the forearm 312 are a set of vertices 310 whose relative positioning vary with the variation of the joint angle corresponding to the elbow. By having the movement deformation program to cause the relative positions of these points to vary in accordance with the joint angle in addition to any translation which is imposed on all of the vertices associated with the forearm, hand and wrist. The wire mesh model 270 is made to appear to stretch its skin about the elbow joint.

Thus the combination of the generic wire mesh model 270, and the movement deformation program 290 enable the computer 120 to generate wire mesh model representations of the generic model avatar in any position as is detailed by a set of joint angle 270.

Avatar Construction Program—Avatar Generation

Returning to FIG. 24B, the generation of an avatar from the image data and outline data obtained by the booth 1 will now be described. After, the image data and outline data have been amended to account for head tilt (s60) occurring in different images, the data storage portion 138 of the memory 125 of the booth will have stored therein: four orthogonal images of an individual, four outlines corresponding to those images and a set of coordinates for facial features identified in the images, where y-coordinates (height) of the facial feature points corresponding to the same features are equal. This data is then utilized by the avatar construction program 134 firstly to select an initial geometry for modelling the individuals head and then to calculate together with a standard generic model of an individuals body how this initial model should be modified to represent the actual individual.

(a) Head Selection

Figure 39:
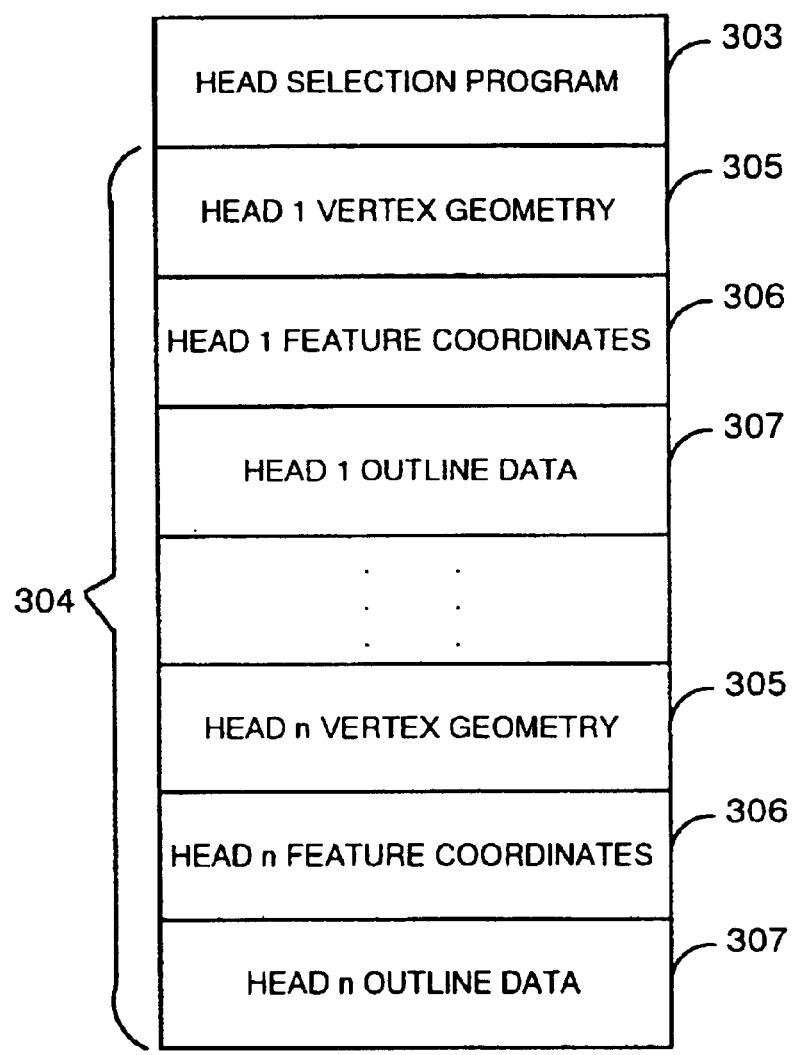
FIG. 39 is a block diagram of a head selection module of an avatar construction program.

FIG. 39 is a block diagram of a head selection module of an avatar construction program 134 in accordance with this embodiment. The head selection module comprises a head selection program 303 for utilizing facial feature coordinates and outline data to select an initial head geometry and a set of n head models 304. In this embodiment the head models each comprise a vertex geometry 305 corresponding to a vertex geometry for the head portion of an avatar, a set of feature coordinates 306 and a set of outline data 307. As will be described in detail the head selection program 303 utilizes the feature coordinates and outline data stored in the data storage portion 138 of the memory 125 to determine which of the head geometries 305 most closely correspond to the geometry of the head of an individual who is to be modelled.

Figure 40:
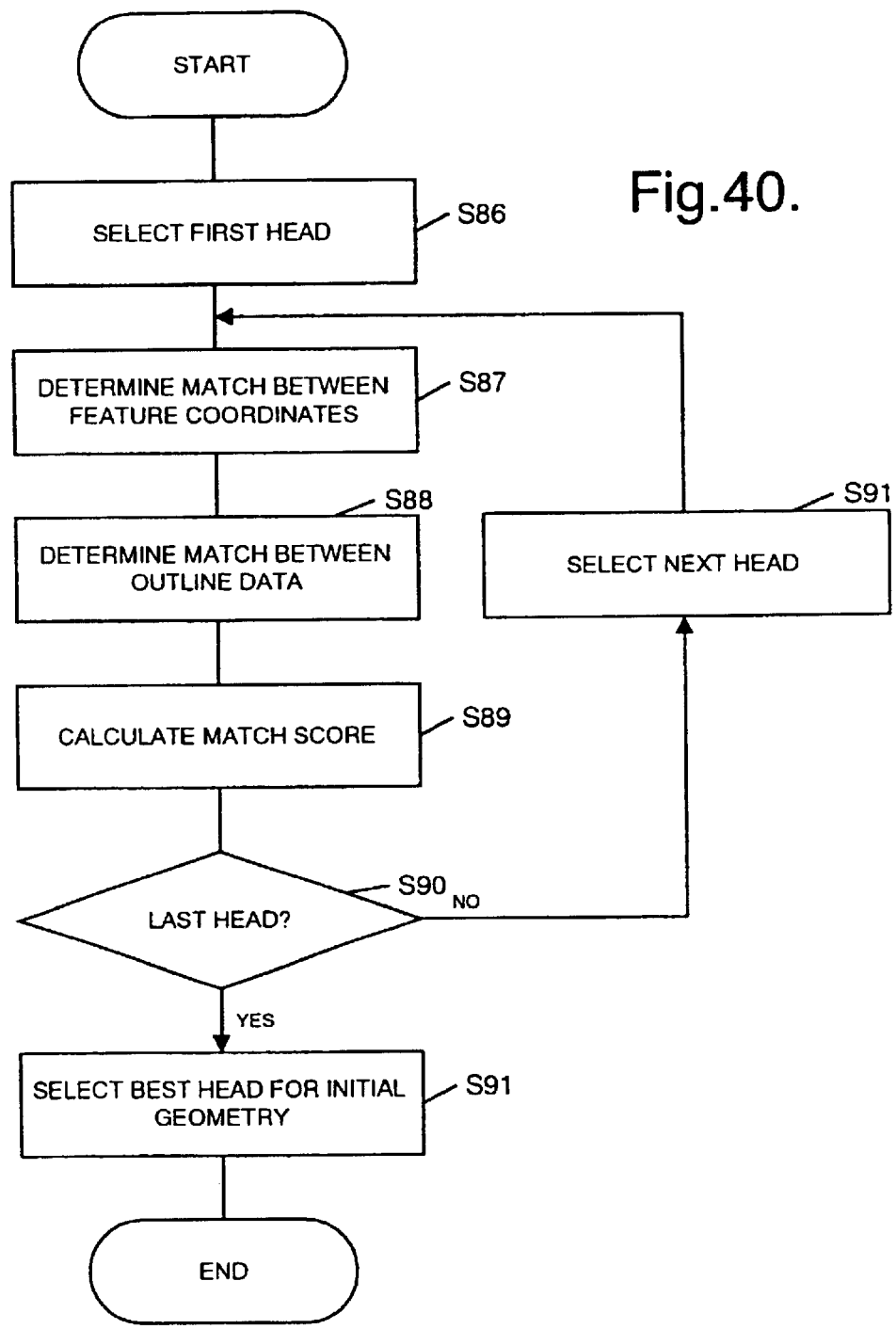
FIG. 40 is a flow diagram of the processing of a head selection program.

FIG. 40 is a flow diagram of the processing of the head selection program 303 in accordance with this embodiment of the present invention. Initially the head selection program 303 selects (s86) the first of the set of n head models 304.

The head selection program 303 then (s87) determines the correlation between the feature coordinates 306 for the head model currently under consideration with the feature coordinates stored in memory 125. In this embodiment the correlation between the feature coordinates of the head model under consideration and the feature coordinates stored in the memory are determined by initially calculating a vector off-set for the facial feature point corresponding to an individual's nose relative to the corresponding facial feature point for a nose within the head model and then applying this calculated vector offset to all of the feature coordinates for features for the head model 306. Thus in this way the coordinates corresponding to the nose are made to match. The head selection program 303 then determines for each of the feature points the difference between the coordinates stored in memory for a feature point and the feature coordinates 306 associated with the head model under consideration. A value indicating how closely the head model under consideration matches the three-dimensional structure of the individual from whom images have been obtained is then determined by calculating the sum of the modulus of each of the vectors between the coordinates of the feature coordinates 306 for a feature point stored in memory and the corresponding feature coordinates for the head model under consideration. This value indicates how the relative positions of feature points within the head model currently under consideration and corresponding feature points identified from images of an individual match. The value is then stored in memory.

The head selection program 303 then (s88) determines a value indicative of the match between outline data 307 for the head model currently under consideration with outline data for the head portion of an individual in profile obtained when the individual stands in the position indicated in FIG. 6. By identifying the point on the outline corresponding to the tip of an individual's nose and the corresponding point within the outline data 307 for the model under consideration an average difference between the points in the profile of an individual and a profile for a model head can then be determined. This value is then also stored within the memory 125.

After values for the match between the feature coordinates (s87) and between the outlines (s88) for an individual's head and a model head stored within memory have been determined the head selection program 303 then calculates a match score for the head model under consideration. In this embodiment the match score is calculated (s89) by determining the sum of the values for the match between feature coordinates and the match between outline data for a head model under consideration. It would of course be appreciated that in different embodiments of the present invention a weighted sum for the differences between corresponding points on the surface of a model head and points on the surface of an individual's head could be determined placing greater or lesser weight on the match between facial feature points and outline data.

After a match score has been calculated (s89) this is stored in memory and the head selection program 303 then determines (s90) whether the head model currently under consideration is the last of the set of n head models 304. If this is not the case the head selection program 303 then (s91) selects the next head model and then repeats the determination of values for the correspondence of the next head model and corresponding points for the head of an individual to determine a match score (S87–s89).

When the head selection program 303 determines (s90) that the last head model of the set of n head models 304 has been considered there will be stored in memory a match score calculated for each of the head models of the set of n models (s304). The head selection program 303 then selects as an initial head geometry for a model avatar to be generated the vertex geometry 305 corresponding to the head model which the lowest match score has been stored. Thus in this way by storing data indicative of how the profile and relative positioning of facial features varies for a number of different models of a head a means is provided to enable the avatar construction program to select as an initial vertex geometry for the portion of a generic model avatar corresponding to the head of an individual, a vertex geometry which relatively closely corresponds to the geometry of the individual to be modelled. A generic model avatar having a vertex geometry comprising vertex geometry for the selected head model for vertices on the surface of the model's head, a generic vertex geometry corresponding to a model individual for points corresponding to vertices on the surface of the model's body and a calculated average for vertices corresponding to points where the head and body join is then utilized to calculate a final geometry for a model avatar for the individual as will now be described.

(b) Outline Calculation

In order for the computer to generate an avatar of an individual utilizing the generic model avatar with the selected head geometry, initially the computer determines values for an outline of the model avatar with the selected head geometry in poses corresponding to those adopted by the individual in FIGS. 5 to 8. In order to calculate outlines corresponding to the generic avatar with the selected head geometry in the poses of FIGS. 5 to 8 the computer takes the calculated orientations of the actual positions of a user's limbs and uses these to determine joint angles which are then used by the movement deformation program 290 to construct a wire mesh model corresponding to the generic avatar utilizing the amended head geometry in the positions corresponding to the positions adopted by the user in the images. Since the position of the camera relative to the foot marks is fixed from the deformed vertex geometry corresponding a wire mesh model of an avatar in the positions of the user. The points on the calculated surface for the wire mesh model corresponding to points on the outlines as seen from the cameras can then be determined.

Returning to FIG. 24B when four outlines have been calculated for the avatar with the selected head geometry in the four poses for which image data has been obtained the avatar outlines are then (s63) scaled in accordance with the scaling factor stored in memory 125.

The computer 120 then determines (s64) a mapping function between the vertices of the wire mesh model of the avatar 300 corresponding to the eyes, nose, sides of the mouth and chin in an image of the avatar positioned and scaled compared with the identified positions of the corresponding facial features appearing in the image data. This mapping for these facial features is then stored in memory 125.

The computer then compares the outlines for the avatar model with the outlines generated from the image data of a user to calculate (s64) the distortion of the outlines required so that the outline of the avatar would correspond with the outline for the image data.

The comparison of the facial feature points and the points on the polygonal wire mesh model 270 of the avatar which correlate to points on the outlines of the avatar are then used (s65) as the basis for generating a mapping for all of the vertices of the polygonal wire mesh for the avatar model 270 by calculating the required distortion for the remaining vertices by interpolating (s66) intermediate distortions from the distortions identified for facial features and from the orthogonal outlines.

Where it has been determined that the outlines of an individual correspond to an individual in a skirt the distortion for vertices in the legs of the model is calculated dependent upon whether the vertices correspond to points above or below the detected crotch height. For vertices in the legs below the detected crotch height the distortion is calculated from the outline data in the usual way. The vertices in the legs above the detected crotch height are hidden from view by the skirt and hence the outline data is unsuitable for calculating an appropriate distortion for these vertices. The distortion for these vertices is therefore interpolated from the highest point below the detected crotch height and the calculated actual position of the crotch based upon the detected height of the individual.

The function for distorting the polygonal mesh of the model avatar 270 is then used to generate a set of data corresponding to the vertex geometry of a wire mesh model for an avatar corresponding to the individual by applying the calculated distortion to the vertex geometry 296 of each of the vertices of the generic wire mesh model 270.

In this way a wire mesh model of the individual is obtained since the movement deformation program 270 is arranged to apply a further deformation to a set of vertices corresponding to the vertices of a wire mesh model. This program 270 can now be used to generate representations of the wire mesh model corresponding to the individual for which image data has been obtained in any pose in accordance with joint angle data.

(c) Texture Rendering Calculation

Returning to FIG. 22, colour rendering techniques are then used to determine (s33) a colour texture render function to colour the surface of an avatar having this revised geometry using the image data of the individual captured using the first digital camera 36 as will now be described.

The texture rendering function for colouring the surfaces of a polygonal wire mesh representing an individual, in this embodiment comprises a texture map and a set of texture coordinates, the texture map representing the surface texture of the model and the texture coordinates being mapping between the projection of the vertices of the wire mesh model in a predetermined pose on to the texture map. The texture map and texture coordinates can then be used to texture render the model of the individual in any pose since the relative positions of the vertices in a calculated model of the individual in a pose define a distortion function for distorting a corresponding portion of the texture map identified by the texture coordinates for those vertices.

The texture map is calculated by comparing the images obtained of an individual using the first digital camera 36 with calculated representations of the avatar corresponding to that individual in the positions adopted in each of the four images.

The computer then calculates the orientation of normals to the surfaces of each of the polygons which have not already been recorded as rendered as being transparent. This normal is then compared with estimated directions from which image data has been captured and a texture rendering is calculated for colouring the surface of that polygon from the images which most closely correspond to the direction from which image data is available. Thus the polygons corresponding to the front surface of an avatar will have normals orientated in one direction and are coloured using texture data obtained from the image for the user obtained by the first camera 36 in the position of FIG. 5. For polygons with normals oriented in the opposite direction, a texture rendering is calculated from the image of the user in the position of FIG. 7. For polygons having normals to their surfaces orientated at angles in between these directions a blend of colour texture is calculated for the surface of the polygon from the pair of images for the avatar corresponding to the images which are closest to the orientation of the polygon surface. Thus for example portions of the avatar oriented forward and to the left are coloured using a blend of colours determined from the images of the user in the positions of FIGS. 5 and 8. By varying the ratio in which the colours for an individual polygon are blended from the two images in accordance with the angle corresponding to the normal surface of that polygon. A gradual blending from the image data obtained from one pose to another is obtained. Once a texture rendering function for the entire surface of each of the polygons has been calculated this is then stored in the memory 125.

In order to generate a representation of a skirt if required, the texture rendering of polygons representative of a skirt 302 is determined upon whether the detected crotch position is indicative or a crotch of a skirt hem. If it is determined from the detected crotch height that no skirt is being worn these polygons are rendered as being transparent. If the detected crotch height is indicative of the hem of a skirt the skirt polygons are rendered using image data in the ordinary way with portions of the polygons representative of a skirt outside of the outline for the individual being rendered as transparent.

When a texture map for texture rendering the surfaces of the polygonal mesh has been determined the texture coordinates for the texture rendering function are calculated so as to correspond to the projections of the vertices of the wire mesh so that the images of the model in the poses from which data has been captured are as far as possible the same as the image data.

(d) Avatar Animation

The animation program 137 is then invoked and causes a sequence of images representative of the newly generated avatar to be displayed on external 20 screens. The animation program 137 comprises a list of joint angle data and an animation engine which processes the joint angle data to generate images of the newly generated avatar of the individual in a number of different stances in the same way as the movement deformation program 240. The animation engine also additionally processes the texture coordinates and texture map to cause the newly generated avatar to be coloured in accordance with a calculated texture rendering function. In this way an individual is presented with an animated avatar of him or herself as soon as the avatar generation process is complete.

Data Compression Dispatch and Storage

At this stage the computer system 120 has stored in its memory a user's name, a generated avatar identification number, a password, an avatar geometry and data representative of a texture rendering function comprising a texture map and texture coordinates for colouring an avatar.

Prior to sending the data to the server the texture map is compressed to reduce the amount of data which is sent over the Internet as will now be explained.

The texture map for an avatar is calculated by the computer system 120 is based upon the image data obtained by the first camera 36. By having a texture map corresponding to data from the images obtained by the first camera 36 indicative of the texture of an individual and not sending irrelevant data about the background appearing in the image the size of the texture rendering function is reduced relative to the size of the images from the camera 36. However, the size of the texture map can still be further compressed by compressing individual parts of the data to a lesser or greater extent in dependence upon the relative importance of the correct textural rendering of individual parts of an avatar's body. In this respect it has been determined that the most important areas of an avatar to be correctly coloured are the hands and the face. In particular the face areas around the mouth and eyes are sensitive to any loss of information during compression as any changes in these areas of the avatar result in noticeable apparent differences to the appearance of the avatar. In this embodiment of the present invention whereas for the majority of the surface of the avatar the texture rendering functioning for transmission is compressed to about 1/50th of the amount of data for the original texture rendering function, data for the face of the avatar is compressed only to about ¼ of its original size with areas around the eyes and mouth not being compressed at all.

Figure 41:
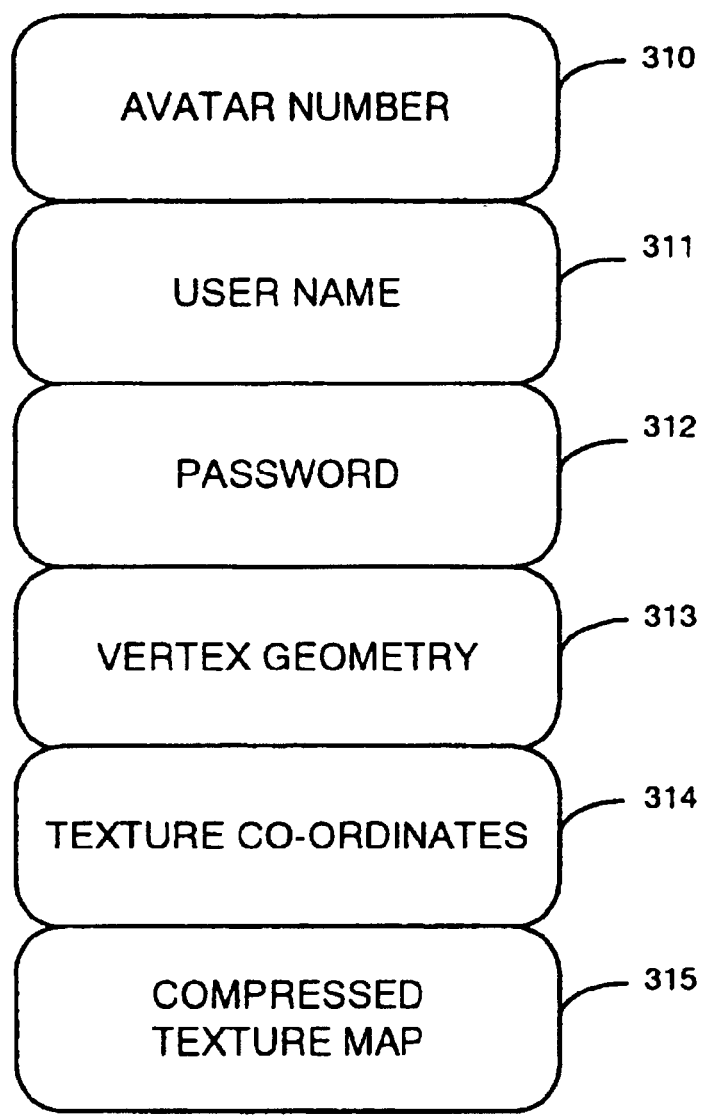
FIG. 41 is a diagram illustrating the data structure of an avatar transmitted from the booth of FIG. 2 to a server.

After the texture map of an avatar has been compressed data representative of the avatar is transmitted from the booth 1 to the server 2 via the Internet 3. FIG. 41 is a diagram illustrating the data transmitted from a booth 1 to the server 2. The data comprises an avatar number 310 being the generated avatar identification number, data representative of a user's name 311 being the data input by the user, a password 312, vertex geometry 313 comprising the relative positions of a predetermined number of points on the surface of an individual and texture rendering function data comprising texture coordinates 314 and a compressed texture map 315, the texture coordinates 314 corresponding to the projections of the points identified by the vertex geometry 313 onto the compressed texture map 315.

This data comprises all the data that is necessary to identify and then generate a computer model of an individual provided that the manner in which the vertices identified by the vertex geometry 313 are connected is known. Since however, the manner in which the points identified by the vertex geometry 313 are connected corresponds to the vertex topology of the generic model avatar, the manner in which the points of the vertex geometry 313 are connected is known in advance and hence may be distributed separately from the data specific to an individual avatar.

Figure 42:
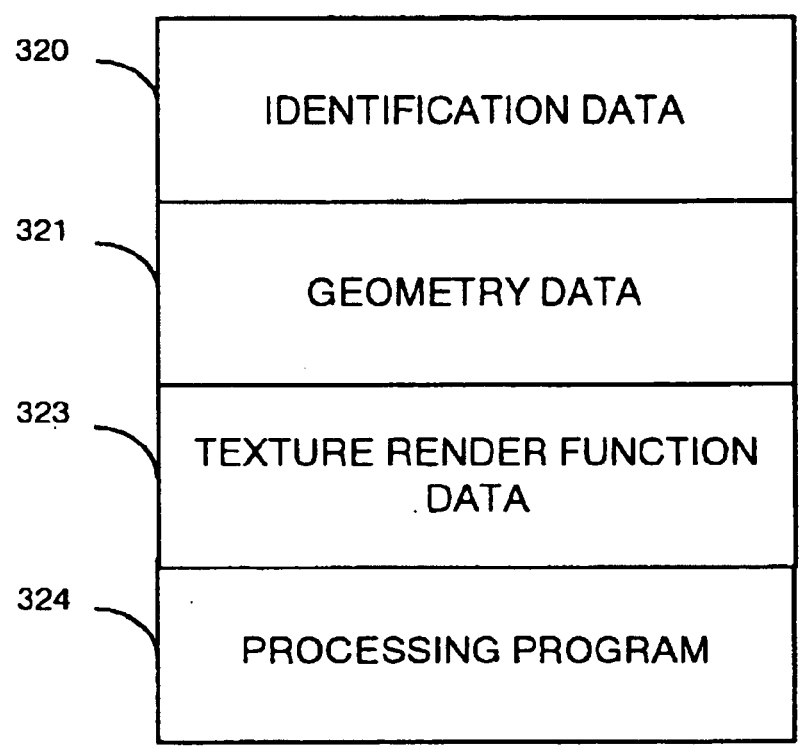
FIG. 42 is a block diagram of the structure of a data storage system of the server of FIG. 1.

FIG. 42 is a block diagram of the data storage system of a server 2. The data storage system of a server 2 has stored therein a plurality of sets of data comprising identification data 320, geometry data 321 and texture rendering data 323 for a plurality of avatars. The identification data comprises data representative of the name, identification number and password for an avatar generated from the booth 1. The geometry data 321 and texture rendering data 322 comprises data representative of a geometry and a corresponding set of texture coordinates and a texture map for generating an avatar. Each of the sets of identification data 320 is associated with one set of geometry data 321 and texture rendering function data 323 representative of the avatar identified by the avatar identification.

The data storage system of the server 2 also has stored therein a processing program arranged 324 to process signals received from the Internet and to transmit data to a user station on the basis on the processing of those signals. By providing means by which users can identify and obtain data from a server a means is provided in which users can download onto their own computers avatars which have been generated using the booth 1. By associating identification data 320 with geometry data 321 and a texture map and a set of texture coordinates 323 for an avatar a means is provided to limit the access to avatars to individuals who are in possession of the identification data and thus the use of an avatar can be restricted to appropriate individuals.

Animation of a Stored Avatar

Figure 43:
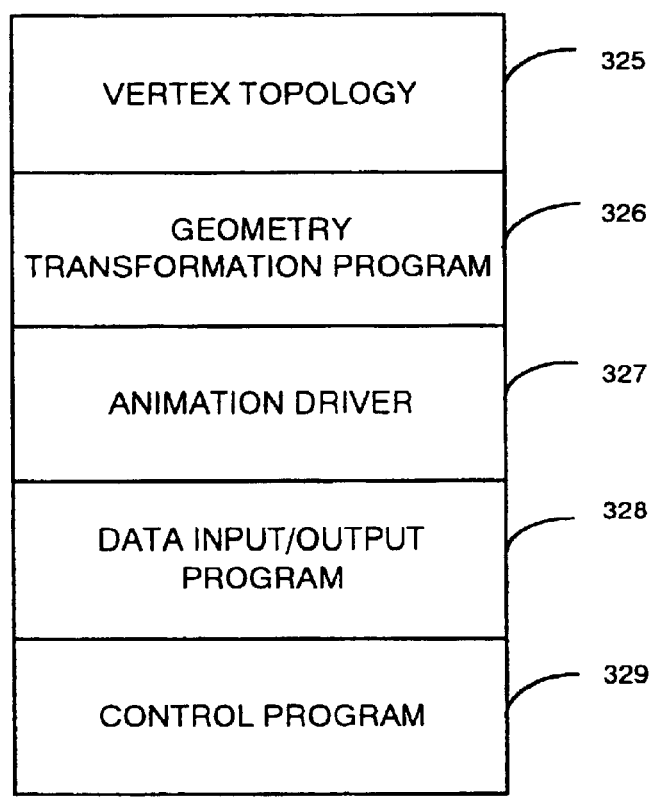
FIG. 43 is a block diagram of the memory of a user station of FIG. 1 having animation software stored therein.

FIG. 43 is a block diagram of the content of the memory of a user station 4 having stored therein an animation program. The memory has stored therein a vertex topology 325 corresponding to the vertex topology 294 for the generic wire mesh model 270 stored in the booth 1. The memory also has stored therein a geometry transformation program 326, an animation driver 327, a data input/output program 328 and a control program 329.

The geometry transformation program 326 comprises a program for calculating the transformations of points identified by geometry data to generate geometry data for an avatar in any of a number of poses. The geometry transformation program 326 therefore is similar to the movement deformation program 290 stored in the memory 125 of the computer system 120 of the booth 1. The animation driver 327 comprises means for generating a series of animation instructions which are used by the geometry transformation program 326 to generate geometry data for an avatar in a pose identified by the animation instructions. The animation driver 327 is arranged to generate an animated sequence of images on the basis of the transformed geometry, the vertex topology 325 and texture coordinates and texture data received. The animation driver 327 also includes means for generating backgrounds and representations of other objects with which an animated avatar may be shown to interact.

The data input/output program 328 is arranged to coordinate the receipt of data via a keyboard and a modem connected to the Internet and also arranged to transmit data from the user station 427 via the Internet. The control program 329 is arranged to coordinate the interactions between the data input/output program 328 and the animation driver 327.

Figure 44:
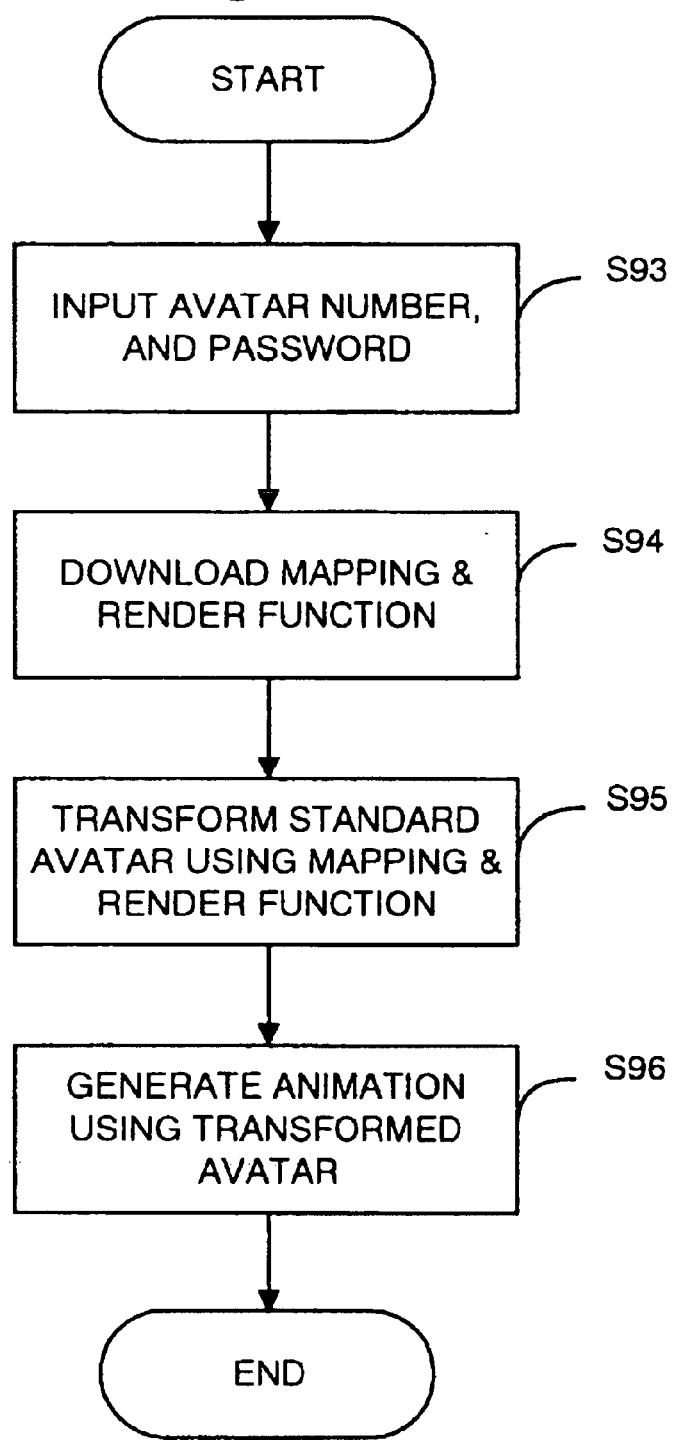
FIG. 44 is a flow diagram illustrating the steps involved in the generation of an animated sequence of computer graphical representations of an individual on a personal computer using a data generated using a booth which has been stored on a server.

FIG. 44 is a flow diagram illustrating the steps taken by a user who wishes to download a previously generated avatar that is stored on a server 2 into his computer 4 that has software stored within its memory which will utilise the geometry texture map and texture coordinates for an avatar of an individual. Initially the user (s93) inputs the avatar identification number and the password printed on a card 140 printed from a booth 1 into the computer 4. The computer then transmits the password and avatar identification number to the server 2 via the Internet together with a request to download the data representing the geometry and colour rendering functions for the user stored on the server 2.

When the server 2 receives the request to download the geometry and rendering functions it checks that the password and avatar identification number received correspond to a transformation and rendering function stored within the server and then causes the computer 4 to download (s94) the data representative of the geometry and rendering functions for that user into its memory. By making the downloading of data representative of a geometry and a rendering function dependent upon the input of a correct avatar number and a password, access to the avatar of an individual is restricted to individuals in possession of this information.

When the application software within the computer 4 is then invoked to generate representations of an individual using an avatar representing the individual the avatar geometry individual is used to generate a wire mesh model of an individual then coloured using the texture map and texture coordinates (s95).

The application software then generates a series of graphical representations indicative of the movement of an individual for the image data has been obtained by generating computer representations (s96) of the avatar in the variety of different stances wherein each case the representation of the avatar is distorted in accordance with a set of joint angles which are utilised by a animation generation program to distort the avatar in a similar manner to that which has previously been described. In this way the avatar used by an individual on their computer can accurately represent an individual for whom image data has been obtained using the booth 1.

Second Embodiment

A second embodiment of the present invention will now be described which is identical to the first embodiment except that the booth in this embodiment is adapted to be portable and additionally the booth is arranged to obtain extra structural information about an individuals head to improve the correspondence between individuals and their avatars.

Figure 45:
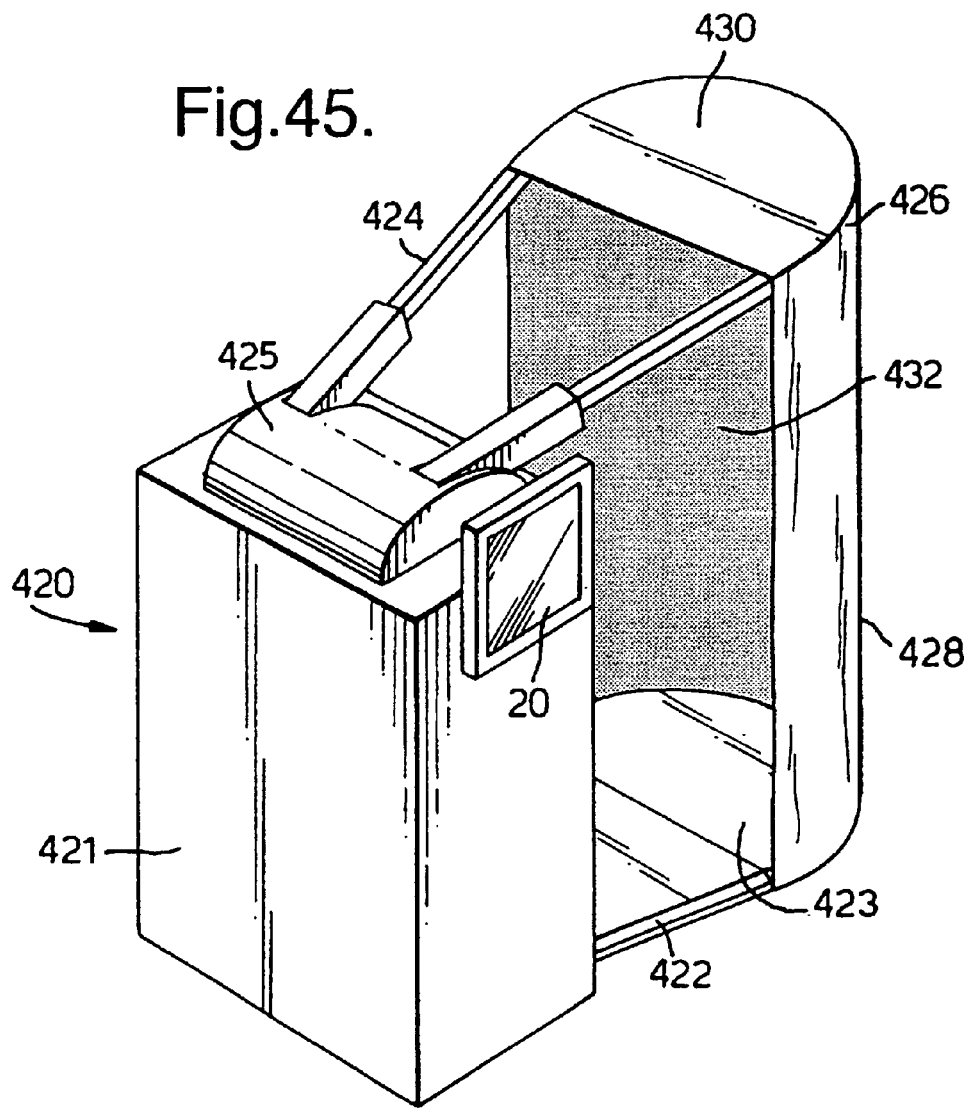
FIG. 45 is a schematic perspective view of a booth in accordance with a second embodiment of the present invention.

FIG. 45 is a schematic diagram of the external appearance of a booth 420 in accordance with a second embodiment of the present invention in a first configuration. When in this first configuration the booth 420 is arranged to obtain images data of an individual to generate an individual's avatar.

In this embodiment, the booth comprises a housing 421 open at its upper end and mounted on casters (not shown in FIG. 45). The control system of the booth 420 (not shown in FIG. 45) is contained within this housing 421 in a similar manner in which the first section 30 of the booth 1 houses the control system 39 of the booth 1 in accordance with the first embodiment of the present invention. On part of the exterior side wall of the housing 421 there is a removably mounted external display screen 20 similar to that mounted on the exterior wall 10 of the booth in accordance with the first embodiment.

Extending away from the base of the housing 421 for a distance of 1.7 metres is a floor comprising a first rectangular floor section 422 adjacent to the housing and a second semi circular section 423 extending from the far side of the rectangular section 422. Extending away from the top of the housing 421 at either side of the top of the housing are a pair of cantilever arms 424, the cantilever arms 424 each comprising aluminium tubes having a square cross section. These cantilever arms 424 are attached to the upper surface of the housing 421 by a curtain support 425, the curtain support 425 acting as a lid enclosing the open upper end of the housing 421. The curtain support also spring biases the cantilever arms 424 in to the position shown in FIG. 45.

The far end of the cantilever arms 424 are integrally formed with semicircular tube 426 which mirrors the semicircular section 423 of the floor directly below. The semicircular tube 426 also has a square cross-section identical to that of the cantilever arms 424. A curtain 428 extending to the floor below is attached to this semi circular tube 426 by means of a velcro strip bonded to the outer semicircular perimeter of the tube 426. Extending across the top of the curtain 428 is a semicircular roof portion 430 which is also bonded to the semicircular tube 426. The interior of the curtain 428 and the underside of the semicircular roof portion 430 and the semi circular section of the floor 423 furthest from the housing 421 together define a posing area 432 and in this embodiment are all uniformly covered in a matt material of green colour which represents a saturated green colour when viewed by a digital camera. The uniform apparent colour of the interior of the booth is maximised as the matt material reduces specular reflection and hence reduces apparent variation in shade.

In the first embodiment of this invention, a booth 1 was described in which outline information about an individual in a pose was obtained from a silhouette image of an individual lit only from behind. A separate image was then used to obtain colour information about the forward surface of an individual in a pose and an avatar of an individual was generated using the outline obtained from the back lit image and the colour information obtained of an individual in the same pose lit from in front. In this embodiment of the present invention a single image is used to obtain an outline of an individual for modifying a stored avatar model and at the same time obtaining colour image data of the front surface of an image to colour such a model. In this embodiment, this is achieved by providing a uniformly coloured back drop against which an individual poses and then extracting outline data from a colour image of an individual using standard chroma-key techniques to identify the outline of an individual. After an outline of an individual in a pose has been determined the outline is used to modify a stored model to generate an avatar corresponding to the individual posing and then coloured using the same image of that individual.

Figure 46:
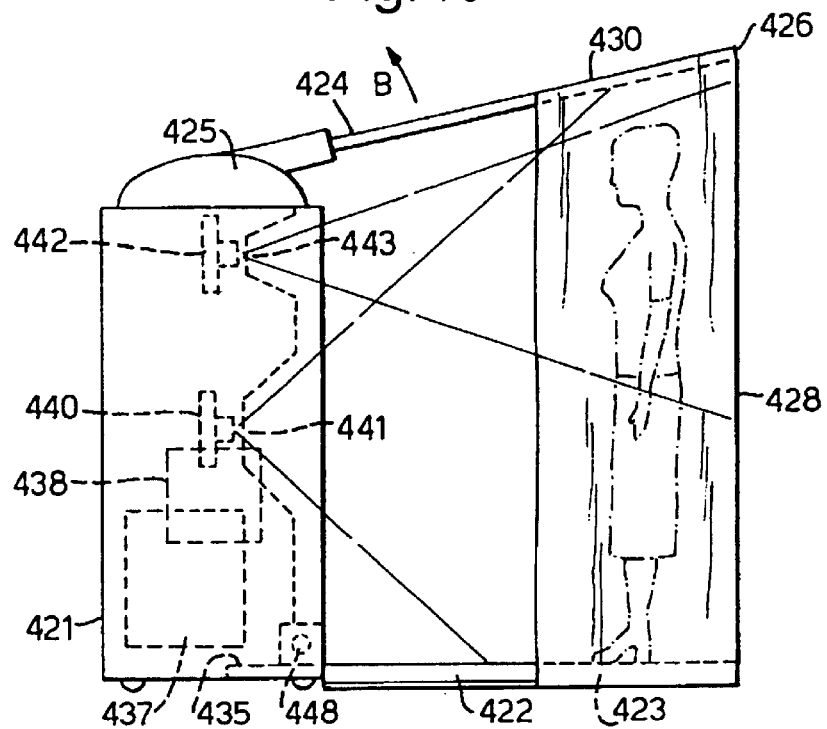
FIG. 46 is a cross-section of the booth of FIG. 45.

FIG. 46 is a cross-section of the booth 420 of FIG. 45. In this embodiment of the present invention the cantilever arms 424 are spring biassed by the curtain support 425 to rotate about an axis in the direction indicated by arrow B in FIG. 46. It will be appreciated that this biassing could be achieved by any suitable mechanical biassing apparatus, for example, either by directly providing springs attached to the cantilever arms 424 or by providing gas struts arranged to extend so as to push the cantilever arms 424 in the direction indicated by arrow B.

The lower edge of the curtain 428 is releasably attached to the outer edge of the far end of the floor 423 for example by velcro strips which fix the position of the lower edge of the curtain 428. The combination of the spring biassed cantilever arms 424 and the fixing of the lower edge of the curtain 428 acts to cause the curtain 428 to be placed under tension and thereby removes from the curtain 428 any folds which enable a uniform interior to be presented to the interior of the booth 420 that is substantially free from shadowing effects.

In this embodiment the base of the housing 421 is arranged to define a slot 435 into which the first rectangular floor portion 422 is releasably inserted. The second floor portion 423 is then releasably fixed to the first floor portion 423. The extension of the floor 422,423 from the underneath of the housing 421 acts to ensure that if any force is applied to the semicircular tube 426 this does not cause the booth 420 to tip over and also prevents the housing 421 from rolling on its castors when in this configuration. Furthermore by providing a releasably removable and separable floor 422,423 the size of the booth 420 can be minimised when it is transported from place to place.

Within the housing 421 there is provided a control system 437 similar to the control system 39 in the first embodiment and means for inputting and outputting instructions 438 similarly constituted to the means for inputting and outputting instructions described in the first embodiment. Also provided within the housing in this embodiment are a first camera 440 located in the centre of the housing 421 behind a window 441 enabling the camera 440 to view the far end of the booth 420 that is backed by the curtain 428, and a second camera 442 above the first camera 440 behind a second window 443.

In this embodiment the first camera 440 arranged to have a wide angle lens which enables the camera 440 to obtain an image of the entirety of the height of the booth backed by the curtain 428. The second camera 442 is arranged to obtain an image of the user's head when they stand in front of the curtain. As will be described in detail later the image of an individual's head taken by the second camera 442 when structured light is projected onto the individuals head is used to modify a model head for use as the basis for generating an avatar of the individual, prior to generation of an avatar utilising data obtained by the first camera.

Figure 47:
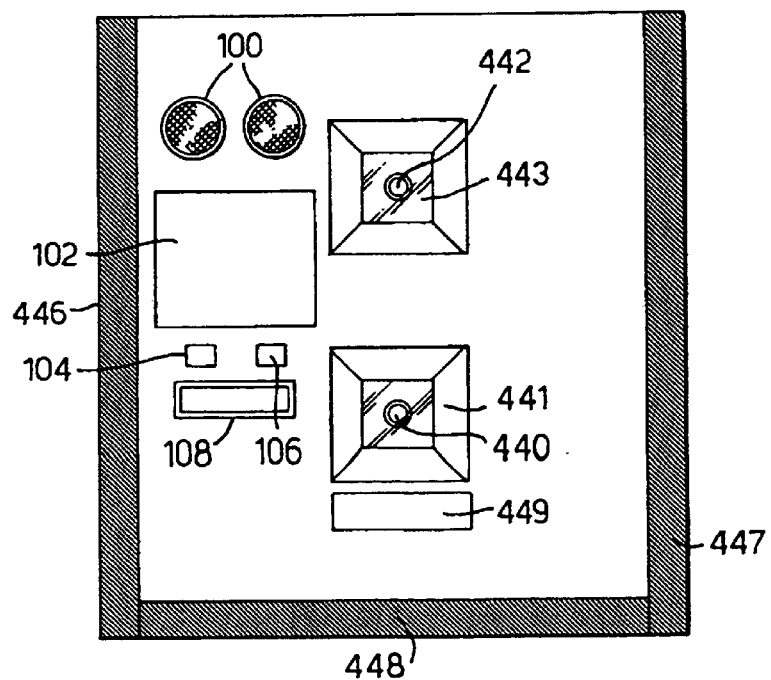
FIG. 47 is a view of the interior of the booth of FIG. 45 looking towards the cameras.

FIG. 47 is a view of the interior of the booth as seen from an individual standing in front of the curtain 428 looking towards the housing 421. As seen from this view the booth is flanked at either side by a pair of fluorescent lights 446,447 extending the height of the housing 421. The fluorescent lights 446,447 are provided behind strips of blue lighting gel which acts to filter the light emitted from the fluorescent lights 446,447 to ensure that the colour of the fluorescent light does not affect the apparent colour of skin tone of an individual standing in front of the curtain 428. By providing fluorescent lights, 446–447 a means is provided for lighting the interior of the booth 420 in a manner in which does not require frequent replacement of parts such as is required for flashlights as described in relation to the first embodiment. It will however be appreciated that in an alternative embodiment of the present invention flashlights could be used to illuminate the interior of the booth 420.

In the centre of the booth the first camera 440 is visible behind the window 441 above which appears the second camera 442 behind the second window 443. To the left of the cameras and windows 440–443 are the apparatus for inputting and outputting instructions 438 comprising in this embodiment a pair of speakers 100, a touch screen display 102, a credit card reader 104, a bank note reader 106 and a card printer 108 identical to those previously described in relation to the first embodiment. At the base of the booth directly above the floor 423 is provided a third fluorescent light 448 is also situated behind a strip of blue lighting gel. The third fluorescent light 448 is arranged to direct light upwards to overcome the shadowing effect arising from lighting an individual and a curtain 428 from in front only as will now be explained with reference to FIGS. 48A and 48B.

In this embodiment of the present invention an outline of an individual is determined by using standard chroma-key techniques for extracting an image of an individual from a uniform background. In order to extract an image and an outline of an individual from image data using standard chroma-key techniques it is necessary to present an image of an individual in front of a uniformly coloured background normally indicative of saturated colour. However, in contrast to a standard chroma-key screen, in this embodiment of the present invention the user is arranged to pose in front of a curtain 428 of uniform colour in a position between the light source for an image and the curtain 428. The arrangement of lighting in this manner enables the size of the booth 420 to be minimised as the lighting arrangement of fluorescent lights 446,447,448 may be provided within the housing 421 of the booth. However, this arrangement causes a shadow of an individual to be projected onto the back drop. Where the shadow of an individual is particularly strong this can result in failure of a computer to identify which portions of an image correspond to the screen as the lower light levels in the areas of shadow result in values which do not correspond to saturated colour for the purposes of thresholding an image.

Figure 48A:
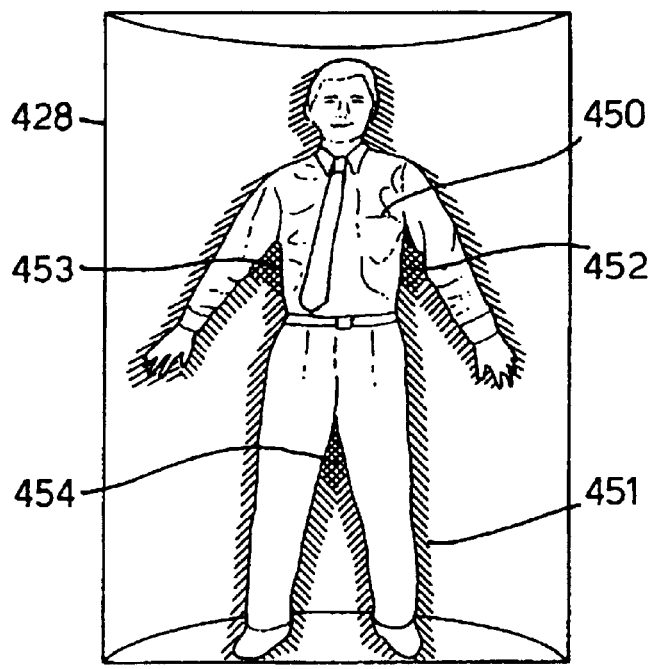
FIGS. 48A and 48B are illustrations of the effect of shadowing arising from illumination from in front.

FIG. 48A is an exemplary illustration of an individual 450 posing in front of a uniformly coloured curtain 428, where the individual 450 and the curtain 428 are both illuminated from positions either side of the individual in front of the individual. The illumination of the individual 450 from the front either side of the individual results in a shadow 451 being cast on the curtain 428 by the individual 450. Specifically, where an individual is illuminated from the front left a shadow is cast to the right of an individual and where an individual is illuminated from the front right a shadow is cast to the left of the individual 450.

The effect of illuminating from the front left and front right is to cause the curtain 428 to be illuminated at three levels of illumination, namely areas of the curtain 428 which are not in shadow, areas of the curtain 428 that are in shadow from either only the illumination from the left or only the illumination from the right and areas in shadow from both of the light sources. The areas in shadow from both light sources tend to occur next to the armpits of an individual 452,453 and next to the crotch of an individual 454. When attempting to identify areas of saturated colour, these areas in a double shadow have been identified as difficult to distinguish due to their low illumination levels. Therefore to avoid the double shadowing effect in this embodiment a further light source 448 is provided which is arranged to light specifically those areas which normally would fall into double shadow.

Figure 48B:
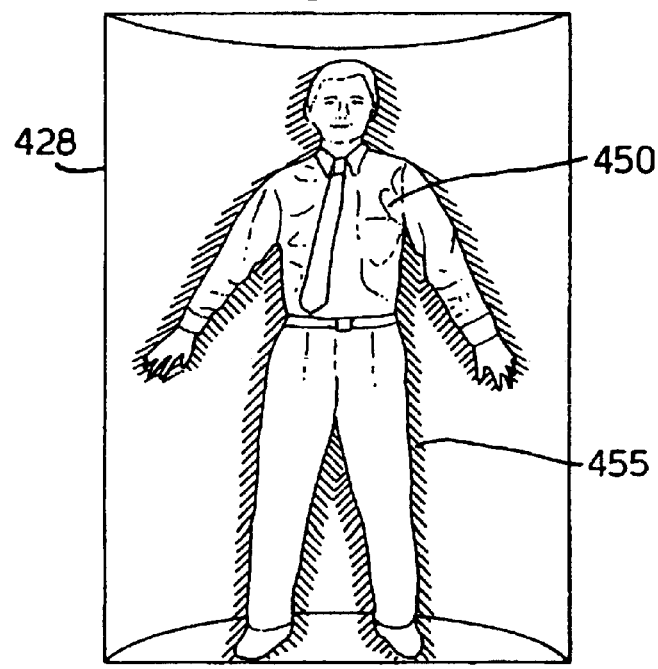

FIG. 48B is an exemplary illustration of the individual shown in FIG. 48A where in addition to being lit from the front left and from the front right the individual is also lit from in front and below in the manner in which lighting of an individual next to the curtain 428 is achieved within the booth 420 of this embodiment. As can be seen from FIG. 48B the shadow 455 surrounding the individual 450 is now uniform with no area being placed within double shadow and it is therefore easier to distinguish between the portion of an image corresponding to an individual 450 and the area of the curtain 428.

Returning to FIG. 47 beneath the window 441 behind which the first camera 441 is situated is provided a structured light source 449. This structured light source 449 is arranged to project structured light upward at a known angle relative to the optical axis of the second camera 442 onto the head of an individual standing in front of the curtain 428 so that additional structural information about the head of an individual may be obtained.

Figure 49:
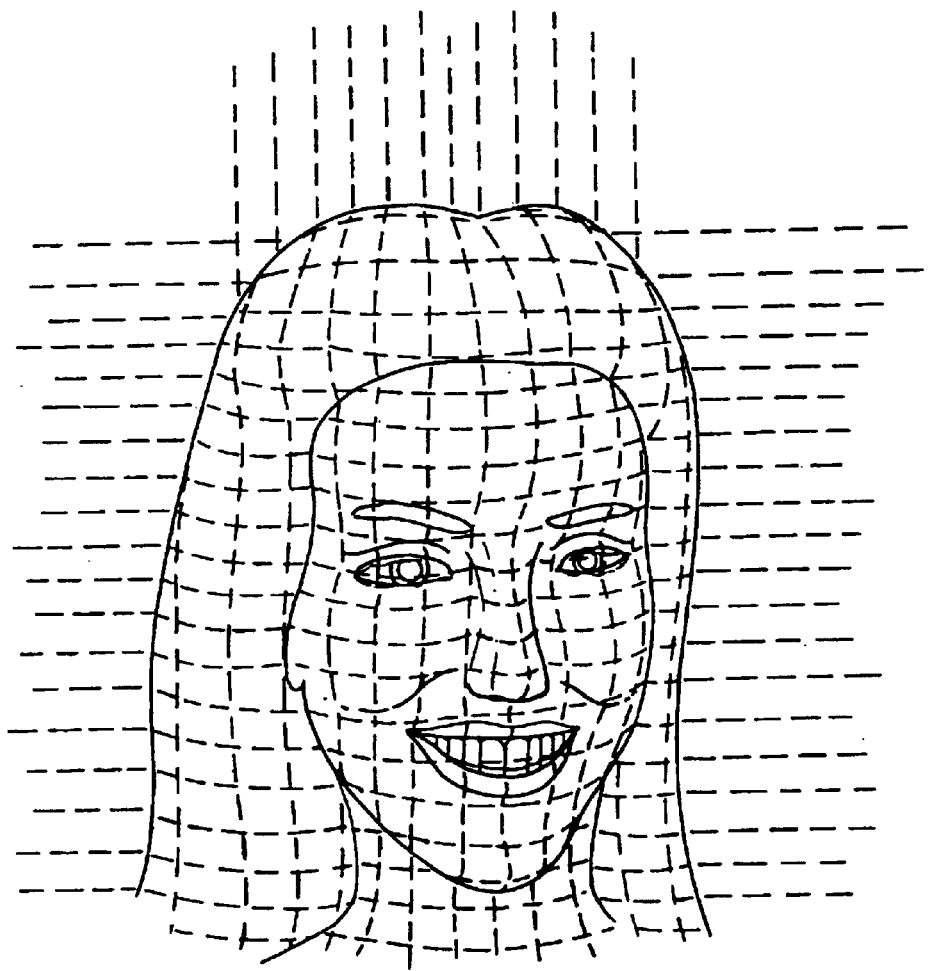
FIG. 49 is an illustration of structured light projected onto an individual's head.

FIG. 49 is an exemplary illustration of structured light projected onto the face of an individual. As can be seen from FIG. 49 in this example the structured light comprises a gridwork of lines which are projected onto the head of an individual. The manner in which the gridwork of line is distorted from a gridwork of orthogonal lines evenly spaced from one another is indicative of a three-dimensional structure of the head onto which the lines are projected. Using standard techniques when an image of the head of an individual onto which structured light is projected is obtained by the second camera 442, the actual three-dimensional structure of the head onto which light is projected can then be determined utilizing the known angle between the optical axis of the second camera 442 and the protection of structured light by the structured light source 449 and the manner in which the gridwork of lines is distorted. As will be described in detail later in this embodiment of the present invention in addition to generating an avatar of an individual from an extracted outline of a full body picture obtained using the first camera 440, in this embodiment a modified model for the avatar is obtained using the additional three-dimensional structural information from an image of a user's head bathed in structured light.

Figure 50:
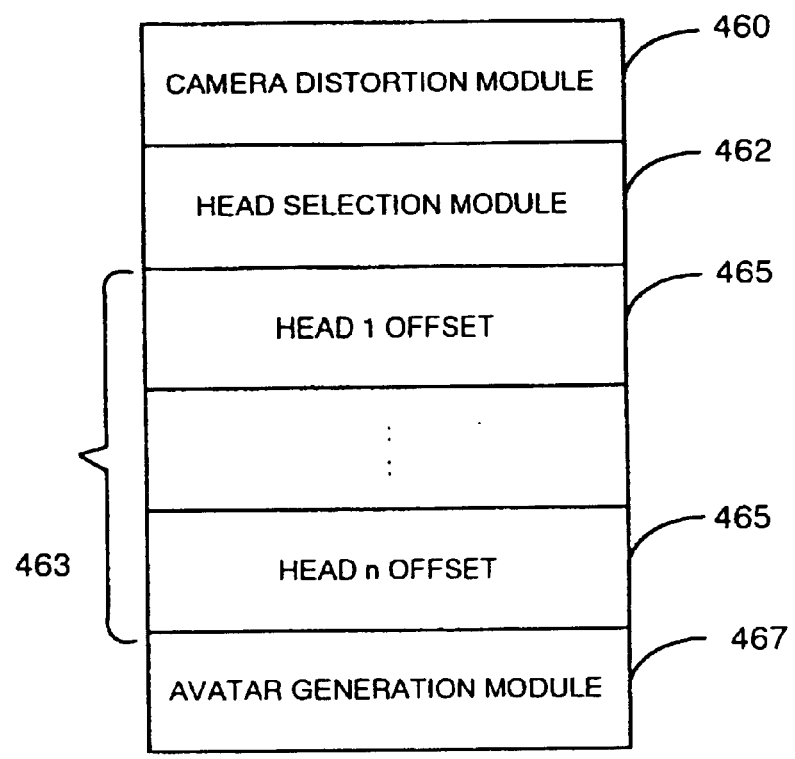
FIG. 50 is a block diagram of a modified avatar construction program for use with the booth of FIG. 45.

FIG. 50 is a block diagram of the modules of a modified avatar construction program 134 for use in this embodiment of the present invention. The avatar construction program comprises an image processing module 460, for processing colour image data obtained by the first camera 440 to determine an outline of an individual and colour texture data, a head selection module 462 for determining an initial offset for modifying the points on the generic avatar model corresponding to a the head of an avatar based upon image data obtained by the second camera 442; and a set of head modification data 463 for determining how the vertices corresponding to points on the head of a generic avatar should be initially modified. In this embodiment the head modification data 463, comprises n sets of head offset values 465 being of offset values for modifying the vertex geometry of the generic model avatar to alter the appearance of the avatar's head. The avatar construction program 134 further comprises an avatar generation module 467 for creating an avatar in a similar way to that which has been previously described.

In this embodiment of the present invention when an individual poses in front of the camera, initially an image of the individual is taken by the first camera 440. Very shortly thereafter the structured light source 449 is switched on and an image is taken with the second camera 442. After images have been obtained by the first 440 and second 442 cameras of the booth 420 in each of the four orthogonal poses, the avatar construction program 134 processes the image data to create an avatar.

Figure 51:
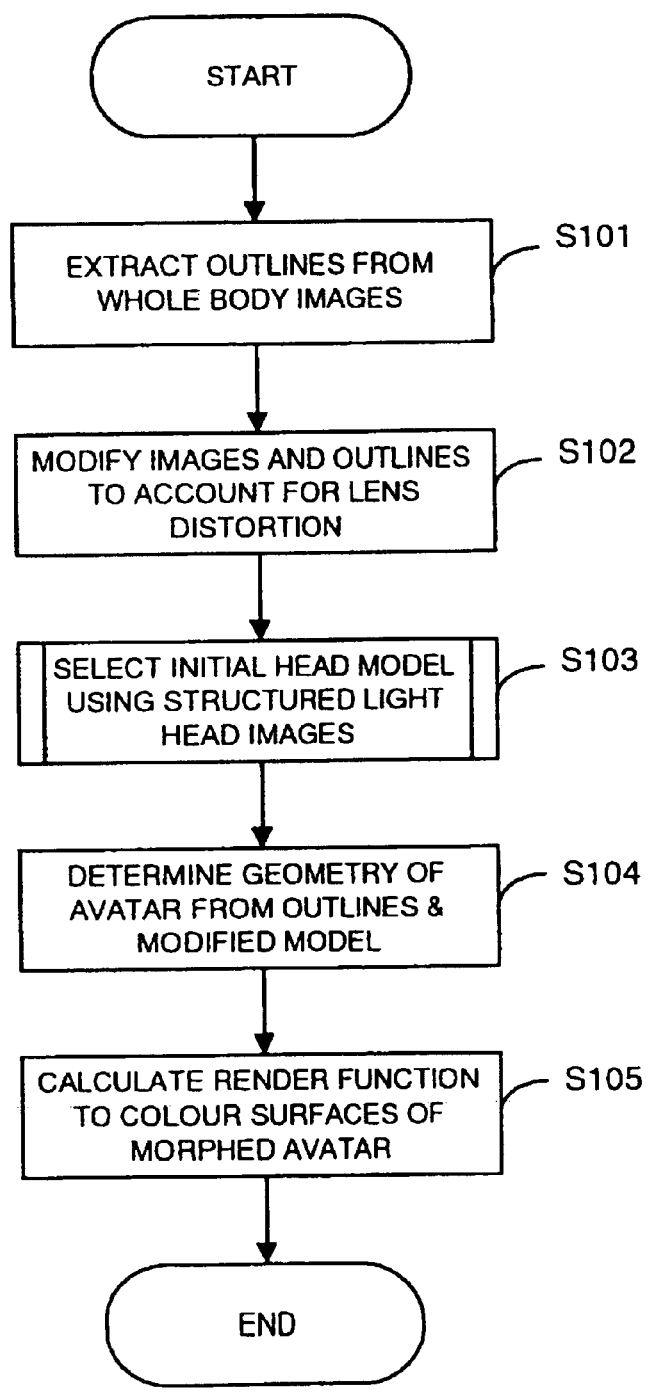
FIG. 51 is a flow diagram illustrating the processing of the avatar construction program of FIG. 50.

FIG. 51 is a flow diagram of the avatar construction program 134 in accordance with this embodiment of the present invention.

Initially the avatar construction program (s101) determines which portions of the image correspond to an individual and generates outlines of the individual from the whole body images obtained by the first camera 441. In this embodiment, this is achieved by the image processing module 460 determining for each pixel within the image obtained by the first camera 440 whether the pixel has a colour value exceeding a threshold colour value. As has previously been described by providing the arrangement of lights 446, 447, 448 the effect of shadow is minimised thereby ensuring that pixels corresponding to background can be identified.

After the avatar construction program 134 has determined those pixels corresponding to background and those pixels corresponding to an individual an outline is determined in the same way as has been described in relation to the first embodiment. Thus by providing a uniform colour background image data of an individual in a pose taken from a single camera can be used to obtain both colour surface information and outline information for generating an avatar and therefore the need for alignment of images as occurs in the first embodiment is avoided.

Each of the images of an individual in each of the four poses obtained by the first camera 440 and their corresponding outlines are then (s102) modified to account for distortions arising in the original images due to the first 440 having a wide angle lens. By providing a wide angle lens the camera 440 can obtain an image of an individual standing in front of the curtain 428 with the camera 440 being closer to the individual than would be required if a lens which did not introduce any distortion into the image were to be used. Thus in this way the size of the booth 420 in this embodiment can be reduced. Since the approximate distance of an individual standing in front of the curtain will be known it is possible to determine in advance how the lens distortion of the camera 440 is likely to affect an image and therefore provide an image processing module 460 which can modify the image to remove the introduced distortions.

After modified outlines and images of an individual in each of the four poses have been determined the avatar construction program 134 in this embodiment invokes (S103) the head selection module 462 to modify the initial geometry of vertices corresponding to points on the head of a generic model avatar in a manner which maximises the initial resemblance between the model head of the generic avatar and the three-dimensional surface of the individual who is posing using the images taken from the second camera 442 in which structured light is projected onto the head of an individual posing as will now be described in detail.

Figure 52:
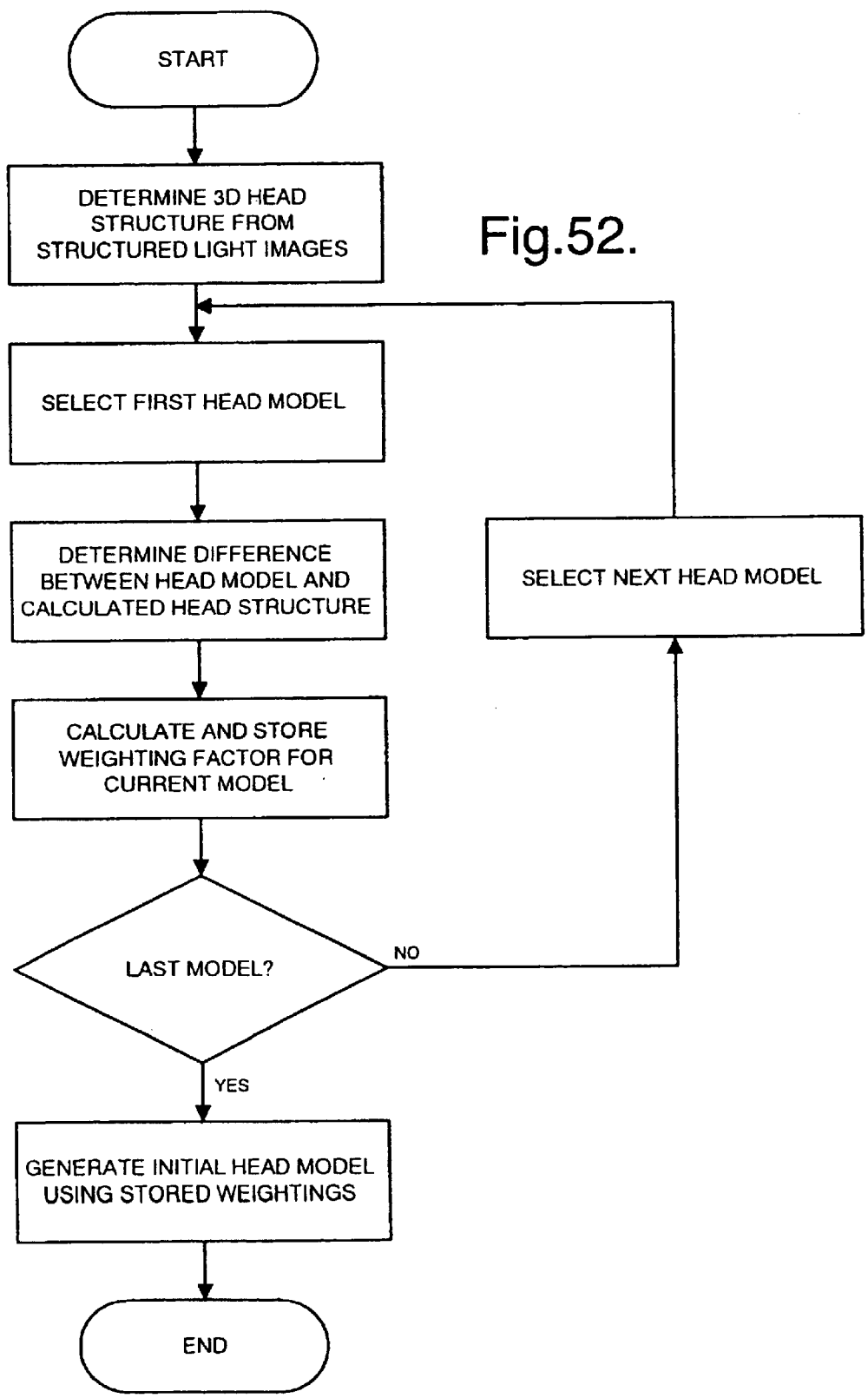
FIG. 52 is a flow diagram of the processing of a head selection module in this embodiment of the present invention.

FIG. 52 is a flow diagram of the processing of head selection module 462. When the head selection module 462 is initially (s110) invoked the module 460 processes the images obtained of an individual's head onto which structured light has been projected to identify points on the surface of the head of the individual where discontinuities in the structured light are apparent. These discontinuities correspond to points on the surface onto which the structured light has been projected where the distance from the camera varies using standard techniques the head selection module then determines a 3D structure for the head from the discontinuities detected in the images.

The head selection module 462 then (s112) selects the first set of off-set values 465 of the stored head modification data 463.

The head selection module 462 then (s113) determines the average vector displacement for each of the vertices corresponding to a model head generated from the generic model head vertices and the selected head off-set 465 relative to corresponding points on the surface of a model of an individuals head generated from the structured light images. This average vector displacement is indicative of the extent to which the model generated from structured light is displaced relative to the model generated from the stored offset. The modulus of the vector displacement between each point on the model head generated from the structured light images and the stored offset model to which the calculated average vector displacement has been applied is then determined.

The head selection module 462 then determines (s114) the sum of the modulus of the differences between each vertex on the model head from the structured light images and corresponding values in the head model currently under consideration. This sum is indicative of the closeness of match of the model represented by the head offset 465 and the structure of the head identified from the structured light image when the two models are superimposed on one another. Where this value is relatively low this is indicative of the model represented by the offset 465 closely corresponding to the determined structure from the images obtained by the second camera 442.

The head selection module 462 then stores as a weighting factor a value indicative of the closeness of correspondence between the model currently under consideration and the determined structure for the head from the structured light image. In this embodiment this weighting factor is the reciprocal of the determined sum of the modulus of vector displacements between the vertices of the model generated utilizing the head offset 465 and corresponding vertex positions determined for an individuals head from the structured light images obtained by the second camera 442.

The head selection module 462 then (s115) determines whether the current head model under consideration is the last of the head models 463 stored in memory. If this is not the case the head selection module 462 then selects (s116) the next head offset 465 and determines weighting values for that next model (s113–s114) before again checking to see whether the last head model has been reached (s115).

When the head selection module 462 does determine that the last model has been reached the head selection module 462 then (s116) determines an initial offset for the geometry values of vertices corresponding to the head of the generic avatar stored in memory utilising the stored weighting values stored for each of the heads.

In this embodiment this is achieved by the initial offset being calculated as the sum of each of the n head offsets 465 divided by the weighting factor generated relation to the head model corresponding to that offset. Thus in this way where a head model corresponds closely to the structure detected from the structured light image the initial offset is such to modify the vertices corresponding to the head of the generic avatar to resemble the structure detected from the structured light image whilst the contribution of offsets for models which correspond less strongly to the detected structure from the head is proportionateley less. Thus by obtaining additional structural information about an individual's head, utilizing structured light source 449 and a second camera 442, a more accurate initial model can be utilized to generate a more accurate avatar.

Returning to FIG. 51 after the geometry of head portion of the generic avatar has been modified on the basis of the structured light images the avatar construction program 434 then (s104) invokes the avatar generation module 467 to determine a geometry for the avatar for the individual to be generated from the outlines extracted from the images taken from the first camera 440 and the generic avatar model modified in accordance with the calculated offset on the basis of the image of the data obtained from the structured light image. The avatar generation module 467 (s105) then calculates a colour render function to colour the surfaces of the avatar generated from the outlines in the same way as has been described in relation to the first embodiment. Thus in this way by utilising the additional information available from the images in which structured light is projected onto an individual a more accurate avatar of an individual can be generated.

Figure 53:
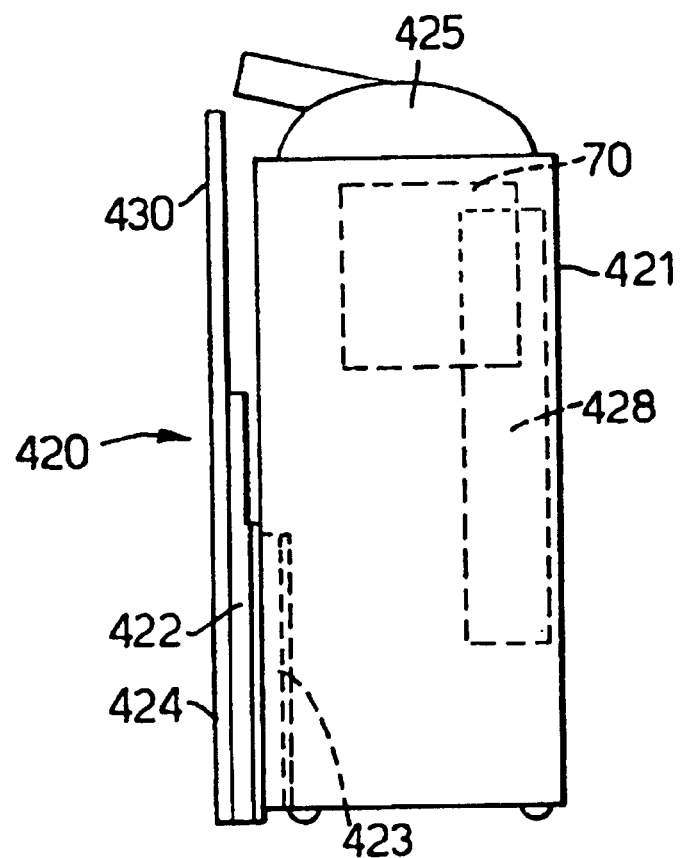
FIG. 53 is a schematic perspective view of the booth of FIG. 45 in a second configuration.

FIG. 53 is a schematic perspective view of the booth 420, of this embodiment in a second configuration. In this configuration the booth 420 is arranged to be easily transportable. When not in use the booth 420 may be dismantled by removing the curtain 428 from the semicircular tube 428 and separating the external screen 20 from the housing 421. The floor 422,423 can then be removed from the slot 435 and separated into its two portions 422,423. The booth 420 can then be packed for transport by opening the housing 421 by removing the curtain support 425 and then inserting into the housing the curtain 428 and the external screen 20 for storage. The floor portions 422,423 are then fixed to the housing 421 by clips (not shown) together with the cantilever arms 424 to which is bonded the roof portion 430. In this position the floor portions 422,423 and roof portion 430 act to cover the windows 441,443 of the interior of the booth 420 and thereby protecting them from damage. Finally the curtain support 425 is reattached to the top of the housing 421. The booth 420 in the configuration shown in FIG. 53 may then be transported to a new location for use.

Third Embodiment

Figure 54:
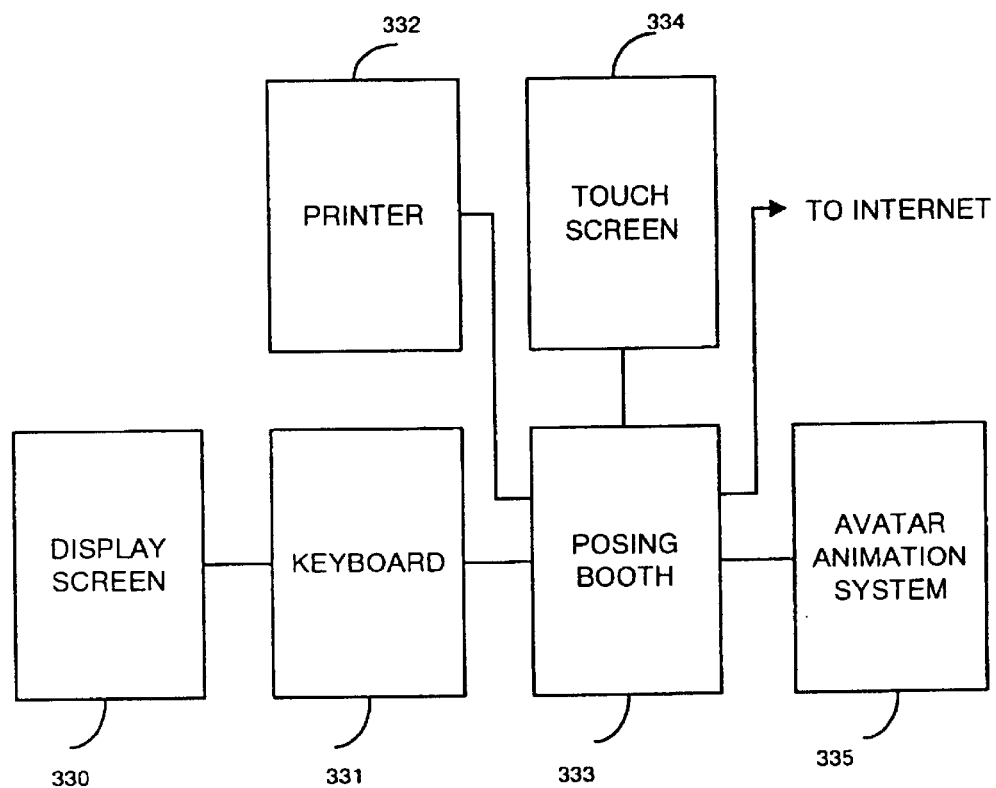
FIG. 54 is a block diagram of a third embodiment of the present invention.

FIG. 54 is a block diagram of a third embodiment of the present invention. As is described in relation to the first and second embodiments of the present invention a booth is provided which is self contained and includes a screen 20 for displaying instructions to a user before posing, a touch screen display 102 for inputting data about the user prior to posing in the booth and a screen 102 for displaying the generated avatar are all provided within a single apparatus. In this embodiment of the present invention apparatus will be described for generating and animating an avatar in which apparatus for generating and animating an avatar are arranged to enable a greater throughput of people using the apparatus than is possible in a single booth. In this way queuing is reduced.

In accordance with this embodiment of the present invention, the apparatus comprises a display screen 330, a keyboard 331, a printer 332 a posing booth 333, a touch screen display 334 and an avatar animation system 335. The keyboard 331 the printer 332, touch screen display 334 and avatar generation system 335 are all connected to the posing booth 333. The posing booth 333 is also connected to the Internet (not shown).

In accordance with this embodiment of the present invention the apparatus for generating an avatar are distributed over a number of distinct areas. In use, a user first views instructions on the display screen 330. The user then moves to the keyboard 331 where they input data for identifying an avatar. Once data has been input using the keyboard 331 this causes the printer 332 to print out a card having identification data printed on it which is retrieved by the user so that they can retrieve the data from a server (not shown) later.

The user then moves to the posing booth 333. The posing booth comprises a booth that is similar to the booth 1 of the first embodiment except that an additional doorway is provided opposite to the first doorway. A user enters the booth 333 via the first doorway and then image data of an individual is obtained using the posing booth 333 in the same way has previously been described. The user then exits the booth 333 via the other doorway. The facial features of a user who has posed in the booth 333 are then displayed on the touch screen 334 where they can be corrected by the user or another individual. When the facial features have been confirmed the posing booth 333 then generates an avatar in the same way as has previously been described in relation to the first embodiment the user then moves to the avatar animation system to view an animation using the generated avatar. The generated avatar is also transmitted to a server (not shown) via the Internet.

In this embodiment the throughput of people through the posing booth 333 is maximised since the steps of viewing instructions, inputting identification data, receiving a printed card, confirming the facial features of an image and viewing an animation will take place outside of the booth 333 and these activities can therefore take place simultaneously for different users. The throughput of people using the apparatus of this embodiment is dependent upon the time taken to view instruction, enter personal data, receive a card, data capture within the booth, editing the facial features, generating the avatar and then viewing an animation. The speed with which people can be processed is dependent upon the slowest of the six steps. In this embodiment of the present invention the most time consuming step is normally the time taken posing within the posing booth 333. The time taken posing is significantly increased due to the need to provide instructions on how to pose and the need to repose if the instructions are incorrectly understood. The throughput of people through the booth 333 can therefore be significantly increased by providing a manual override within the booth and having an assistant check that instructions are properly followed before manually initiating the taking of images using the digital cameras 36,38. In this way the time allowed for individuals to adopt the correct pose can be reduced and the numbers of reposes required are significantly reduced. The throughput through the booth 333 can also be increased by requiring users to make a payment prior to using the apparatus rather than making a payment within the booth 333.

Fuorth Embodiment

Figure 55:
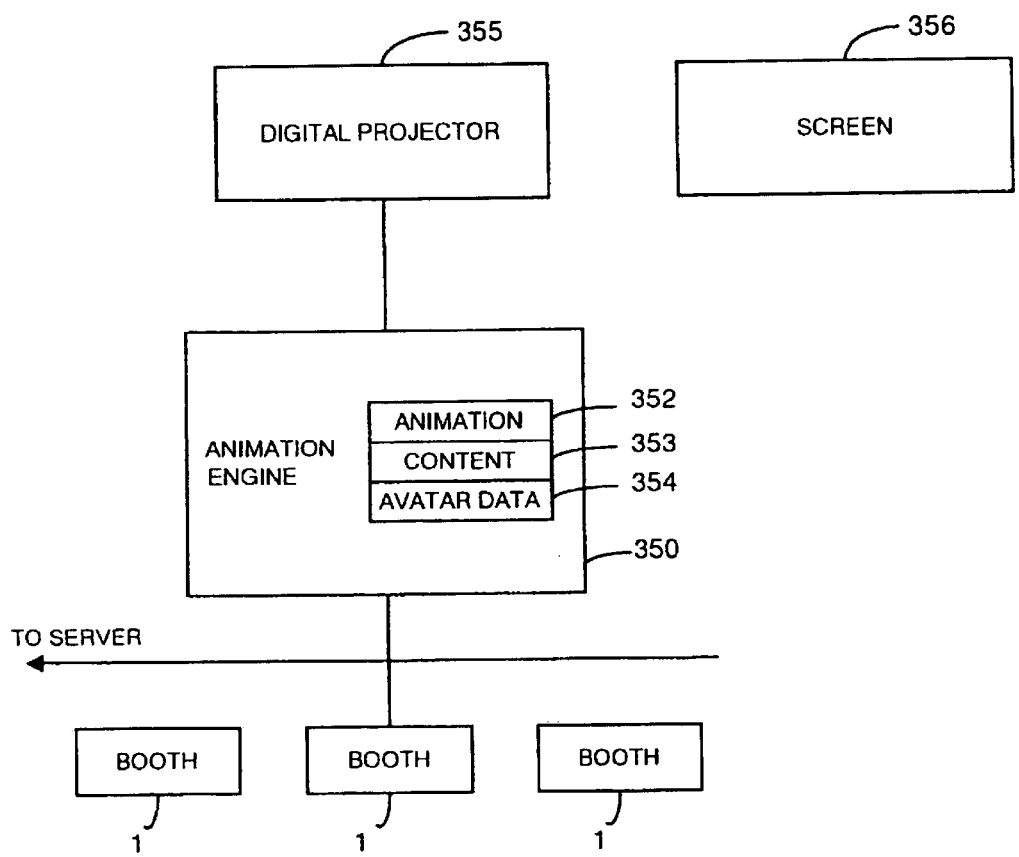
FIG. 55 is a block diagram of a fourth embodiment of the present invention.

FIG. 55 is a block diagram of a fourth embodiment of the present invention. In this embodiment of the present invention a number of generated avatars are used and combined in a single animation sequence. The apparatus comprises a plurality of booths 1 similar to the booths of the first embodiment. The booths are all connected to an animation engine 350. The animation engine 350 having a memory which has stored therein a set of animation instructions 352, a set of content instructions 353 and a portion 354 available for the receipt of avatar data 354. The animation engine 350 is connected to digital projector 355 for displaying a generated animation on a screen 356. The booths 1 are also all connected to the Internet (not shown) for transmitting avatar data in the manner described in relation to the first embodiment.

In this embodiment of the present invention users use the booths 1 to have avatar data representative of those users generated and sent to the animation engine 350. The avatar data is also sent to a server (not shown) via the Internet in the same manner as has been described in relation to the first embodiment. The animation engine 350 is arranged to store in memory 354 a plurality of sets of avatar data for example 15 to 25 sets of avatar data. The animation engine 350 then utilises the animation instructions 352, the content data 353 and avatar data stored in memory 354 to generate an animation. The animation is then displayed on the screen 356 using the digital projector 355.

In this embodiment of the present invention the animation instructions 352 comprise a set of data indicative of the relative positioning of the vertices of a generic avatar within an animation. Thus for example for each frame within an animation data is stored of the position of each of the vertices of a generic avatar. The animation engine 350 is arranged to calculate on the basis of a comparison between the avatar data for an individual 354 stored in memory. A displacement vector for displacing vertices of a model of a generic avatar to distort the generic avatar in a predetermined stance correspond to the vertex geometry of a generated avatar. These vector distortions are then applied to the animation data 352 to calculate the positions of vertices of a generic model distorted to correspond to the model of an avatar stored in memory 354. The animation instructions 352 having been transformed by the vector distortions corresponding to the difference between the positions of corresponding points on the surface of a generic avatar and a generated avatar are then used to generate representations of the generated avatar which are texture rendered using the texture render data for the generated avatar.

In this way since the animation engine 350 merely applies a vector transformation to the data 352 the rate at which animation can be generated is significantly increased. Thus the animation engine 350 can be arranged to generate animations in real time involving the plurality of avatars interacting set against a background defined by the content data 353. Thus individuals who have had their avatars generating using the booth 1 can be shown interacting on the screen 356. The present embodiment is therefore particularly suitable for use within a cinema or location based entertainment.

Fifth Embodiment

Figure 56:
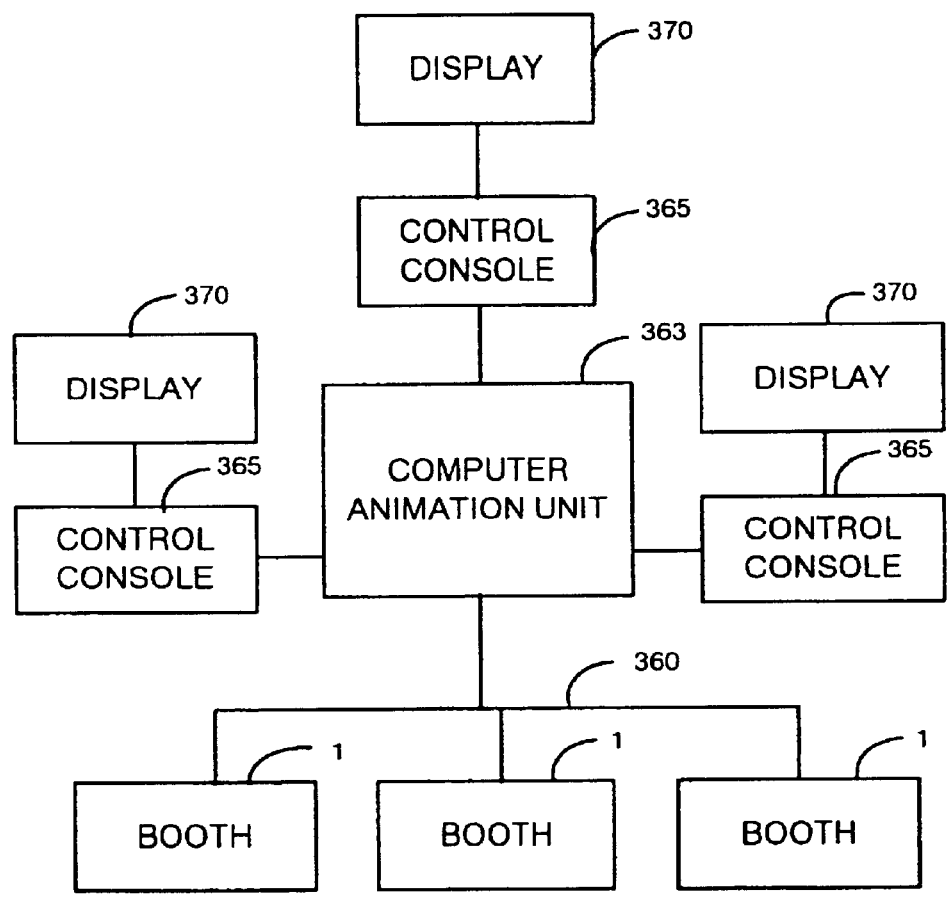
FIG. 56 is a block diagram of a fifth embodiment of the present invention.

FIG. 56 is a block diagram of a fifth embodiment of the present invention. In this embodiment of the present invention a plurality of booths 1 are connected via a communications network 360 to a computer animation unit 363. Connected to the computer animation unit 363 are a plurality of control consoles 365, each of the control cancels 365 is connected to a display 370.

The computer animation unit 360 in this embodiment of the present invention is arranged to receive avatar geometries and texture rendering functions calculated from image data scanned in using the booths 1 in an identical manner to that described in the first embodiment. The avatar geometries and rendering functions are then used by the computer animation unit 363 to generate sequences of computer graphic representations in accordance with animation instructions received via the control consoles 365. The generated sequences of computer graphic representations of the individuals are displayed on the displays 370. Thus in this example of the present invention the apparatus could be used as the basis of a location based entertainment in which users generate an avatar using a booth 1 and then control the actions of their avatar using the control console 365 with the results being shown as a sequence of computer animated representations on the display 370 connected with their console 365.

Sixth Embodiment

Although in relation to the first embodiment a booth has been described in which images of a user are obtained in four orthogonal positions as shown in FIGS. 5 to 8, it will be appreciated that it may not be possible for some individuals and particularly those who use wheelchairs to adopt the required poses. A further embodiment of the present invention will now be described in which the booth of the first embodiment is adapted for use by wheelchair bound individuals.

Figure 57:
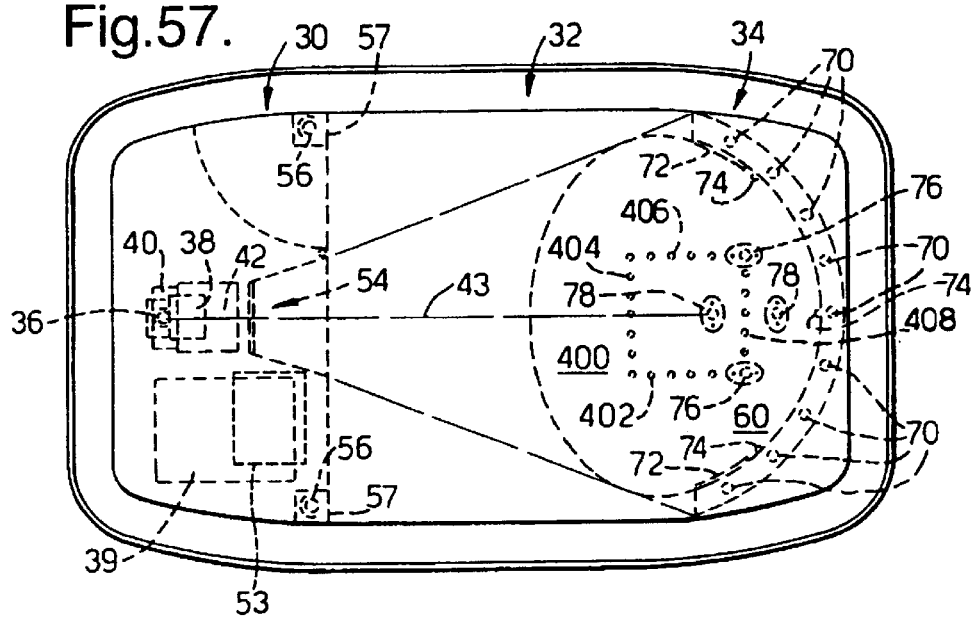
FIG. 57 is a plan view of a booth adapted for the generation of an avatar representative of an individual in a wheelchair in accordance with a sixth embodiment of the present invention.

FIG. 57 is a plan view of an amended booth adapted for use by both able bodied users and users who are confined to a wheelchair. The plan view of FIG. 57 is identical to the plan view of FIG. 4 except that an additional area of floor space 400 is provided in front of the under lit floor space 60 of the light box. The additional floor space 400 is also under lit in the same manner in which the floor 60 is under lit. The combined floor 400, 60 provides an under lit floor against which an image of a user in a wheelchair can be obtained. In addition to the additional floor space 400 four strips of LEDs 402,404,406,408 also are provided in the square arrangement in the centre of the combined floor space 400,60. The LEDs 402–408 provide indicators in a similar manner to the foot indicators to show the way in which the wheels of a wheelchair are to be oriented when image data is to be obtained of a user in a wheelchair. The booth is further modified in that the light proof box 47 containing the digital cameras 36,38 is arranged to be rotated about a pivot point to redirect the view of the cameras to account for the difference in height of a user standing, and a user sitting in a wheelchair. The memory 125 of the booth also has additionally stored therein a generic wire mesh model for an individual sitting in a wheelchair and the user instructions program is modified to instruct wheelchair users to adopt required poses.

In accordance with this embodiment of the present invention when an individual first enters the booth he is given the option of either obtaining an able bodied avatar or a wheelchair avatar. If the user selects the able bodied avatar the processing of the booth is identical as to that which has been previously described.

If the user selects a wheelchair avatar this causes the light proof box 47 containing the cameras to be reoriented and for the lights associated with the additional portion of the floor 400 to be illuminated. The instructions to a user to pose in the light box are then displayed instructing a user in a wheelchair to orient the wheels of the chair with the LEDs 402–408 rather than adopting a pose by placing their feet on the foot lights. When images of the user are taken and processed the obtained outlines are then compared with a generic wire mesh model for an individual sitting in a wheelchair.

Figure 58:
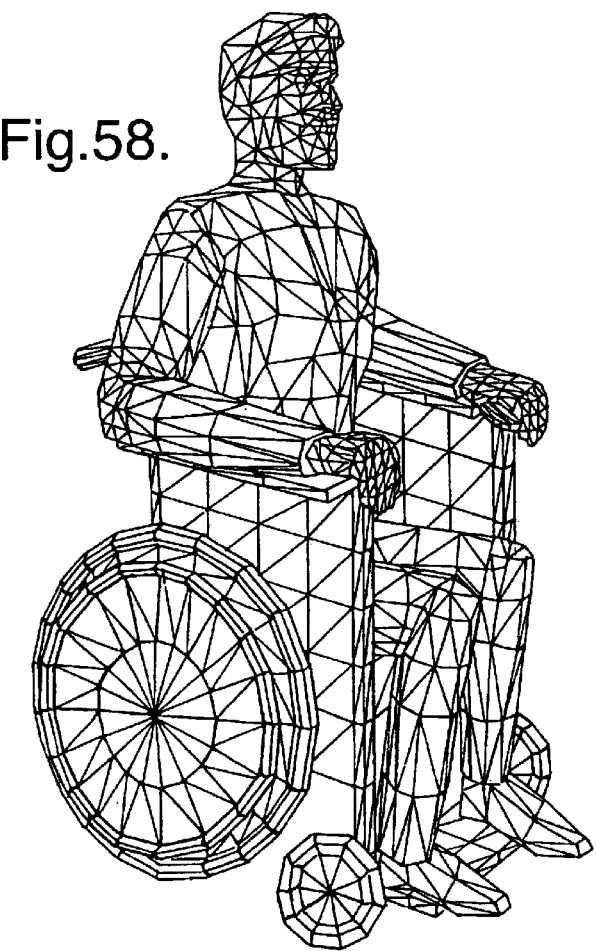
FIG. 58 is a representation of a generic wire mesh model for an avatar of an individual in a wheelchair.

FIG. 58 is a illustrative representation of a wire mesh model of an individual sitting in a wheelchair. This generic wire mesh model for an individual sitting in a wheelchair is then modified in a manner as has been described in relation to the first embodiment. In this way avatars can be generated of individuals who are unable to adopt specified poses within the light box.

Seventh Embodiment

Figure 59:
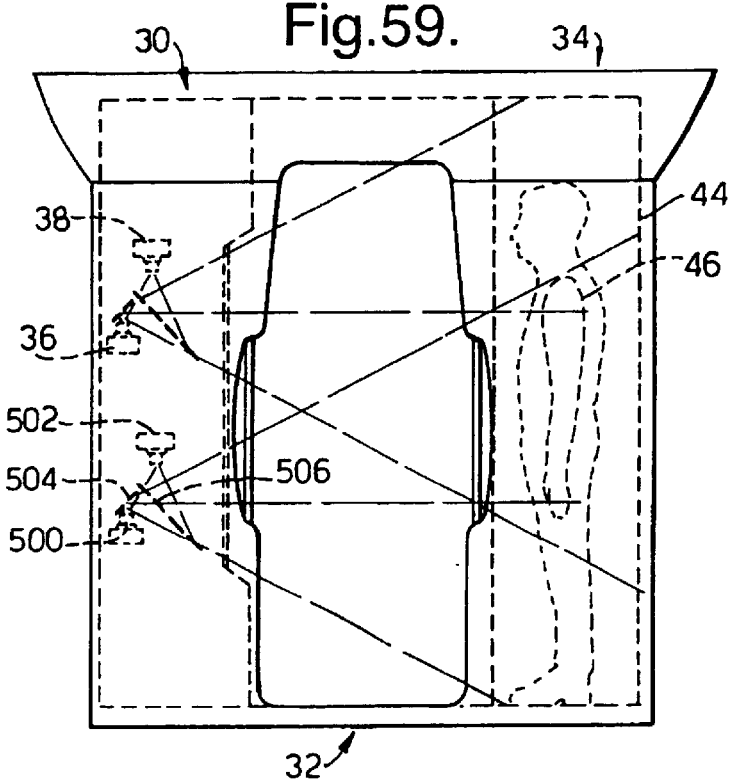
FIG. 59 is a cross-section of a booth of a seventh embodiment of the present invention.

FIG. 59 is a cross-section through a booth in accordance with a seventh embodiment of the present invention.

In this embodiment of the present invention in contrast to the first embodiment in which image data is obtained using a pair of cameras 36,38, two pairs of cameras are used to obtain image data. A booth in accordance with this embodiment of the present invention has an additional set of cameras 500,502 and an additional arrangement of mirrors 504,506 provided with the first set of cameras 36,38 being provided below the second set of cameras 500,502. Apart from the repositioning of the first set of cameras 36,38 and the mirror arrangement 40,42 the booth is substantially identical to that which has been described in relation to the first embodiment of the present invention.

By providing two sets of cameras one above another it is no longer necessary that the digital cameras 36,38 obtain image data of the entire height of an individual 46. Since image data for the top of the individual can be obtained using the second set of cameras 500, 502. The need to distance the light box 44 from the cameras 36,38 is reduced and the size of the central section 32 of the booth 1 can be reduced accordingly.

Figure 60:
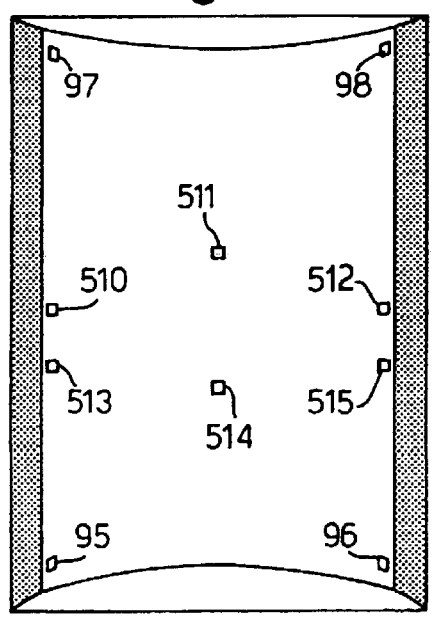
FIG. 60 is a diagrammatic representation of the interior of a light box in accordance with the booth of FIG. 59.

If more than one set of cameras are used to obtain image data of an individual standing in the booth it is however necessary to provide a way in which images corresponding to the top half of the individual standing in the light box can be matched with an image for the bottom half of the individual. FIG. 60 illustrates the interior of a light box in accordance with this embodiment of the present invention. In addition to the alignment patches 95–98 in the corners of the booth a further set of six alignment patches 510–515 are provided in the middle of the booth. By providing these additional alignment patches the cameras 36,38,500,502 can be arranged to view the top six 97,98,510–512 or bottom six 513–515,95,96 patches respectively. The points in the images corresponding to the central patches obtained by the different sets of cameras can then be identified and provide a way in which image data from the two different cameras can be aligned so that they may be combined into a single image. The provision of at least three reference points which appear in both images provide sufficient information to align the cameras accounting for differences in orientation, rotation and scale.

Eighth Embodiment

A further embodiment of the present invention will now be described in which an avatar is generated which can be utilised to display a variety of different clothes on an individual. Specifically in this embodiment, initially an avatar of an individual in the absence of clothes generated using data about an individual's weight. This avatar is then combined with stored models of clothing to generate an avatar for display as will be described in detail later.

Figure 61:
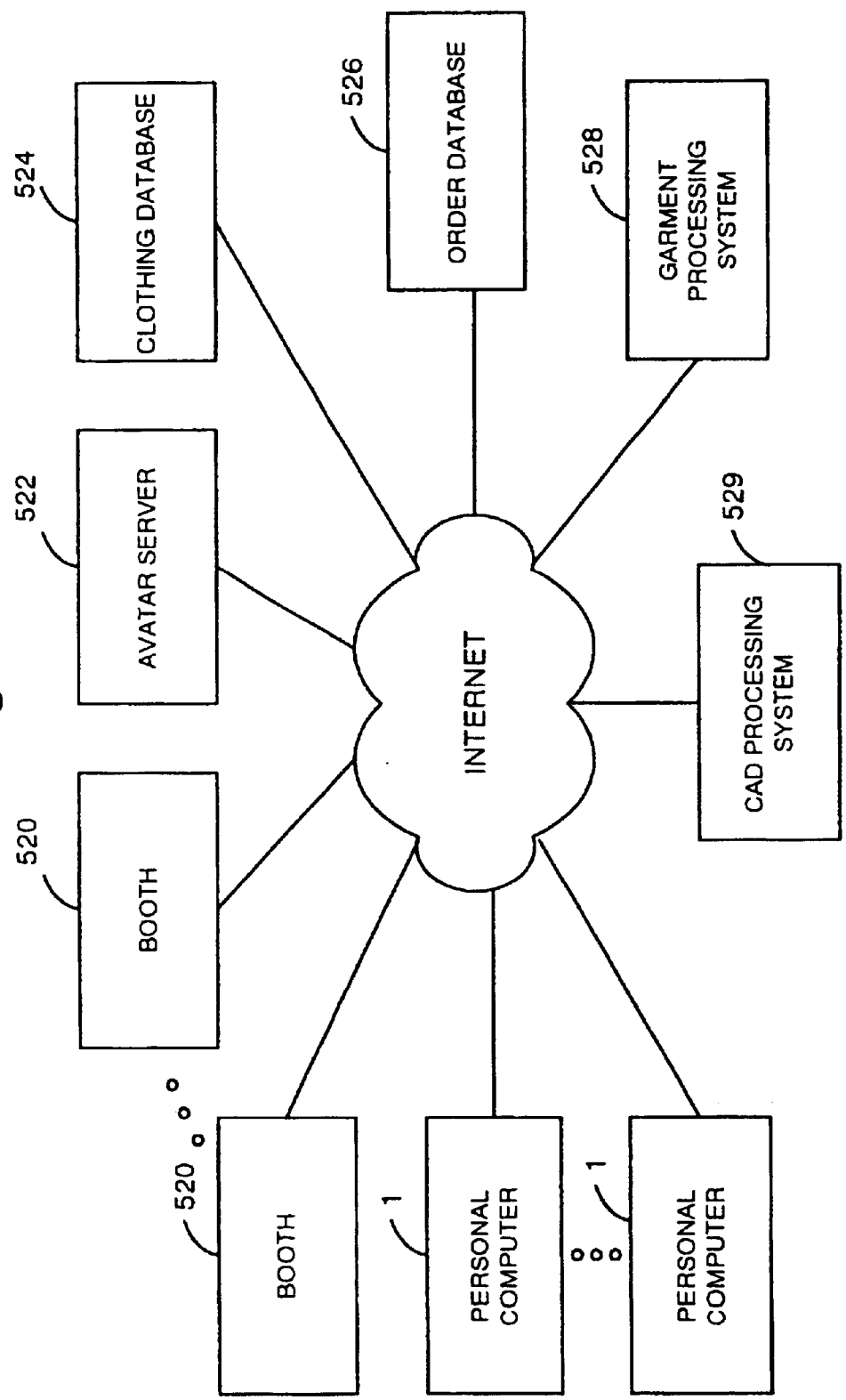
FIG. 61 is a block diagram of an eighth embodiment of the present invention.

FIG. 61 is a block diagram of apparatus for creating and animating three-dimensional models representing individuals wearing different items of clothing in accordance with this embodiment of the present invention.

In this embodiment, the apparatus comprises a plurality of booths 520 for generating computer models of individuals in the absence of clothing. These booths 520 are connected to an avatar server 522 via the Internet 3. The avatar server 522 is arranged to store data representative of models generated by the booths 520 for later retrieval. Also connected to the Internet 3 is a clothing database 524 having stored therein models of a plurality of items of clothing, an order database 526, a garment processing system 528, a computer aided design (CAD) processing system 529 and a plurality of personal computers 1.

In accordance with this embodiment of the present invention the garment processing system 528 and CAD processing system 529 are utilized to generate computer models of the manner in which different items of clothing alter the shape and appearance of an individual wearing that item of clothing. This data is then transferred from the garment processing system 528 and the CAD processing system 529 to the clothing database 524 where it is stored as a clothing record.

Users who wish to see computer models of themselves wearing different items of clothing then visit one of the booths 520 which generates a model of the individual in the absence of clothing which is stored on the avatar server 522. Users then access the order database 526 using a personal computer 1 connected to the Internet 3 which dispatches to them a user interface in which is incorporated the display of an avatar of themselves wearing clothing, the avatar of the individual wearing clothing being generated from data stored on the avatar server 522 and the clothing database 524 as will be described in detail later.

By incorporating as part of the user interface means for enabling users to input orders for items of clothing displayed, a means is provided by which users can visualise and purchase clothing via the Internet 3.

The garment processing system 528, clothing database 524, CAD processing system 529 and booth 520 in accordance with this embodiment of the present invention will now be described in detail.

Garment Processing System

FIG. 62 is a plan view of a garment processing system 528 in accordance with this embodiment of the present invention. The garment processing system 528 comprises a pair of garment racks 530,531 on which are hung a plurality of items of clothing 532 hanging on coat hangers. The racks 530,531 run parallel to each other and are spaced apart by about 9 feet. Between the racks 530,531 are provided a plurality of mannequins 534,535, an avatar generation booth 536 and a data entry and editing suite 537. The data entry and editing suite 537 is connected to both the avatar generation booth 536 and the Internet (not shown in FIG. 62).

The plurality of mannequins 534,535 are provided as two types of mannequins identical to one another except for the surface of the mannequins 534 being covered by a white material and the outer surface of the second type of mannequins 535 being covered in a black material. The mannequins 534,535 themselves come in a number of different forms e.g. male mannequins having a male physical appearance, female mannequins having a female physical appearance and various sizes of child mannequins.

The avatar generation booth 536 in the garment processing system 528 comprises a booth identical to that described in relation to the second embodiment except that at the position of the second floor portion which defines a posing area for an individual there is provided a turn table 538 which is arranged to rotate between four fixed positions. The turntable 538 has towards its centre two dowling holes at the position on the turntable corresponding to the position of the foot marks for an individual standing in the pose shown in FIG. 5. By rotating the turntable 538 these dowling holes 539 are rotated between the four orthogonal pose positions shown in FIGS. 5 to 8. As will be described in detail later the turntable 538 and dowling holes 539 are utilised to enable four orthogonal images of a mannequin to be obtained from which data indicative of the manner in which an item of clothing alters the shape and appearance of an individual can be generated.

Figure 63:
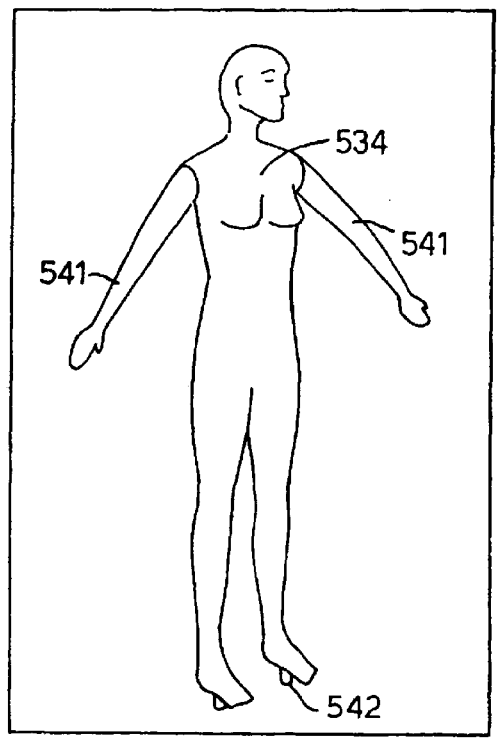
FIG. 63 is a schematic diagram of a female mannequin for obtaining data about an item of clothing.

FIG. 63 is a schematic diagram of a female mannequin 534 in accordance with this embodiment of the present invention. The second type of mannequin 535 is identical to the mannequin illustrated in FIG. 63 except for having its surface covered in a black material rather than a white material. The mannequin comprises a mannequin in a pose with its feet apart, its arms outstretched. The arms of the mannequin 541 are detachable from the main body of the mannequin to enable easy dressing of the mannequin 534.

Figure 64:
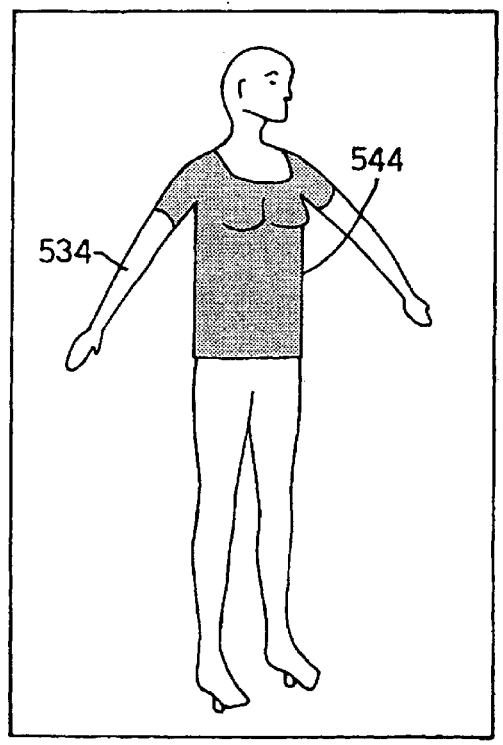
FIG. 64 is an illustration of the adjustable mannequin of FIG. 63 wearing a T-shirt.

FIG. 64 a schematic diagram of the mannequin 534 of FIG. 63 wearing a T-shirt 544. In order to place a T-shirt 544 on the mannequin, initially the arms 541 of the mannequin are removed. The T-shirt 544 is then pulled over the head of the mannequin 534. The arms 541 are then reattached to the mannequin 534 by being inserted into the arm holes of the T-shirt 544. Thus in this way the mannequin can be dressed despite the mannequin having an arms outstretched posture.

From the feet of the mannequin protrude a pair of dowling pegs 542 arranged to be inserted into the dowling holes 539 of the turntable 538 of the booth 536. When the dowling pegs 542 of a mannequin 534,535 are inserted in the dolning holes 539 of the turntable 538, rotating the turntable 538 between its four positions causes four orthogonal views of a mannequin and any items of clothing placed on the mannequin to be presented to the camera of the booth 536 from which data representative of the manner in which an item of clothing alters the appearance of an individual may be generated.

The applicants have appreciated that in relation to a model of an individual, different items of clothing can be simulated by altering two aspects of the model, namely the geometry associated with a model corresponding to the change in shape of an individual which arises from wearing an item of clothing and a texture map for rendering on to the polygonal surface identified by a standard generic wire mesh model and a set of texture coordinates and a texture map.

Specifically, the applicants have appreciated that relative to a model of an individual without clothes the same off-sets may be used to represent the change of shape of an individual wearing clothes and furthermore different items of clothing may be combined to create a new model of an individual where the shape of each item of clothing modifies some of an associated model geometry and a texture map for texture rendering an image is for each part of a texture map that part of a texture map which corresponds to the outward surface of an individual wearing an item of clothing.

The process of generating data indicative of the manner in which an item of clothing alters the appearance of an individual wearing the garment processing system 528 will now be described.

(a) Obtaining Image Data of an Item of Clothing

As an initial step in generating data representative of the manner in which an item of clothing alters the shape and appearance of an individual, firstly a mannequin 534,535 from the plurality of mannequins is selected. The selection of the mannequin is such that the physical type (e.g. male, female, child, etc)of the mannequin is appropriate for the item of clothing to be worn and such to ensure that the colour of the item of clothing 532 for which data is to be generated contrasts with the colour of the mannequin. By providing mannequins 534,535 of different contrasting colours a means is provided to ensure that a suitable mannequin can be selected.

After the mannequin has been selected it is then moved to a position adjacent to the booth 536 and the first rack 530 and an item of clothing 532 from the first rack 530 is placed on the mannequin. In order to ease the dressing of the mannequin where the item of clothing corresponds to a shirt blouse or jumper the arm 541 of the mannequin can initially be removed prior to reinserting the arm in the arms of the item of clothing.

After the mannequin has been dressed the dowling pegs 542 of the dressed mannequin 534,535 are inserted into the dowling holes 539 of the turntable 538. Image data of the mannequin 534,535 is then obtained by the booth in a similar manner to which image data of an individual is obtained as has been described in the previous embodiments. However, in this embodiment, the mannequin is moved between the four orthogonal poses in this embodiment by rotating the turntable 538 so that a different view of the mannequin is presented to the camera of the booth. After image data of a mannequin for four orthogonal views has been obtained the mannequin is removed from the booth 536 to an area adjacent to the second rack 531. The mannequin 535,535 is then undressed and the clothing placed on a hanger on the second rack 531 from which it can be removed at a later time. The mannequin 534,535 is then available for re-use.

(b) Converting Image Data Into a Clothing Record

In accordance with this embodiment of the present invention data indicative of the manner in which the shape and appearance of an individual is altered by wearing an item of clothing is obtained by firstly generating an avatar of the mannequin wearing an item of clothing from the image data obtained by the booth utilizing the obtained image data. Data representative of this avatar is then passed to the data entry and editing apparatus 537.

In accordance with this embodiment of the present invention the data entry and editing apparatus 537 has stored therein avatar data representative of each of the physical types (e.g. male, female, child) of the mannequins 534,535 available for dressing in the absence of clothing. The user then identifies which of the mannequins 534,535 has been used to obtain image data and the data editing and entry apparatus 537 then selects the stored avatar corresponding to the physical type of the mannequin utilized to obtain image data.

The data entry and editing apparatus 537 then calculates data indicative of the manner in which the item of clothing alters the shape of an individual wearing that item of clothing. This is achieved by the data entry and editing apparatus 537 determining how the vertex geometry of the avatar generated by the booth 536 for a mannequin wearing an item of clothing differs from the stored vertex geometry for the same mannequin 534,535 wearing no clothing. Vector off-sets for each of the vertices indicating the manner in which the item of clothing changes the shape of the mannequin are then stored in the memory of the data entry and editing apparatus 537.

The texture map for the avatar generated by the booth is then compared with a texture map for the stored avatar for the mannequin used in the absence of clothing and pixels within the texture map which correspond to one another given a code number indicating that the corresponding pixel is to be rendered as a clear texture. In this way the texture map is generated indicative of the way in which the item of clothing worn by the mannequin 534,535 in which image data has been obtained alters the appearance of that mannequin.

If the item of clothing which is to be modelled is a multicoloured item of clothing a user then enters a clothing identification number and a coverage level and this data together with the off-set data and texture rendering function comprising the texture coordinates and texture map are dispatched via the Internet 3 to the clothing database 524.

Where an item of clothing is one of a range of items of clothing available in different colours the user uses the data entry and editing apparatus 537 to indicate this fact which causes the data entry and editing apparatus 537 to convert the colour texture map to a black and white texture map. This texture map together with the texture coordinates, off-set data, coverage level data and clothing identification number are then transmitted to the clothing database 524 together with colour available data identifying how the black and white texture map should be converted into a colour texture map for different colours of the item of clothing as will be described in detail later.

Clothing Database

In this embodiment of the present invention, the clothing database 524 comprises a conventional database within which clothing records comprising data indicating how an item of clothing alters the shape and appearance of an individual are stored. Clothing records within the clothing database 524 will now be described in detail.

After data has been dispatched from the garment processing system 528 it is stored in the clothing database 524. In accordance with this embodiment of the present invention two forms of clothing record are stored within the clothing database 524. These records correspond to models of items of clothing either available in a variety of solid colours or multicoloured items of clothing such as patterned items of clothing.

FIG. 64 is an exemplary block diagram of the data structure of clothing records for solid colour clothing within the clothing database 524 in accordance with this embodiment. In this embodiment the clothing records each comprise a clothing ID number 610 for identifying an item of clothing, a coverage level 612; an avatar off-set 613, texture coordinates 614, a black and white texture map 615 and colours available data 618.

In this embodiment, the coverage level data 612 identifies for an item of clothing the relative position in which the clothing is worn. Thus for example, outer garments such as a jacket which is worn over other clothing will have a different coverage level associated with it to clothes which are normally worn closer to the skin. As will be described in detail later the coverage level data 612 enables different model clothes to be combined on the same model avatar.

The avatar off-set 613, text coordinates 614, black and white texture maps 615 and colours available data 618 each comprise a model of an item of clothing which can be combined with a naked avatar. Specifically the avatar off-set data 613 is indicative of the manner in which an item of clothing alters the shape of an individual wearing that item of clothing in terms of off-sets to a generic avatar wearing the clothing and the texture coordinates 614 and black and white texture maps 615 correspond to the texture coordinates 314 and compressed texture map 315 of a model of a generic avatar wearing an item of clothing.

By providing a black and white texture map 615 for generating a model representation of an individual wearing a specific item of clothing and colours available data, a means is provided by which representations of clothing in different colours may be created utilizing the same texture map and a selected colour off-set from the colour available data 618.

Figure 65:
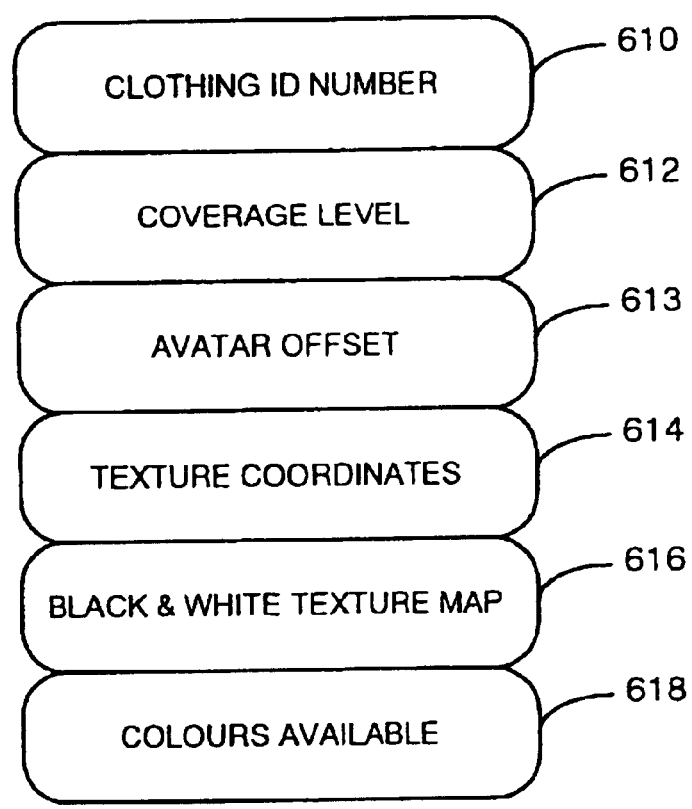
FIG. 65 is a block diagram of a clothing record for a single colour item of clothing.
Figure 66:
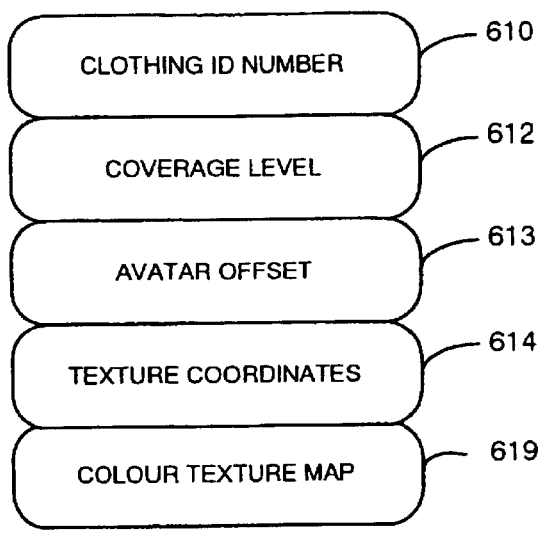
FIG. 66 is a block diagram of a clothing record for a multicolour item of clothing.

FIG. 65 is an exemplary block diagram of the data structure for clothing records for multicoloured items of clothing within the clothing database 524. As in the case of single colour items of clothing records within the clothing database for multicoloured items of clothing comprise a clothing ID number 610, coverage level data 612, an avatar off-set 613 and a set of texture coordinates 614. However, for multicoloured items of clothing instead of black and white texture data 616 and colours available data 618 the records include a colour texture map 619 for generating a multicoloured representation of an item of clothing. When a multicolour item of clothing is to be displayed, this colour texture map 619 is then used to generate image data.

CAD Processing System

The CAD processing system 529 of this embodiment of the present invention will now be described.

As has been described above the garment processing system 528 provides means by which data indicative of the manner in which an item of clothing alters the shape and appearance of an individual wearing the item of clothing may be generated utilizing mannequins upon which items of clothing are placed. The CAD processing system 529 provides means by which the same data may be generated directly from CAD (computer aided design) representations of items of clothing and thus provides an alternative means by which data representative of items of clothing be generated for storage within the clothing database 524. Specifically the CAD processing system 529 enables representations of items of clothing to be generated without he need for the item of clothing to be manufactured.

In accordance with this embodiment of the present invention the CAD processing system 529 comprises a conventional CAD design package for generating representations of items of clothing. However, in addition to generating three-dimensional images of an item of clothing in a conventional manner, the CAD processing system 529 in accordance with this embodiment of the present invention is also arranged to combine with representations of items of clothing, representations a mannequin wearing the model clothing. Image data of the mannequin wearing an item of clothing in four orthogonal poses can then be obtained and then processed in a similar way to which image data obtained by the booth 536 of the garment processing system 528 is processed by the data entry and editing apparatus 537 of the garment processing system 528 which will not be repeated here. Thus in this way clothing records may be generated for storage within the clothing database 524 directly from CAD representations of clothing.

Naked Avatar Generation Booth

A naked avatar generation booth 520 for generating an avatar of an individual in the absence of clothes will now be described with reference to FIGS. 67 and 68.

Figure 67:
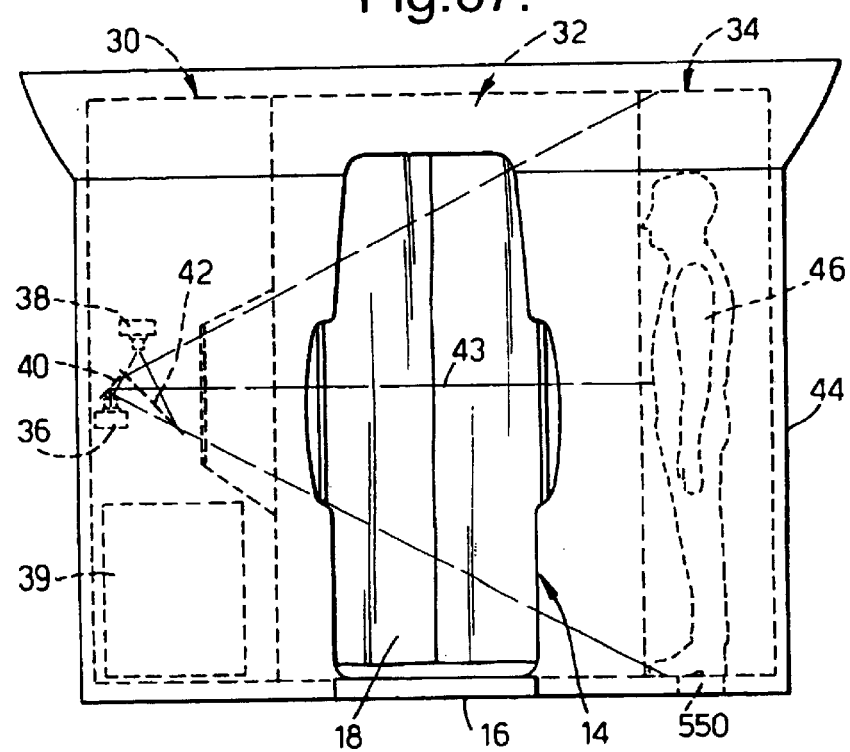
FIG. 67 is a cross-section of a booth for generating a model of an individual in the absence of clothing.

FIG. 67 is a cross-sectional view of a booth 520 in accordance with this embodiment of the present invention. The booth is identical to the booth of FIGS. 2–12 except that in addition the light box has provided within its floor a weighing apparatus 550 for determining the weight of an individual standing in the booth. In addition the avatar construction program 134 is arranged to utilise this weight data to generate an avatar in the absence of clothing as will be described in detail below. The remaining portions of the booth are identical to the booth of first embodiment and description will not be repeated here. The processing of a booth in accordance with this embodiment will now be described with reference to FIG. 68.

In accordance with this embodiment of the present invention the user selects whether they wish to generate a male or female or child avatar (s121). A user then poses within the light box 44 and the weighing apparatus 550 weighs (s122) the individual whilst the digital cameras 36,38 obtain image data. The avatar construction program then processes (s123) image data obtained of an individual posing in the light box 44 in the manner as has previously been described in order to generate an avatar in them manner as has previously been described in relation to the first embodiment.

The avatar construction program 134 then determines a calculated body mass index (s125) for the individual of whom an avatar is to be generated based on the weight data obtained using the weighing means 550 and a calculated height of the individual calculated from the image data captured by the booth. This body mass index is calculated by dividing the height of an individual in kilograms by the square of their determined height in metres and is indicative of the relative obesity of an individual. A reference geometry for an individual of the calculated height and body mass index is then (s126) calculated from a reference male or female model avatar utilising a pre-stored set of functions indicating how points corresponding vertices in the wire frame model matrix vary for individuals of different heights and body mass index. Thus for example for overweight individuals the vertices corresponding to points around the stomach move outward relative to one another as body mass increases. A new naked avatar geometry is then (s127) calculated combining the vertex geometry of the avatar of an individual created by the avatar construction program for vertices corresponding to the head and hands and the vertex geometry of the model of an individual of specified body mass index and height for the trunk, legs and arms. In order to achieve a smooth transition between the two models, geometry values for vertices at the joins between the two models weighted average values for geometry positions may be used. Finally a texture rendering function for the avatar is generated by utilising the texture rendering function for the avatar calculated by the avatar construction program for polygons representative of the head, and a calculated texture rendering function for the trunk, legs and arms for the combined avatar determined on the basis of a comparison with a stored texture rendering function for the reference avatar and the colour of an individual's skin as is apparent on the user's face. Data of the naked avatar is then transmitted via the Internet 3 to the Avatar Server 522 is a similar manner to that described in relation to the transfer of avatar data to a server in the first embodiment of the present invention.

Thus, in this way by obtaining weight data of an individual an avatar representative of the user in the absence of any clothing can be generated. Specifically the present embodiment of the invention enables avatars representative of individuals in the absence of their clothes to be generated without requiring users to remove their clothes during the scanning process. Computer representations of clothing can then be added to the naked avatar to vary the appearance of the avatar and to enable the clothing of the avatar to be properly animated and exchanged for computer generated clothing from a library of predefined computer generated clothing as will now be described.

Display of Clothed Avatars

The clothed avatars in accordance with this embodiment are particularly suitable for displaying and selling fashion via the Internet. Specifically, by providing a clothing database corresponding to available products, and a user interface displaying clothed avatars and enabling users to enter orders, a means is provided by which users can be shown computer representations of themselves wearing the clothes prior to purchase.

In accordance with this embodiment after an individual has used a booth 520 to generate an avatar representation of themselves in the absence of clothing and this is stored on the avatar server 522. The user can then access the order database 526 via a personal computer 1 and the Internet 3 to have generated within the personal computer 1 a user interface for selecting and purchasing items of clothing.

(a) Clothing Selection Interface

Figure 69:
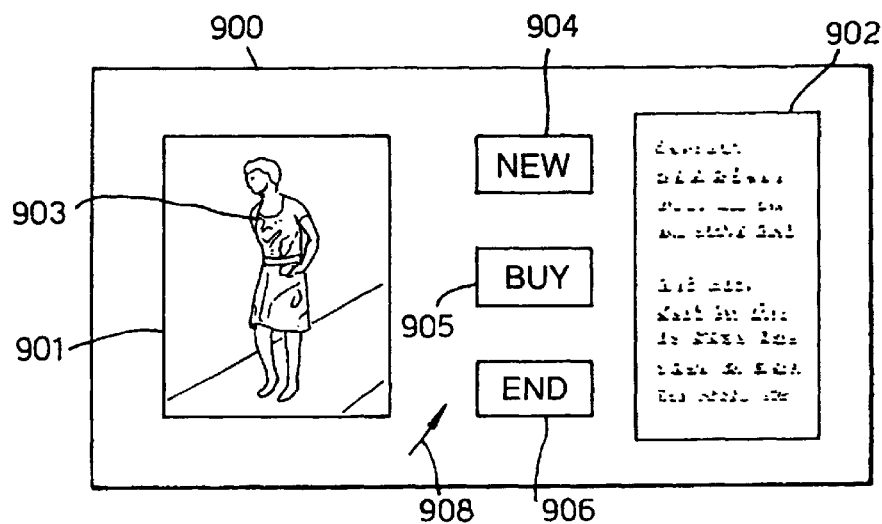
FIG. 69 is an exemplary illustration of a user interface for displaying models of individuals wearing clothes and inputting order information.

FIG. 69 is an exemplary illustration of a user interface generated utilizing a clothed avatar in accordance with this embodiment of the present invention, illustrating a manner in which clothed avatars in accordance with this embodiment may be utilised to sell items of clothing to individuals. The user interface 900 comprises a window 901 in which is displayed a sequence of representations of an individual clothed avatar 902. To the right of the representation of an individual are a new button 904, a buy-button 905, and an end-button 906. The new button 904, buy-button 905 and end-button 906 may each be selected utilizing a pointer 908 controlled by a mouse or other input device (not shown) further to the right of the buttons 904–906 is a text display 902 displaying a textural description of the clothing shown in the window 901.

In accordance with this example of the present invention after an individual has obtained a naked avatar in accordance with this embodiment of the present invention clothing can then be displayed to them in the form of an animated sequence shown in the window 901 in a user interface. Specifically different combinations of clothing may be selected using an input interface, and a clothed avatar corresponding to the selection of clothing can then be generated and then an animated sequence displayed to the user as part of the user interface shown in FIG. 69. If the displayed clothing is not satisfactory the new button 904 may be selected to cause an input interface to be displayed to enable a new selection of clothing or colours to be input.

If the user wishes to purchase the displayed item of clothing the user can select the buy button 905 to input a request to purchase the displayed clothing, which is processed in a conventional manner.

(b) Generation of Clothed Avatar

The generation of a clothed representation of an individual utilizing a generated avatar of the individual without clothes stored on the avatar server 522 and data stored within the clothing database 524 will now be described with reference to FIG. 70.

Initially when generating an avatar representative of an individual wearing specified items of clothing an initial avatar vertex geometry is obtained (S200) corresponding to the vertex geometry 313 of the naked avatar upon which clothing is to be simulated. Then for each vertex within the vertex geometry 313 the corresponding avatar off-set 613 for that vertex for items of clothing to be simulated which has the greatest modulus is determined (S202). This off-set indicates the most outward item of clothing for that individual at that point on the surface of the model of the individual wearing that item of clothing. The vertex geometry for the naked avatar is then modified (S204) by the greatest determined off-set for each vertex to obtain a vertex geometry corresponding to the individual represented by the naked avatar wearing the clothes to be simulated identified by the clothing ID numbers 610.

After a calculated vertex geometry has been determined a suitable texture rendering function for the clothed model avatar is determined (s206). In this embodiment, a suitable texture rendering function can be calculated by utilising the texture map and texture coordinates for the naked avatar and clothing to be modelled in turn in order identified by the coverage level 612 associated with the item of clothing simulated.

Specifically, an initial rendering of the model can be performed utilising the texture map and texture coordinates for the naked avatar. This representation is then modified utilising the texture co-ordinates and either the black and white texture map 616 and a selected colour for the item of clothing simulated or the colour texture map 619 for a multicolour item of clothing to be simulated. The co-ordinates and texture map for the clothing record having a coverage level 612 corresponding to clothing most closely worn next to the skin is first utilized. Since, as has previously been described, the texture map for the selected clothing will correspond to a transparent rendering everywhere except where the model avatar is to be covered by the item of clothing selected this second rendering will only effect the portion of model avatar which corresponds to the item of clothing represented by the clothing record. This process is then repeated one by one utilising texture maps and texture coordinates 614 for clothing associated with coverage levels 612 further and further from the skin, until all of the selected clothing records have been utilized.

Thus in this way each polygon of the clothed avatar is texture ultimately rendered by a representation of the outermost item of clothing visible at that point. This combined texture rendering from the naked avatar and all items of clothing may then be used together with the determined vertex geometry for the clothed avatar to generate model representations of an individual wearing the identified clothing in any specific pose.

Although in this embodiment the avatar geometry for an avatar of an individual in the absence of clothing has been described as being calculated utilising for clothed portions of an individual the weight measured for an individual and stored models of how shape varies with hair body mass index, it will be appreciated further data could be used. In particular the outline data obtained from images of the individual could be utilised to define a maximum extent of an individual. If this were to be used, where a calculated geometry for an individual resulted in outline data greater than that of the actual outline of an individual the vertex could be modified to more closely represent the actual shape of the individual.

It will further be appreciated that although the above described embodiment weighing means are provided to obtain weight data, weight data could be directly input by a user. It is preferred that a measurement of weight is determined since individuals may be inaccurate when inputting their actual weight. However, direct user input of weight data, would enable avatar data to be generated which allowed individuals to simulate the effects of weight change for example as the result of dieting when an avatar was generated.

Ninth Embodiment

Figure 71:
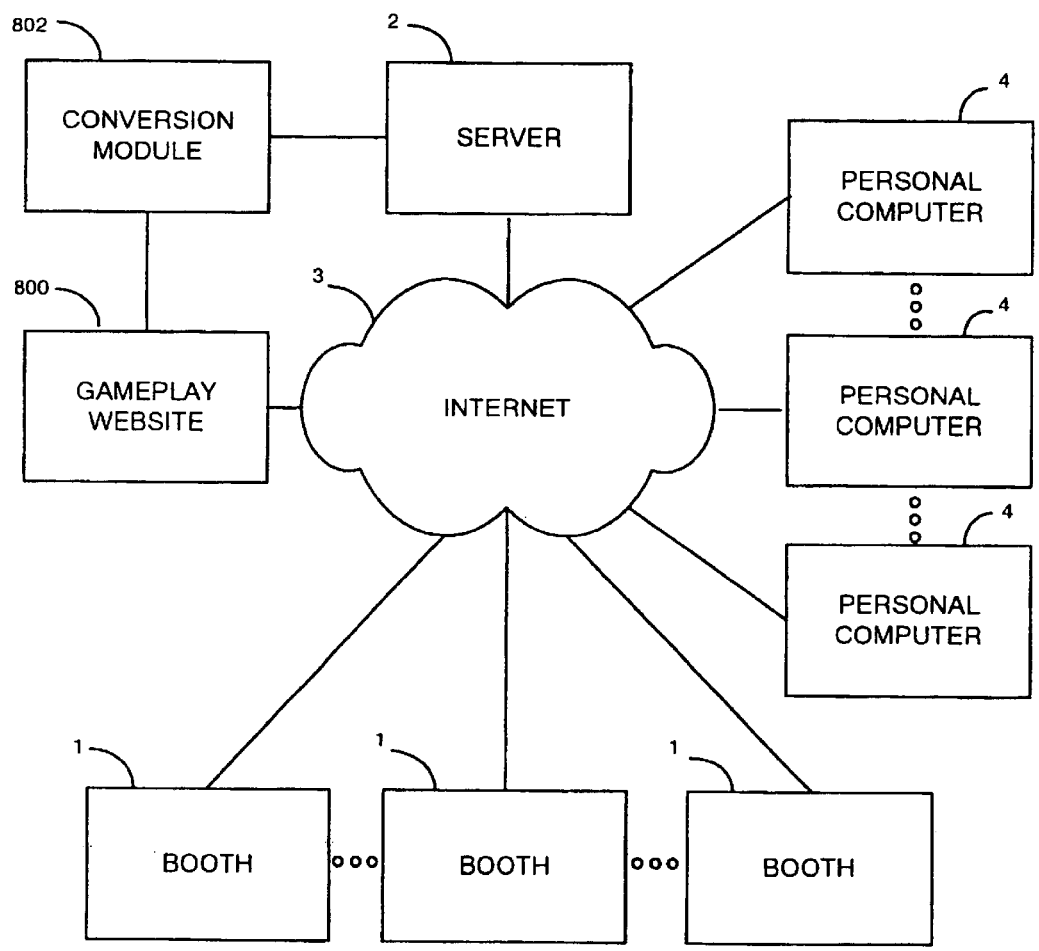
FIG. 71 is a block diagram of a ninth embodiment of the present invention.

FIG. 71 is a block diagram of a ninth embodiment of the present invention. This embodiment of the present invention is similar to the first embodiment of the present invention in that a plurality of booths 1 are connected to a server 2 via the Internet 3 and that a plurality of personal computers 4 are also connected to the Internet 3. However in addition to the apparatus of the first embodiment a game play website 800 is also provided and is connected to the Internet 3. The game play website 800 in addition to being connected to the Internet 3 is also connected to the server 2 via a conversion module 802.

In the previous embodiments of the present invention apparatus has been described arranged to utilise the avatar data generated by the booth 1 to generate computer graphical representations of individuals in any of a plurality of poses. In this embodiment the avatar data is utilised to cause representations of individuals to be incorporated within a game stored as part of the game play website 800. However in contrast to the previous embodiment instead of the avatar data itself being utilised by the game program stored as part of the game play website 800 the avatar data is converted by the conversion module 802 into a format specific for the game stored on the game play website 800. Thus in this way software that is not specifically adapted to utilise the format of data of avatars generated by the booths 1 may still be modified to incorporate representations of individuals. The use of avatar data to generate game specific representations of individuals will now be described in detail.

In this embodiment of the present invention, the cost of generating an avatar could be borne either by a user making payment within the booth or alternatively the provider of the game play website 800 could pay for the generation and storage of avatars.

In many multi-player games such as Quake-III-Arena produced by ID Software individuals are represented by computer graphical representations of themselves. The computer graphical representations shown to individuals comprises a limited number of positions of a character together with images of the character holding certain items for example specific types of firearm, with the firearms being specific to the game in question and not varying for different individuals. When the user inputs instructions into the game these instructions cause a specific selected representation to be displayed on the computer screen. In accordance with this embodiment of the present invention after a model avatar of an individual has been generated and stored within the server 2 the user can access the server 2 via the game play website 800. This causes the game play website 800 to transmit a request to the server to make the individuals avatar data available to the conversion module 802. The conversion module then utilises the avatar data to generate image data of the avatar in a number of specified poses corresponding to the specified poses allowed within the game stored on the game play website 800. The generated image data is then modified to incorporate computer graphical representation of the objects available within the game stored on the game play website 800. This image data is then dispatched to the game play website 800 as a set of image data for use within the game stored on the game play website 800. Thus in this way a set of image data for the specific format of available poses within a game may be generated. A game in which an individual is represented by a computer graphic representation of themselves can then be played utilising the generated image data.

Further Modifications and Amendments

Although the previous embodiments of the present invention have been described in which the booth 1 has been used to obtain image data using two digital cameras 36,38, it will be appreciated that a video camera could be used to obtain the images with the images being subsequently digitised. It will also be appreciated that instead of a pair of cameras taking the two images a single digital camera could be used in which the digital camera took two images one after another. Although in the embodiments previously described four pairs of images of an individual in four different poses, are obtained using the booth 1, it will be appreciated that by providing more cameras within the booth image data for a user from different perspectives could be obtained from a single pose.

It will also be appreciated that more data about how an avatar representing an individual could be animated could be obtained by taking all images of an individual in further poses. For example, by obtaining images of an individual with their arms or legs bent it would be possible to establish from those images a better approximation of where the joints of an individual's avatar should be placed. Alternatively images of an individual could be obtained whilst that individual is made to walk or run on a moving platform to obtain data on exactly how that individual walks or runs which could be used as a basis for generating an animated sequence of representations of that individual with an avatar that mimicked the detected motion.

Although in the described embodiments apparatus is described which aligns images of a booth taken with different cameras every time a pair of images of the booth are taken, it will be appreciated that assessments of the alignment of images between the two cameras could be made only periodically for example whenever the booth 1 is switched on or serviced.

Although in the first embodiment the capture of data within the booth 1 has been described in terms of taking photos of an individual against a uniformly back lit wall 62 that is back lit by a number of fluorescent lights 70, it will be appreciated that other means could be used to illuminate a back drop. Other means of illuminating the back drop could include using 'electric paper' to generate a uniformly bright background against which an image of a user is obtained. Alternatively the back wall could be covered by phosphorescent paint which would effectively illuminate the user after the activation of the flash lights 56. A further alternative means of providing back illumination would be to provide a back drop comprising a retro reflective material and to illuminate the back drop using a light source having a known wavelength which could be then detected in order to calculate the portions of an image which did not correspond to part of the user.

Although in the previous embodiments a booth 1 has been described in which two images of a user are obtained in any of the poses adopted, it will be appreciated that apparatus could be provided in which only a single image is obtained of the user in each pose with a silhouette of the user being calculated from a single image. Methods of generating silhouettes from a single image could involve providing a patterned background which can be detected by the computer to determine where the back wall 62 is visible in an image or alternatively chroma key techniques could be used to calculate those portions of an image which correspond to a user and those portions of an image which do not.

Although in the previous embodiments the booth 1 has been described in terms of apparatus which generates the transformation function transforming a single generic model of an avatar from outline data calculated from a silhouette, it will be appreciated that any form scanning means for scanning in data could be used. For example laser stripe apparatus could be used to generate a three-dimensional computer model of an individual which could be used as the basis for calculating a transformation of the geometry of a wire mesh for a generic avatar into an avatar representing an individual.

Although in previous embodiments a booth 1 has been described for obtaining image data representative of an individual, it will be appreciated that image data could be obtained in other ways. For example images of an individual taken in different poses could be scanned in from photographs of the individual in the different poses and in this way the present invention could be implemented without using a dedicated booth to capture image data. Alternatively, image data could be captured utilising a digital camera and downloaded into a personal computer. In such circumstances, it is possible, however, that the obtained image data may not be of very high quality, either due to the variability of the resolution of the means by which it was obtained, or due to variation in for example lighting and background which can occur when image data is not obtained in a controlled environment such as arises within a booth. Furthermore, since no instruction on posing or position information would be available to a user, the likelihood of a mispose would increase.

After image data had been obtained, the data could then be edited by hand to eliminate the background of the image so that only an image of an individual remained. This edited image data, together with data identifying the facial feature points of the individual in the image could then be transmitted via the Internet to a server having a processing program similar to the avatar generation program 134 of the first embodiment which generates an avatar from the edited image data and feature points. The generated avatar could then be sent back to the individuals who scanned in and edited the image data.

In such an embodiment or indeed in any of the described embodiments means could be provided to edit the generated avatar data to correct errors arising in the avatar generation process. Thus for example amendments could be made to texture maps where image data for a portion of a model was unavailable. Alternatively where a portion of a vertex geometry for an avatar had accidentally incorporated some of the background into the model of an individual, the calculated vertex geometry could be corrected by hand. Similarly, by displaying an animation of a generated avatar, amendments could be made to the manner in which portions of a model vertex geometry vary on the basis of different input joint positions.

Furthermore, although in the previous embodiments a transformation between a single geometry for stored generic avatar has been described it would be appreciated that a number of different generic of avatars could be stored and a determination could be made prior to the calculation of a transformation from a stored avatar geometry to determine which of the stored avatar geometries initially most closely resembles the calculated geometry for a user. The geometry most closely resembling a user could then be used as the basis for being transformed to correspond to the calculated geometry. Thus for example different generic avatars could be stored representing adults, children, men and women, or various initial body shapes, which could then form the basis for generating avatars representing specific individuals. The selection of which generic avatar is used as a model could alternatively be selected by a user.

The generated model avatars could also have varying levels of details for use in different applications. Thus for example avatars having a polygonal mesh of 2600 polygons could be generated for use in some software with a polygonal mesh of 10,000 or 40,000 polygons being used for other applications. The model avatar data for a lower resolution of polygons could be a subset of a model of higher resolution. Thus where a model avatar is transmitted across a network a progressive mesh download could be used in which representations of avatars are increased in detail as more data becomes available.

Although in previous embodiments foot positioning indicators 76,78 have been described in terms of transfers and lights on the floor 60 of a booth, other foot positioning indicators could be used for example a raised portion of the floor could indicate where a user is meant to place their feet. Other ways in which a user could be instructed to adopt a particular position also would include spot lights illuminating a portion of the user where the user is instructed to adopt a stance which specific portions of their body are illuminated by spot lights. Thus for example a light could illuminate the position where the tip of a user's nose is expected to be placed in order to ensure that a user adopted a stance in which their head was in a particular position.

In addition to obtaining data representative of a user's external appearance other data could also be obtained using a booth 1. Thus for example a sound recording of a user a speaking could be obtained within the booth in order to generate oral representations of the user speaking which could be combined with the avatar generated representing the user's external appearance.

Although in previous embodiments the transmission of data representative of a computer model of an individual has been described in terms of the transfer of signals via computer networks, it will be appreciated that other means could be used to transmit data. Thus for example a booth could be provided in which data is recorded on a computer disc such as a CD ROM or magnetic disc or magneto-optical disc or a computer chip which is output to the user who takes the disc CD ROM or computer chip to their computer to make use of the recorded model avatar data.

Although reference has been made to the generation of printed cards containing identification data for retrieval of a avatar from a central storage system, it will be appreciated that other means of recording this information could be delivered to a user. Thus for example swipe cards could be generated by a booth, the swipe cards having recorded thereon data for retrieving an avatar at a later stage. Thus for example where avatars are used within location based entertainments, a swipe card could provide means by which a user causes avatar data to be downloaded which has been generated in one part of the location based entertainment for use in another attraction.

Although in the previous embodiments the application of avatar data has been described in terms of using the avatar data for the generation of animations, it would be appreciated that the avatar data representing a computer model of an individual could be used in numerous other ways. For example, rather than using the model for generating sequences of images of an individual in different poses the avatar data could be used to generate representations of an individual in a single pose. Thus for example application software for generating images of individuals in single poses on the basis of avatar data could be provided which are arranged to receive the avatar data and provide a user interface for enabling a user to select the pose in which an avatar appears.

Other applications which might use the avatar data generated in accordance with this invention could also include communication software in which model representations of individuals are combined with data input by a user which is transmitted to other users. Thus for example an individual's avatar could be transmitted to another user's computer where it is combined with verbal data input by the individual and transmitted to that other user's computer to effect a form of virtual conferencing. It will be appreciated that such virtual conferencing could be implemented by either utilising a personal computer to display an avatar or alternatively avatars could be displayed on other communication devices such as a WAP mobile phone.

Other forms of application for the avatar data generated using the present invention could also involve application software in which the avatar data itself is edited, thus for example the texture map and texture coordinates and geometry could be edited to change the appearance of an avatar either the changing the appearance of the clothes of an avatar, their hairstyle or in some way editing the bodily appearance of an avatar.

Although reference has been made to having application software stored within the personal computer of a user, it will be appreciated that such application software could initially be stored within a server and downloaded together with the avatar representation of an individual. It will also be appreciated that payment for an avatar could be made at this stage or alternatively the generation of avatars could be entirely free from the requirement of making any payment at all.

What is claimed is:

1. An apparatus for generating computer models of individuals for generating graphical representations of individuals in different poses comprising:

storage means for storing a computer model of a generic person;

means for generating representations of a computer model of the surface of a person in poses in accordance with pose instructions identifying the orientation of a model's limbs in a pose;

data input means for obtaining data representative of the surface of an individual in a pose;

pose calculation means for determining the orientations of an individual's limbs in a pose adopted by an individual in the data obtained by said data input means;

comparison means for comparing said obtained data and data generated by said means for generating representations of said model of a person in a pose in which the model's limbs are oriented in accordance with the orientations determined by said pose calculation means, and model generation means operable to utilize said comparison by said comparison means to generate a computer model of said individual for generating computer graphical representations of said individual in different poses.

2. Apparatus in accordance with claim 1 wherein said data input means comprises laser stripe scanning apparatus to identify a plurality of points on the surface of an individual in said pose.

3. Apparatus in accordance with claim 1, wherein said data input means comprises means for obtaining data representative of an outline of said individual in said pose.

4. Apparatus in accordance with claim 1, wherein said data input means comprises at least one camera for obtaining image data of an individual in said pose.

5. Apparatus in accordance with claim 4, wherein said at least one camera comprises a digital camera.

6. Apparatus in accordance with claim 4, wherein said data input means further comprises means for processing image data of an individual in a pose to obtain an outline of said individual in said pose.

7. Apparatus in accordance with claim 6, wherein said means for obtaining outline data comprises means providing a predefined background wherein said data input means is arranged to obtain an image of an individual in said pose against said predefined background wherein said means for processing said image data is arranged to identify portions of said image data corresponding to said background and processing said image data to identify the outline of an individual in said image.

8. Apparatus in accordance with claim 7, wherein said processing means is arranged to process said image data to identify portions of said image data corresponding to background by performing a thresholding operation.

9. Apparatus in accordance with claim 8, wherein said means providing a predefined background comprises an illuminated background wherein said processing means is arranged to perform a thresholding operation on the basis of the luminance of portions of an image of an individual in a pose.

10. Apparatus in accordance with claim 9, wherein said means providing a predefined background comprises a light box comprising a floor, back wall and roof, said floor, back wall and roof comprising a translucent material, and means for illuminating said floor, back wall and roof from beneath, behind and above respectively.

11. Apparatus in accordance with claim 8, wherein said background comprises a background of uniform pattern or colour wherein said thresholding operation is arranged to identify within said images of said person in said pose, portions of said image corresponding to said pattern or colour.

12. Apparatus in accordance with claim 1, further comprising foot marks indicating where an individual should place their feet when adopting a pose.

13. Apparatus in accordance with claim 1, further comprising indicator means for indicating a position at which a user should look at when adopting a pose.

14. Apparatus in accordance with claim 1, further comprising instruction means for instructing a user to adopt a predefined pose.

15. Apparatus in accordance with claim 14, wherein said instruction means comprise display means for displaying an illustration of said pose to be adopted by said individual.

16. Apparatus in accordance with claim 14, wherein said instructions means comprise speakers for broadcasting oral instructions to an individual to adopt a specific pose.

17. Apparatus in accordance with claim 1, wherein said pose calculation means is arranged to identify a plurality of points on the surface of an individual and calculate the orientations of an individual's limbs in a pose from the relative orientation of said identified points.

18. Apparatus in accordance with claim 17, wherein said plurality of points identified from said data comprise any of the top of the user's head either side of a user's neck the tips of the user's hands, the tips of the user's feet, the user's armpits and the user's crotch.

19. Apparatus in accordance with claim 1, wherein said comparison means comprises scale identification means wherein said scale identification means is arranged to determine from said data obtained by said data input means scale data indicative of the height of said individual in said pose wherein said comparison means is arranged to compare said obtained data and data generated by said means for generating representation of said model of a person scaled in accordance with said scale data.

20. Apparatus in accordance with claim 1, wherein said comparison means is arranged to compare data representative of points on the surface of said model of a person in said pose determined by said pose calculation means and data representative of points on the surface of said individual in said pose obtained by said data input means.

21. Apparatus in accordance with claim 1, wherein said storage means for storing a computer model of a generic person is arranged to store geometry data representative of the relative positioning of a predefined number of points on the surface of a computer wire mesh model of a generic person and data defining a wire mesh topology comprising data representative of the connection of said predetermined number of points on surface of said generic model of a person connected to others of said predetermined number of points wherein said means for generating representation is arranged to generate a calculated geometry data for said model of said person in a pose in accordance with animation instructions on the basis of said stored geometry data.

22. Apparatus in accordance with claim 21, wherein said comparison means is arranged to calculate the relative position of a number of points on the surface of an individual identified by obtained data relative to corresponding points on the surface of a computer representation of a generic person in said pose determined by said pose calculation means, wherein said model generation means is arranged to generate a computer model of an individual comprising geometry data representative of the surface of said individual in a predetermined stance, comprising the relative positioning of a predetermined number of points on the surface of a model of said individual in said predetermined stance being points representative of a wire mesh model of said individual connected to other points on the surface of said model in accordance with said topology data stored in said storage means defining topology data for said computer model of a generic person.

23. Apparatus in accordance with claim 22, wherein said model generation means is arranged to generate geometry data comprising points representative of a predefined number of points on the surface of a model of an individual in a predetermined stance based upon a comparison between points identified by said scanning means and said determination means corresponding to points on the surface of a model of a generic person and interpolation of points on the surface of said model of said individual which are not identified as corresponding to points identified by said scanning means and said determination means.

24. Apparatus in accordance with claim 4, wherein said model generation means is arranged to generate a texture rendering function for texture rendering polygons of a wire mesh computer model of an individual in a predetermined stance by processing image data obtained by said at least one camera of an individual in said pose and comparing said image data with a representation of said computer model of said individual said pose.

25. Apparatus in accordance claim 1 wherein said data input means is arranged to obtain data of an individual representative of the external appearance of said individual in a plurality of poses, said apparatus further comprising data processing means operable to process said data to calculate composite data representative of the surface of said individual in a single pose.

26. Apparatus in accordance with claim 25 wherein said data processing means is arranged to generate said composite data on the basis of said determination by said pose calculation means of the poses adopted by the individual wherein said processing means is arranged to adjust said data for an individual so that data obtained by a plurality of poses corresponds to data representative of a single pose.

27. Apparatus in accordance with claim 26, wherein said data processing means is arranged to adjust data determined as corresponding to the same points on the surface of an individual in data representative of said individual in different poses so that said points of said individual in said different poses correspond to the same points on the surface of a model of said individual.

28. Apparatus in accordance with claim 27, wherein said data processing means is arranged to adjust data representative of an individual in a pose to remove data representative of parts of the surface of an individual in a pose which corresponds to parts of the surface of an individually which is represented in another set of data obtained of said individual in another pose.

29. Apparatus for generating computer animations of an individual representative of the movement of said individual comprising:
apparatus for generating computer models of individuals in accordance with claim 1, means for storing data representative of a sequence of animation instructions and means for displaying representations of said generated computer model of an individual in poses in accordance with said animation instructions using said generated model.

30. Apparatus in accordance with claim 1, further comprising:
means for inputting model identification data; and
means for transmitting said model of said individual and said model identification data to a server.

31. Apparatus in accordance with claim 30, further comprising a printer for printing a hard copy information carrier having recorded thereon identification data for identifying a computer model transmitted to a server.

32. Apparatus in accordance with claim 1, further comprising recording means for recording on an information carrier data representative of said computer model generated by said model generation means.

33. A method for generating computer models of individuals for generating graphical representations of individuals in different poses comprising:

storing a computer model of a generic person in a predefined pose;
scanning an individual to obtain data representative of the surface of an individual in a pose;
determining the orientations of an individual's limbs in the pose adopted by an individual scanned in said scanning step;
generating a computer representation of said generic person in which the model's limbs are oriented in accordance with the orientations determined in said determination step;
comparing said data representative of the external appearance of an individual in said pose with data generated of said stored generic model of a person in said pose determined in said determination step; and
generating a computer model of said individual on the basis of said comparison.

34. A method in accordance with claim 33 wherein said scanning step comprises scanning an individual using laser stripe scanning apparatus to identify a plurality of points on the surface of an individual in said pose.

35. A method in accordance with claim 33, wherein said scanning step comprises obtaining data representative of an outline of said individual in said pose.

36. A method in accordance with claim 33, wherein said scanning step comprises obtaining image data using a camera.

37. A method in accordance with claim 36, wherein said scanning step further comprises means for processing image data of an individual in a pose to obtain an outline of said individual in said pose.

38. A method in accordance with claim 37, wherein said processing step comprises processing said image data to identify portions of said image data corresponding to background by performing a thresholding operation.

39. A method in accordance with claim 33, further comprising instructing a user to adopt a predefined pose.

40. A method in accordance with claim 39, wherein said instruction comprises displaying an illustration of said pose to be adopted by said individual.

41. A method in accordance with claim 39, wherein said instructions comprises broadcasting oral instructions to an individual to adopt a specific pose.

42. A method in accordance with claim 33, wherein said determination of the orientation of limbs comprises identifying a plurality of points on the surface of an individual; and calculating the relative orientation of said limbs from the relative positions of said identified points.

43. A method in accordance with claim 39, wherein said plurality of points identified from said scan data comprise any of the top of the user's head either side of a user's neck the tips of the user's hands, the tips of the user's feet, the user's armpits and the user's crotch.

44. A method in accordance with claim 33, wherein said comparison step comprises identifying the scale of obtained data representative of the surface of an individual; and generating a scaled model of a person scaled in accordance with said identified scale.

45. A method in accordance with claim 33, wherein said comparison step comprises calculating the relative position of a number of points on the surface of an individual identified by said scan data relative to corresponding points on the surface of a computer representation of a generic person in said pose and generating a computer model of an individual comprising geometry data representative of the surface of said individual in a predetermined stance, comprising the relative positioning of a predetermined number of points on the surface of a model of said individual in said predetermined stance being points representative of a wire mesh model of said individual connected to other points on the surface of said model in accordance with a predetermined topology.

46. A method in accordance with claim 33, further comprising generating a texture rendering function for texture rendering polygons of a wire mesh computer model of an individual in a predetermined stance by processing image data of said individual in at least one pose and comparing said image data with a representation of said computer model of said individual in said at least one pose.

47. A method in accordance with claim 33 scanning an individual in a plurality of poses wherein said generation of said computer model is based upon data obtained in said plurality of scans.

48. A method in accordance with claim 33, further comprising:
  means for inputting model identification data; and
  means for transmitting said model of said individual and said model identification data to a server.

49. A method in accordance with claim 33, further comprising the step of recording on an information carrier data representative of said computer model generated by said model generation means.

50. A method for generating computer animations of an individual representative of the movement of said individual comprising:
  the steps of generating computer models of individuals in accordance with claim 33, storing data representative of a sequence of animation instructions and displaying representations of said generated computer model of an individual in poses in accordance with said animation instructions generated by said animation means.

51. A method for generating computer models of individuals for generating graphical representations of individuals in different poses comprising the steps of:
  storing a computer model of a generic person;
  inputting data representative of the external appearance of an individual in a pose;
  inputting data indicative of the orientations of the individual's limbs in said pose;
  generating a computer representation of said generic person in which the limbs of said model are oriented in accordance with the input orientations;
  comparing said input data representative of the external appearance of said individual with data generated of said generic person in said pose adopted by said individual as defined by said input data; and
  generating a computer model of said individual on the basis of said comparison.

52. An apparatus for generating computer models of individuals in accordance with claim 1, further comprising weighing means for obtaining weight data of an individual; wherein said generation means is arranged to generate a computer model of said individual on the basis of a comparison of the volume of a model of a generic person scaled so as to occupy a volume corresponding to the expected volume of a model of an individual having said weight.

53. Apparatus in accordance with claim 52, wherein said model generation means is arranged to combine portions of a model generated on the basis of comparison of data representative of the external appearance of an individual and data generated of said model of a person in said pose determined by said determination means, and a model of a generic person scaled to have a representative volume representative of the volume of a model of an individual having the weight of said individual from whom weight data has been obtained.

54. Apparatus in accordance with claim 53, wherein said model generation means is arranged to generate a texture rendering function for rendering the colour on a model of an individual wherein said texture rendering function is generated on the basis of a stored texture rendering function for a generic individual and image data obtained for an image of an individual's face.

55. A method of generating a computer model of an individual comprising the steps of:
  paying for the generation of said model;
  capturing image data representative of an individual;
  dispensing a password;
  generating a model of said individual on the basis of said image data; and
  transferring data representative of said computer model to a computer apparatus on the basis of receipt of said password.

56. A process of generating a computer model of an individual comprising:
  instructing an individual to adopt a plurality of predefined poses;
  capturing image data of said individual; after they have been instructed to adopt each of said plurality of poses;
  dispensing a password;
  generating a computer model of said individual on the basis of said image data of said individual in said plurality of poses and transferring data representative of said computer model to a computer apparatus on the receipt of said password.

57. An apparatus for generating computer models of individuals said apparatus comprising:
  a booth for receiving an individual;
  apparatus for obtaining image data of an individual within said booth in four orthogonal poses;
  means for obtaining outlines of individuals from said image data;
  means for processing said outlines and a stored generic model of an individual to generate a computer model of said individual; and
  means for texture rendering said generated computer model using said image data.

58. A booth in accordance with claim 57, further comprising means for identifying portions of an outline indicative of points on the surface of an individual which are not contiguous with each other; and
  processing means for processing an outline to replace portions of an outline corresponding to non-contiguous portions of the surface of an individual with an estimate of an outline corresponding to contiguous points on the surface of an individual.

59. Apparatus for generating computer models of individuals comprising:
  means for obtaining image data representative of an individual seated in a wheelchair; and
  means for generating a computer model of an individual seated in a wheelchair on the basis of said image data.

60. A method of generating computer models of individuals in the absence of clothing comprising the steps of:
  storing a computer model of the shape and appearance of a generic person;

obtaining image data of an individual wearing clothing, wherein at least some of the surface of said individual is not covered by clothing; and generating a computer model of said individual utilising said image data of portions of said individual not covered by clothing to generate a model of said portion of said body and said stored computer model to generate a model of the portions of said individual covered by clothing.

61. A method in accordance with claim 60 wherein the generated model of the appearance of the portions of said individual covered by clothing are determined by said stored model of the appearance of the corresponding portions of a generic person and a determined skin tone colour, determined utilising said image data of said portions of said individual not covered by clothing.

62. A method in accordance with claim 61 wherein said image data of portions of said individual not covered by clothing comprise at least image data of either the face or hands of said individual.

63. A method in accordance with claim 60, wherein said storage step comprises; storing computer models corresponding to a plurality of body types, wherein said method further comprises the steps of:

selecting a body type to generate a computer model of an individual; and utilising said computer model corresponding to said selected body type to generate a model of the portions of said individual covered by clothing.

64. A method in accordance with claim 63 wherein said body types comprise computer models of individuals of different sexes, ages or heights.

65. A method in accordance with claim 60, further comprising the steps of storing variation data identifying the manner in which the shape of an individual varies in dependence upon weight of an individual;

obtaining weight data indicative of the weight of an individual of whom a model is to be generated;

wherein the generation of a computer model comprises utilising a computer model of a generic person modified in accordance with said variation data and said weight data to generate a model of the portions of said individuals covered by clothing.

66. A method of generating data indicative of the manner in which an item of clothing alters the appearance of an individual comprising the steps of:

storing a computer model of a mannequin in the absence of clothing;

obtaining image data of said mannequin wearing an item of clothing;

generating a computer model of said mannequin wearing said item of clothing utilising said image data; and generating data indicative of the manner in which an item of clothing alters the appearance of an individual on the basis of a determination of the differences between said stored model and said generated model.

67. A method in accordance with claim 66 wherein said obtaining step comprises steps of:

generating an image of an item of clothing; and combining said generated image of an item of clothing with a generated image of a said mannequin.

68. A method in accordance with claim 66, further comprising the steps of:

providing a mannequin;

dressing said mannequin with said item of clothing; and obtaining image data of said mannequin wearing said item of clothing, wherein said stored model comprises a stored model of said provided mannequin.

69. A method in accordance with claim 66, further comprising the steps of:

providing a plurality of mannequins storing computer models of said plurality of mannequins;

selecting a mannequin; and dressing said selected mannequin with said item of clothing and obtaining image data, wherein said generation of data comprises the determination of the differences between a computer model generated from said image data and the stored computer model for said selected mannequin.

70. A method in accordance with claim 69, wherein a plurality of mannequins are provided having different surface colours wherein said selection step comprises selecting a mannequin of a contrasting colour to said item of clothing.

71. A method in accordance with claim 69 wherein a plurality of mannequins are provided having different shapes, wherein said selection step comprises selecting a mannequin of an appropriate shape for wearing said item of clothing.

72. A method in accordance with claim 71 wherein said plurality of mannequins are provided comprising mannequins having male and female anatomical shapes.

73. A method in accordance with claim 66 wherein said generated data comprises shape data indicative of the manner in which an item of clothing alters the shape of an individual, and a texture rendering function for texture rendering the surface of a computer model of an individual modified utilising said shape data.

74. A method in accordance with claim 73 wherein said texture rendering function comprises data indicative of a colour texture map.

75. A method in accordance with claim 73 wherein said texture rendering function comprises data indicative of a black and white texture map and colour data indicative of one or more colours in which an item of clothing is available.

76. A method in accordance with claim 66 further comprising the step of recording said generated data on a storage medium.

77. A method of generating a computer model of an individual wearing a selected item of clothing comprising the steps of:

obtaining a computer model of an individual in the absence of clothing;

obtaining data indicative of the manner in which each of a plurality of items of clothing alter the appearance of an individual;

selecting an item of clothing from said plurality of items of clothing; and generating a computer model of said individual wearing said selected item of clothing utilising said computer model and said obtained data for said selected item of clothing.

78. A method in accordance with claim 77 wherein said obtaining a computer model comprises:

storing a computer model of the shape and appearance of a generic person;

obtaining image data of an individual wearing clothing, wherein at least some of the surface of said individual is not covered by clothing; and generating a computer model of said individual utilising said image data of portions of said individual not covered by clothing to generate a model of said portion of said body and said stored computer model to generate a model of the portions of said individual covered by clothing.

79. A method in accordance with claim 77 wherein said obtaining data comprises:

storing a computer model of a mannequin in the absence of clothing;

obtaining image data of said mannequin wearing an item of clothing;

generating a computer model of said mannequin wearing said item of clothing utilising said image data; and generating data indicative of the manner in which an item of clothing alters the appearance of an individual on the basis of a determination of the differences between said stored model and said generated model.

80. A method in accordance with claim 77, wherein said model of an individual comprises data indicative of the shape and appearance of an individual, wherein said generation step comprises the steps of:

generating a model of the shape said individual wearing a selected item of clothing by utilising said data indicative of the shape of said individual and data indicative of the manner in which said selected item of clothing alters the shape of an individual; and generating a model of the appearance of the surface of said individual wearing said selected item of clothing utilising said data indicative of the appearance of said individual and data indicative of the appearance of surface of said selected item of clothing.

81. A method in accordance with claim 80 wherein said generated model comprises a computer model of said individual wearing a selected plurality of items of clothing, wherein each of said selected items of clothing is associated with data indicative of the relative position of said items of clothing to each other and the skin of an individual wearing a said item of clothing, and said generating step comprises the steps of:

generating data indicative of the appearance of said individual utilising, for portions of said model corresponding to unclothed portions model of said individual in the absence of clothing; and for the remaining portions said data modified by data for the manner in which said appearance is altered by the outermost item of clothing worn at said remaining portions of said model.

82. A method in accordance with claim 81 wherein said generation step comprises steps of: for each of said plurality of items of clothing:

determining which item of clothing of said selected items of clothing is worn next closest to the skin;

generating a model of an individual wearing said determined item of clothing by modifying a model of said individual wearing items of clothing beneath said item of clothing; and utilising said generated model of said individual wearing said determined item of clothing to generate a model of said individual wearing said next outermost item of clothing.

83. A method of obtaining order data for items of clothing comprising steps of:

receiving selection data identifying an item of clothing;

generating model of an individual wearing a selected item of clothing identified by said selection data in accordance with claim 77; and displaying image data generated utilising said generated model as part of a user input interface for inputting order data for ordering said item of clothing identified by said selection data.

84. A method of obtaining order data in accordance with claim 83 further comprising the step of:

receiving colour selection data wherein said generation of a model of an individual comprises generating a model of an individual wearing an item of clothing corresponding to said colour selection data, wherein said user input interface is adapted for inputting order data for ordering said item of clothing in said colour corresponding to said colour selection data.

85. Apparatus for generating computer models of individuals in the absence of clothing comprising:

storage means for storing a computer model of the shape and appearance of a generic person;

image input means for obtaining image data of an individual wearing clothing, wherein at least some of the surface of said individual is not covered by clothing; and model generation means for generating a computer model of said individual utilising said image data of portions of said individual not covered by clothing to generate a model of said portions of said body and said stored computer model stored in said storage means to generate a model of the portions of said individual covered by clothing.

86. An apparatus in accordance with claim 85 wherein said model generation means is arranged to determine the appearance of the portions of said individual covered by clothing, utilising said stored model of the appearance of the corresponding portions of a generic person and a determined skin tone colour, determined utilising said image data of said portions of said individual not covered by clothing.

87. Apparatus in accordance with claim 85, wherein said storage means is arranged to store computer models corresponding to a plurality of body types, said apparatus further comprising:

selection means for selecting a body type to generate a computer model of an individual, wherein said model generation means is arranged to utilise said computer model corresponding to said selected body type to generate a model of the portions of said individual covered by clothing.

88. An apparatus in accordance with claim 87 wherein said body types comprise computer models of individuals of different sexes, ages or heights.

89. An apparatus in accordance with claim 85 further comprising:

weighing means for obtaining weight data indicative of the weight of an individual of whom a model is to be generated;

wherein said storage means is arranged to store variation data identifying the manner in which the shape of an individual varies in dependence upon weight of an individual; and said model generation means is arranged to generate a model of an individual utilising a computer model of a generic person modified in accordance with said variation data and said weight data obtained for said individual to generate a model of the portions of said individual covered by clothing.

90. Apparatus for generating data indicative of the manner in which an item of clothing alters the appearance of an individual comprising:

means for storing a computer model of a mannequin in the absence of clothing;

means for obtaining image data of said mannequin wearing an item of clothing;

means for generating a computer model of said mannequin wearing said item of clothing utilising said image data; and means for generating data indicative of the manner in which an item of clothing alters the appearance of an individual on the basis of a determination of the differences between said stored model and said generated model.

91. Apparatus in accordance with claim 90 wherein said means for obtaining image data comprises:

means for generating an image of an item of clothing; and means for combining said generated image of an item of clothing with a generated image of a said mannequin.

92. Apparatus in accordance with claim 90 further comprising: a mannequin; and said item of clothing for which data is to be generated, wherein said means for obtaining image data of said mannequin wearing said item of clothing comprises a camera.

93. Apparatus in accordance with claim 92, wherein said means for obtaining image data comprises a means for providing a predefined background against which said image data of mannequin may be obtained.

94. Apparatus in accordance with claim 93, further comprising a turntable, wherein said mannequin is adapted to be fixed to said turntable, and wherein when said mannequin is fixed to said turntable, said turntable is arranged to present different views of said mannequin in front of said background to said camera, when said turntable is turned.

95. Apparatus in accordance with claim 92, further comprising:

a plurality of mannequins; and selection input means for inputting data identifying a selected one of said mannequins;

wherein said means for storing has stored therein computer models of said plurality of mannequins; and said means for said generation a computer model is arranged to determine the differences between a computer model generated from said image data and the stored computer model corresponding to data input identifying a selected mannequin.

96. Apparatus in accordance with claim 95, wherein a plurality of mannequins comprise mannequins having different surface colours.

97. Apparatus in accordance with claim 95 wherein said plurality of mannequins comprise mannequins having different shapes.

98. Apparatus in accordance with claim 97 wherein said plurality of mannequins comprises mannequins having male and female anatomical shapes.

99. Apparatus in accordance with claim 90 wherein said means for generating a computer model is arranged to output model data comprising shape data indicative of the manner in which an item of clothing alters the shape of an individual, and a texture rendering function for texture rendering the surface of a computer model of an individual modified utilising said shape data.

100. Apparatus in accordance with claim 90 wherein said texture rendering function comprises data indicative of a colour texture map.

101. Apparatus in accordance with claim 100 wherein said texture rendering function comprises data indicative of a black and white texture map and colour data indicative of one or more colours in which an item of clothing is available.

102. Apparatus in accordance with claim 90 further comprising means for recording data indicative of said generated model on a storage medium.

103. Apparatus for generating a computer model of an individual wearing a selected item of clothing comprising:

first receiving means for obtaining a computer model of an individual in the absence of clothing;

second receiving means for obtaining data indicative of the manner in which each of a plurality of items of clothing alter the appearance of an individual;

clothing selection means for selecting an item of clothing from said plurality of items of clothing; and clothing model generation means generating a computer model of said individual wearing said selected item of clothing utilising said computer model and said obtained data for said selected item of clothing.

104. Apparatus in accordance with claim 103 wherein said first receiving means comprises:

storage means for storing a computer model of the shape and appearance of a generic person;

image input means for obtaining image data of an individual wearing clothing, wherein at least some of the surface of said individual is not covered by clothing; and model generation means for generating a computer model of said individual utilising said image data of portions of said individual not covered by clothing to generate a model of said portions of said body and said stored computer model stored in said storage means to generate a model of the portions of said individual covered by clothing.

105. Apparatus in accordance with claim 103 wherein said second receiving means comprises:

means for storing a computer model of a mannequin in the absence of clothing;

means for obtaining image data of said mannequin wearing an item of clothing;

means for generating a computer model of said mannequin wearing said item of clothing utilising said image data; and means for generating data indicative of the manner in which an item of clothing alters the appearance of an individual on the basis of a determination of the differences between said stored model and said generated model.

106. Apparatus in accordance with claim 103 wherein said model of an individual comprises data indicative of the shape and appearance of an individual, wherein said clothing model generation means comprises:

means for generating a model of the shape said individual wearing a selected item of clothing by utilising said data indicative of the shape of said individual and data indicative of the manner in which said selected item of clothing alters the shape of an individual; and means for generating a model of the appearance of the surface of said individual wearing said selected item of clothing utilising said data indicative of the appearance of said individual and data indicative of the appearance of surface of said selected items of clothing.

107. Apparatus in accordance with claim 106, wherein said generated model generated by said clothing model generation means comprises a computer model of an individual wearing a selected plurality of items of clothing, further comprising association means associating said selected items of clothing with data indicative of the relative position of said item of clothing to each other and the skin of an individual wearing a said item of clothing, and wherein said clothing model generation means is arranged to generated data indicative of the appearance of said individual utilising, for portions of said model corresponding to unclothed portions model of said individual in the absence of clothing; and for the remaining portions said data modified by data for the manner in which said appearance is altered by the outermost item of clothing worn at said remaining portions of said model.

108. Apparatus in accordance with claim 107 wherein said clothed model generation means is arranged for each of said plurality of items of clothing to:

determine which item of clothing of said selected items of clothing is worn next closest to the skin;

generate a model of an individual wearing said determined item of clothing by modifying a model of said individual wearing items of clothing beneath said item of clothing; and utilising said generated model of said individual wearing said determined item of clothing to generate model of said individual wearing said next outermost item of clothing.

109. Apparatus for obtaining order data for items of clothing comprising:

means for receiving selection data identifying an item of clothing;

means for generating model of an individual wearing a selected item of clothing identified by said selection data in accordance with claim 103; and display means displaying image data generated utilising said generated model as part of a user input interface for enabling the input order data for ordering said item of clothing identified by said selection data.

110. Apparatus for obtaining order data in accordance with claim 109 further comprising:

means for receiving colour selection data wherein said generation of a model of an individual comprises generating a model of an individual wearing an item of clothing corresponding to said colour selection data, wherein said user input interface is adapted for inputting order data for ordering said item of clothing in said colour corresponding to said colour selection data.

111. A storage medium having recorded thereon data indetifying the manner in which items of clothing alter the appearance of an individual generated in accordance with the method of claim 66.

112. Apparatus in accordance with claim 7, wherein said means providing a predefined background comprises a curtain.

113. Apparatus in accordance with claim 112, wherein said means providing a predefined background further comprises means for placing said curtain in tension.

114. Apparatus in accordance with claim 113, wherein said means for placing said curtain in tension comprises a housing from which extends a curtain rail to which the top of the curtain is attached; and a floor extending from said housing, wherein the bottom of said curtain is attached to said floor.

115. Apparatus in accordance with claim 114 wherein said at least one camera is mounted on said housing, said housing further comprising highly means for illuminating said predefined background.

116. Apparatus in accordance with claim 4 further comprising:

means for projecting structured light on at least part of an individual in a pose; wherein said model generation means is arranged to utilise image data of an individual onto which structured light is projected to generate a computer model of at least part of the individual onto which structured light is projected.

117. A method of generating data for representing an individual in a computer game comprising the steps of:

generating a computer model of an individual in accordance with claim 33;

generating image data of said individual in a plurality of predefined poses, wherein said poses comprise poses utilised within a computer game; and generating data for representing said individual in said computer game utilising said generated image data.

118. An apparatus for generating computer models of individuals for generating graphical representations of individuals in different poses comprising:

memory for storing a computer model of a generic person;

model generator for generating representations of a computer model of the surface of a person in poses in accordance with pose instructions identifying the orientation of a model's limbs in a pose;

data input device for obtaining data representative of the surface of an individual in a pose;

pose calculator for determining the orientations of an individual's limbs in a pose adopted by an individual in the data obtained by said data input means;

comparator for comparing said obtained data and data generated by said means for generating representations of said model of a person in a pose in which the model's limbs are oriented in accordance with the orientations determined by said pose calculation means, and model generator operable to utilize said comparison by said comparison means to generate a computer model of said individual for generating computer graphical representations of said individual in different poses.

* * * * *